United States Patent
Weston et al.

(10) Patent No.: US 11,755,706 B2
(45) Date of Patent: Sep. 12, 2023

(54) ENTITY IDENTIFICATION AND AUTHENTICATION USING A COMBINATION OF INDEPENDENT IDENTIFICATION TECHNOLOGIES OR PLATFORMS AND APPLICATIONS THEREOF

(71) Applicant: TensorMark, Inc., Cleveland, OH (US)

(72) Inventors: John P. Weston, Cleveland, OH (US); Ali Manav, Aurora, OH (US); Lonnie D. Hanlon, Akron, OH (US); Anthony John Pyros, Cleveland, OH (US); Andrew Jacobson, Los Angeles, CA (US)

(73) Assignee: Tensormark, Inc, Cleveland, OH (US)

( * ) Notice: Subject to any disclaimer, the term of this patent is extended or adjusted under 35 U.S.C. 154(b) by 357 days.

(21) Appl. No.: 16/932,489

(22) Filed: Jul. 17, 2020

(65) Prior Publication Data
US 2020/0349249 A1 Nov. 5, 2020

Related U.S. Application Data

(63) Continuation-in-part of application No. 15/997,312, filed on Jun. 4, 2018, now Pat. No. 10,846,963.
(Continued)

(51) Int. Cl.
*G06F 21/32* (2013.01)
*G06V 20/30* (2022.01)
*G06V 40/16* (2022.01)

(52) U.S. Cl.
CPC .............. *G06F 21/32* (2013.01); *G06V 20/30* (2022.01); *G06V 40/165* (2022.01); *G06V 40/171* (2022.01); *G06V 40/173* (2022.01)

(58) Field of Classification Search
CPC ...... G06F 21/32; G06V 20/30; G06V 40/165; G06V 40/171; G06V 40/173; G06V 40/70
(Continued)

(56) References Cited

U.S. PATENT DOCUMENTS

| 8,964,298 B2 | 2/2015 | Haddick et al. |
| 2003/0210139 A1 | 11/2003 | Brooks et al. |

(Continued)

FOREIGN PATENT DOCUMENTS

JP   2002/189865 A   7/2002

OTHER PUBLICATIONS

International Search Report dated Sep. 28, 2018, PCT/US2018/035864, 4 pages.
(Continued)

*Primary Examiner* — Charlotte M Baker
(74) *Attorney, Agent, or Firm* — Amin, Turocy & Watson, LLP

(57) ABSTRACT

Techniques are described for identifying and/or authenticating entities using a combination of independent identification technologies and/or platforms. In one embodiment, a system can comprising a memory that stores computer executable components and a processor that executes the computer executable components stored in the memory. The computer executable components can comprise a reception component that receives image data captured of a person, and an identification component that employs two or more independent identification technologies and/or platforms to determine an identity of the person based on the image data. In some embodiments, the two or more independent identification technologies are selected from a group consisting of: facial recognition, object recognition, text recognition, and gait recognition.

20 Claims, 18 Drawing Sheets

Related U.S. Application Data

(60) Provisional application No. 62/875,823, filed on Jul. 18, 2019.

(58) Field of Classification Search
USPC ....... 382/118, 115; 709/217; 455/413, 414.1, 455/415
See application file for complete search history.

(56) References Cited

U.S. PATENT DOCUMENTS

| | | |
|---|---|---|
| 2007/0110286 A1 | 5/2007 | Sato et al. |
| 2011/0313821 A1 | 12/2011 | Hilton |
| 2012/0198371 A1 | 8/2012 | Liwerant |
| 2013/0039547 A1* | 2/2013 | Liu .................... G06K 9/00536 |
| | | 382/115 |
| 2014/0192085 A1 | 7/2014 | Kim |
| 2015/0294394 A1 | 10/2015 | Shreve et al. |
| 2016/0042333 A1 | 2/2016 | Ho et al. |
| 2018/0204111 A1 | 7/2018 | Zadeh et al. |
| 2019/0042719 A1* | 2/2019 | Miu .................... H04L 63/0861 |

OTHER PUBLICATIONS

Non-Final Office Action received for U.S. Appl. No. 16/932,489 dated Jan. 8, 2020, 39 pages.
Non-Final Office Action received for U.S. Appl. No. 17/100,310 dated Nov. 21, 2022, 23 pages.
Notice of Allowance received for U.S. Appl. No. 17/100,310 dated Dec. 21, 2022, 16 pages.
Non-Final Office Action received for U.S. Appl. No. 17/817,438 dated Mar. 15, 2023, 43 pages.

* cited by examiner

ENTITY IDENTIFICATION AND AUTHENTICATION USING A COMBINATION OF INDEPENDENT IDENTIFICATION TECHNOLOGIES OR PLATFORMS AND APPLICATIONS THEREOF

RELATED APPLICATIONS

This application claims priority to and is a continuation-in-part of U.S. patent application Ser. No. 15/997,312 filed Jun. 4, 2018 and titled "METHOD AND SYSTEMS FOR EVENT ENTRY WITH FACIAL RECOGNITION." This application further claims priority to U.S. Provisional Application Ser. No. 62/875,823 filed Jul. 18, 2019 and titled "ENTITY IDENTIFICATION AND AUTHENTICATION USING A COMBINATION OF INDEPENDENT IDENTIFICATION TECHNOLOGIES OR PLATFORMS AND APPLICATIONS THEREOF." The entireties of these applications are incorporated herein by reference.

TECHNICAL FIELD

This application relates to computer-implemented techniques for identifying and/or authenticating entities using a combination of independent identification technologies and/or platforms and applications thereof.

BACKGROUND

Facial recognition is a biometric software application capable of uniquely identifying or verifying a person's identity by comparing and analyzing patterns based on the person's facial contours from a digital image or a video frame. Facial recognition systems generally work by comparing selected facial features from a given image with faces within a database.

There are many advantages associated with facial recognition compared to other biometric techniques. For example, with facial recognition, face images can be captured from a distance and analyzed without requiring any interaction with the person. Facial recognition systems are also less costly than other biometric identification systems.

However, the are many challenges involved in properly implementing facial recognition technology. Among all biometric systems, facial recognition has the highest false acceptance and rejection rates, thus questions have been raised on the effectiveness of facial recognition software in cases of security. Many factors can affect the performance accuracy of facial recognition systems, such as image quality, illumination, resolution, expression, pose and noise during face capture. For example, low-resolution face images and images of individuals with darker complexions have been found difficult to accurately recognize using facial recognition algorithms. This is one of the main obstacles of facial recognition in surveillance systems. Variations in facial expressions can also impact the performance of facial recognition system. There is also inconstancy in the quality of the datasets used to train and develop different facial recognition algorithms. For example, developers may use anywhere from several subjects to scores of subjects and a few hundred images to thousands of images.

DETAILED DESCRIPTION

Figure 1:
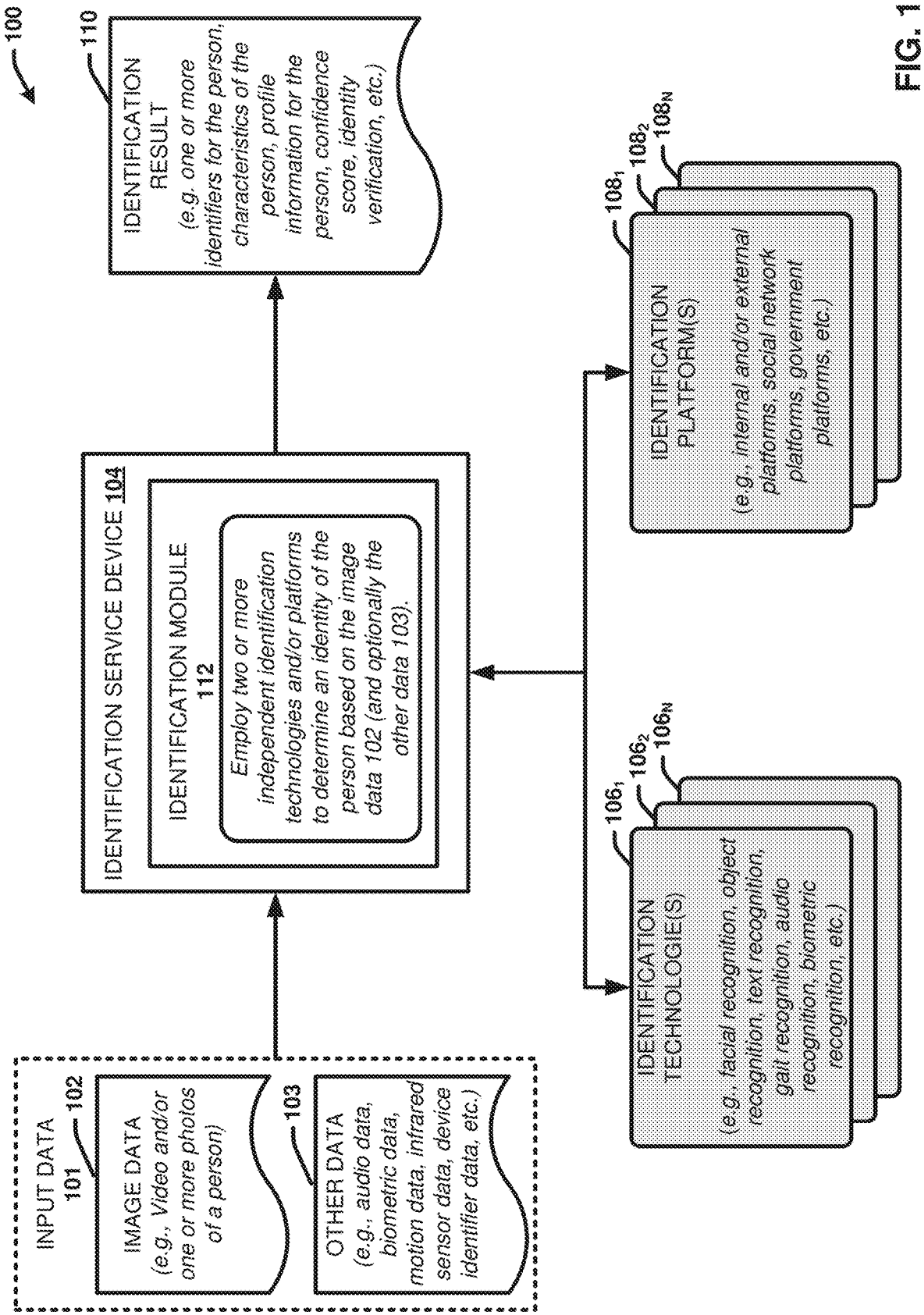
FIG. 1 presents a high-level overview of an example, non-limiting system for identifying and/or authenticating an entity using a combination of independent identification technologies and/or platforms in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section or in the Detailed Description section.

Various embodiments of the disclosed subject matter are directed to systems, computer-implemented methods, apparatus and/or computer program products that facilitate identifying and/or authenticating a person using a combination of independent identification technologies and/or platforms. In accordance with these embodiments, a system is provided that includes a memory that stores computer executable components and a processor that executes the computer executable components stored in the memory. The computer executable components can comprise a reception component that receives image data captured of a person and an identification component that employs two or more independent identification technologies and/or platforms to determine an identity of the person (e.g., a name, an identification number, a profile name, or another distinguishing identifier for person) based on the image data. For example, in various implementations, the two or more independent identification technologies are selected from a group consisting of: facial recognition based identification, object recognition based identification, text recognition based identification, and gait recognition based identification.

In some implementations, the computer executable components can further comprise a confidence evaluation component that determines a level of confidence in the accuracy of the identity based on a degree of correspondence between identifying information determined for the person using the two or more independent identification technologies. The identification component can further indicate the determined confidence level in association with providing identification results and/or determine whether to accept or reject the identification result based on the confidence level being above or below a defined threshold.

Additionally, or alternatively, the identification component can employ two or more independent recognition platforms to facilitate identifying and/or authenticating a person. In some implementations, the independent recognition platforms can comprise independent systems that determine identities of individuals using different and independent databases of information associating known identities with distinct sets of image features. For example, the independent systems can employ one more recognition technologies (e.g., facial recognition, object recognition, text recognition, gate recognition, etc.) to identify users represented in their different internal databases. The two or more independent systems can employ same or disparate recognition technologies and/or models/algorithms (e.g., different facial recognition algorithms trained and developed using different datasets and/or different training techniques).

In various embodiments, the two or more independent systems can include an external or third-party system with an independent recognition platform that can be accessed by the identification component using defined application program interfaces (APIs) for the respective recognition platforms. In some implementations of these embodiments, the identification component can send the image data to the independent system for independent processing in association with a request to determine the identity of the person based on the image data. The identification component can further receive a response from the independent systems comprising identifying information (e.g., a name, an identification number, a profile name, etc.) determined for the person based on the image data. The identification component can further determine the identity of the person based on correspondences between responses received and/or generated from a plurality of different identification platforms (e.g., based on whether the responses or a majority of the responses identify the same entity). The confidence evaluation component can further determine a level of confidence in the accuracy of the identity based on a degree of correspondence between the identifying information included in the responses.

Additionally, or alternatively, the identification component can access external system databases providing information associating known identities with facial images, distinct sets of image features and/or other characteristics/attributes (e.g., demographics, home location, occupation, social security number, birth date, etc.). The identification component can further use the information provided in these external databases to facilitate identifying the person captured in a received image (e.g., using cross-correlation between images, facial features, and/or other characteristics/attributes).

The computer executable components can further comprise a geolocation component that determines location information regarding a known location associated with the identity and a capture location of the image data. With these implementations, the identification component can further determine the identity of the person based on the location information. For example, the confidence evaluation component can determine a level of confidence in the accuracy of the identity based on correspondence between the known location and the capture location.

In some implementations, in addition to and/or alternative to using image data of a person to facility identifying the person, the identification component can employ other forms of sensory and/or biometric data captured for a person to facilitate identifying the person using other non-image based identification technologies. For example, in one embodiment, the reception component can receive audio data such as speech spoken by the person and/or audio data including sounds of an environment of the person. The identification component can further employ audio analysis technology to facilitate determining the identity of the person based on the audio data. The identification component can also use employ biometric data, motion data, infrared sensor data, and the like to facilitate identifying the person.

In another embodiment described herein, systems, computer-implemented methods, apparatus and/or computer program products are presented that facilitate authenticating an image of a person to ensure that an entity submitting the image as a means to verify authorization of the entity is actually depicted in the image. In accordance with these embodiments, another system is described that includes a memory that stores computer executable components and a processor that executes the computer executable components stored in the memory. The computer executable components can comprise a reception component that receives, from an entity, a request to authorize the entity based on image data of a person, wherein the request comprises the image data. The computer executable components can further comprise an authentication component that determines whether the person included in the image data corresponds to the entity.

In one or more implementations, the authentication component can determine whether the person included in the image data corresponds to the entity based on recognition of a unique digital signature or artifact in the image data. For example, the unique digital signature or artifact can be generated and applied to the image data by a trusted camera employed by the system to indicate the image data was just captured of the person submitting the request (as opposed to an image of the person found on the Internet or the like). In association with the unique digital signature or artifact, the trusted camera can also be configured to generate and apply a timestamp to the image data representing a time of capture of the image data. The authentication component can further determine whether the person included in the image data corresponds to the entity based on the timestamp coinciding with a time of reception of the request (or within a defined window of time relative to the time of reception of the request).

In another implementation, the authentication component can determine whether the person included in the image data corresponds to the entity based on an ability to decrypt the image data using a first decryption key. With this implementation, the computer executable components can further comprise a key generation component that generates and provides one or more cameras registered with the system (e.g., or trusted cameras) with a second encryption key, and the one or more cameras can be configured to encrypt image data captured thereby with a the second encryption key in association with submission of the image data to the reception component. The computer executable components can further comprise a decryption component that decrypts the image data using the first decryption key.

Additionally, or alternatively, the authentication component can determine whether the person included in the image data corresponds to the entity based on the image data depicting the person with a specific facial expression and/or pose, performing a specific gesture or motion, or the like. With these implementations, the computer executable components can further comprise an image data request component that instructs the entity to provide the image data with the person making the specific facial expression and/or pose, performing the specific gesture or motion, and the like. The specific facial expression, pose, gesture, motion, etc., can be randomly determined and/or selected by the image data request component in association with the request. Accordingly, if the entity is not the actual person submitting the image, the entity will likely be unable to generate the requested image data on the fly (e.g., find a previously captured image of the person performing the requested facial expression, pose, gesture, motion, etc.). In some implementations, the image data received with the request can comprise first image data of the person, and based on receiving the request, the image data request component can instruct the entity to provide second image data of the person. The authentication component can further determine whether the person included in the first image data corresponds to the entity based on whether the first image data and the second image data depict the same person and/or whether the second image data depicts the person with the specific facial expression, pose or gesture.

In another embodiment described herein, systems, computer-implemented methods, apparatus and/or computer program products are presented that provide security access control using a combination of independent identification technologies and/or platforms. In accordance with these embodiments, another system is described that includes a memory that stores computer executable components and a processor that executes the computer executable components stored in the memory. The computer executable components can comprise a reception component that receives image data captured of a person and an identification component that employs two or more independent identification technologies and/or platforms to determine an identity of the person based on the image data, as described above. The computer executable components can further comprise an access control component that controls access of the person to a place or resource through a physical access control point (e.g., a door, a gate, or another physical barrier) based on whether the identity is authorized to access the place or resource. The access control component can also control non-physical barriers such as infrared sensor barriers (e.g., such as those used on garage doors), electric fences and the like by deactivating or activating these barriers according to access authorizations. The access control component can also generate an alarm, notification or the like in implementations in which an unauthorized person passes through such non-physical barriers.

In some implementations, the computer executable components can further comprise a confidence evaluation component that determines a level of confidence in the accuracy of the identity based on a degree of correspondence between identifying information determined for the person using the two or more independent identification technologies. With these implementations, the access control component can control the access based on the level of confidence (e.g., allow or deny access based on the level of confidence being above or below a defined threshold). The computer executable components can further comprise an authorization evaluation component that determines whether the identity is authorized to access the place or resource based on whether the identity is listed as an authorized or unauthorized entity in a predefined access control list.

In one or more implementations, the identification component can employ also object recognition technology to identify one or more objects associated with the person depicted in the image data. As used herein, the term "object" is used to refer to any visible or tangible thing other than a person or human being (e.g., including animals, plants, other natural objects, and manufactured objects). The authorization evaluation component can further determine whether the person is authorized to access the place or resource based in part on the identified object(s) and whether the object(s) are associated with authorized or unauthorized access. For example, the authorization evaluation component can determine a person to be unauthorized to access the place or resource based on a determination that the image data depicts the person carrying a weapon. The access control component can further prevent access of the person to a place or resource through the physical access control point based on the person being determined to be unauthorized (e.g., by automatically locking the door, or the like). In another implementation, the authorization evaluation component can determine one or more conditions associated with providing the person access to the place or resource based on the identity, and the access control component can restrict the access of the person to a place or resource through the physical access control point based on the one or more conditions. For example, the one or more conditions can comprise a time restriction regarding a time or duration authorized for the access by the person. According to this example, the access control component can permit access to the person if the person is requesting access at the authorized time.

In another embodiment described herein, systems, computer-implemented methods, apparatus and/or computer program products are disclosed that provide security monitoring using a combination of independent identification technologies and/or platforms. In accordance with these embodiments, another system is described that includes a memory that stores computer executable components and a processor that executes the computer executable components stored in the memory. The computer executable components can comprise a reception component that receives image data captured at a physical location, and a security monitoring component that monitors activity at the physical location based on the image data. In this regard, the security monitoring component can comprise an image data analysis component that evaluates the image data using two or more independent identification technologies and/or platforms (as described above) to identify people included in the image data and/or characteristics of the people. The security monitoring component can further comprise a security evaluation component that determines whether the physical location is associated with a security threat based on the identities and/or characteristics of the people. For example, the security evaluation component can determine whether the location is associated with a security threat based on whether an identified person is unauthorized to access the physical location. With these implementations, the computer executable components can further comprise an authorization evaluation component that determines whether the identified person is authorized to access the physical location based on whether the person is listed as an authorized or unauthorized person in a predefined access control list. The computer executable components can further comprise a notification component that generates a notification or alarm based on a determination that the physical location is associated with a security threat.

In another implementation, the identification component can employ object recognition technology to identify one or more objects respectively associated with the people based on the image data and the security evaluation component can determine whether the physical location is associated with a security threat based on the one or more objects. For example, the security evaluation component can determine whether the physical location is associated with a security threat based on whether the one or more objects comprise a weapon and/or whether the weapon is associated with a person that is unauthorized to carry the weapon.

In one or more additional implementations, the computer executable components can comprise a safety evaluation component that determines whether the physical location is associated with a safety violation based on the identified person (or persons), characteristics of the person and/or objects associated with person. For example, the safety evaluation component can determine whether the physical location is associated with a safety violation based on whether the image data depicts an object classified a harmful to a person identified in the image data. In another example, the safety evaluation component can determine that the physical location is associated with a safety violation based on a location of the person relative to one or more objects determined to be harmful to the person. For instance, the safety evaluation component can determine based on analysis of the image data (e.g., using facial recognition, object recognition, text recognition, gate recognition, etc.) that a young child in the image data is located within five feet of a pool and a guardian is not present or paying attention (e.g., based on gaze detection/analysis) to the child. The safety evaluation component can thus characterize the scenario as a safety violation/threat and initiate an appropriate response (e.g., sound an alarm, notify the guardian, notify authorities, etc.). In this regard, the security evaluation component and/or the safety evaluation component can respectively determine whether a security/safety threat exists at the location based on the characteristics of the people and a current context at the location (e.g., regarding time of day, day of week, who is at the location, their current activity at the location, etc.).

The computer executable components can further comprise a machine learning component that learns consistent activity patterns of known people with known identities and/or known characteristics that visit a particular physical location. The security evaluation component and/or the safety evaluation component can further determine whether the physical location is associated with a security/safety threat based on identification of unusual activity that deviates from the consistent activity patterns.

In some implementations, the computer executable components can also comprise a person of interest component that identifies a person of interest included in the image data based on one or more characteristics associated with the person (e.g., whether the person is identified as a person of interest in an existing database, whether the person is carrying a weapon, whether the person is located in or attempting to gain access to an authorized area, whether the person is wearing a disguise, whether the person is exhibiting suspicious behavior, etc.). In accordance with these implementations, based on identification of a person of interest, the monitoring component can track the person in the image data as the image data is received over a period of time during which the person remains at the physical location (e.g., and moves about the physical location). The computer executable components can further comprise a rendering component that renders the image data to an entity (e.g., a security guard/monitor) via a display and highlights the person of interest in the image data. In some implementations, the computer executable components can further comprise an eye tracking component that tracks whether the user (e.g., the security guard/monitor) is visually tracking the person in the image data (e.g., to determine whether the security guard/monitor is paying attention and has noticed the person of interest in the image data).

In another embodiment described herein, systems, computer-implemented methods, apparatus and/or computer program products are presented that that facilitate fraud prevention using a combination of independent identification technologies and/or platforms. In accordance with these embodiments, another system is described that includes a memory that stores computer executable components and a processor that executes the computer executable components stored in the memory. The computer executable components can comprise a reception component that receives image data captured of a person in association with a request to authorize a financial transaction using a financial account of an entity. The computer executable components can further comprise an identification component that determines whether the person corresponds to the entity or an authorized user of the of the financial account based on the image data using one or more identification technologies and/or platforms discussed herein. The computer executable components can further comprise an authorization component that authorizes or prevents the transaction based on whether the person corresponds to the entity or the authorized user of the financial account.

The computer executable components can further comprise a fraud notification component that notifies the entity regarding an attempted unauthorized usage of the financial account based on a determination that the person fails to correspond to the entity or the authorized user. The fraud notification component can also notify one or more regulatory authorities regarding an attempted unauthorized usage of the financial account based on a determination that the identity fails to correspond to the entity or the authorized user. In some implementations, the fraud notification component can further label the image data depicting a fraudulent entity and add the image data to a fraudulent entity database. The fraud notification component can also include the image data in a notification sent to the one or more regulatory authorities.

In various implementations of these embodiments, the reception component can receive the image data from a camera operatively coupled (e.g., physically coupled and/or communicatively coupled) to a machine used to perform the financial transaction. For example, the machine can comprise an automated teller machine (ATM), a point of sale device (e.g., at a brick and mortar store, at a gas station pump, a personal device such as smartphone or tablet employing an auxiliary credit card reader, etc.), or the like. In another example, the financial transaction can involve an online transaction, a peer-to-peer transaction, or the like, and the computing device employed by one or more of the parties to perform the transaction can include camera that captures and provides the image data at the time of the transaction (e.g., a smartphone, a tablet, a laptop computer, etc.).

Various additional applications of the disclosed entity identification techniques are further described including (but not limited to) application related to: anonymous entity profiling and tracking, tracking user impressions in real-world environments, tailoring delivery of advertisements and other information to users, and military applications.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. In some embodiments, elements described in the disclosed systems can be embodied in different forms such as a computer-implemented method, a computer program product, or another form.

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The following detailed description is arranged into nine sections respectfully identified with Roman numeral I-IX. This division of subject matter is merely employed to organize the various different embodiments described herein and is not intended to limit the scope of any section to the material described solely therein. In this regard, one or more components, devices, databases, data structures and the like presented in the different sections I-IX can be combined in a same system, computer-implemented method, apparatus and/or computer program product.

I. Combining Independent Identification Technologies and Platforms for Entity Identification and Authentication Turning now to the drawings, FIG. 1 presents a high-level overview of an example, non-limiting system 100 for identifying and/or authenticating an entity using a combination of independent identification technologies and/or platforms in accordance with one or more embodiments of the disclosed subject matter. System 100 can include an identification service device 104 that includes an identification module 112 that facilitates employing multiple (e.g., two or more) different identification technologies and/or platforms to determine an identify of the person. The identification service device 104 can be or correspond to one or more computing devices, including but not limited to, one or more server devices (e.g., cloud based and/or tangible servers) and/or one or more personal computing devices (e.g., laptop computers, desktop computers, handheld devices, wearable devices, etc.). In some embodiments, the identification service device 104 can facilitate employing multiple different identification technologies and/or platforms to identify or characterize a place and/or thing.

As used herein, reference to determining an "identity" of a person refers to correlating the person with one or more known identifiers for the person. The known identifier can be a unique identifier or set of unique identifiers for the person that is used to distinguish the person from all other people within a fixed time and space, as well as more generalized identities that can be shared by two or more individuals. For example, a unique identifier for a person can include (but is not limited to), the person's legal name, social security number, birth certificate number, name and birth date, driver's license number, passport number, a unique serial number, a unique alphanumeric representation of the person's unique deoxyribonucleic acid (DNA), or the like, that assumingly only applies to one person that exists within fixed time and space. In another example, a unique identifier for a person can include a unique username, a unique avatar, or another unique symbol, name, or alphanumeric number that represents only that person in a particular environment, including a virtual environment.

A more general identifier for a person can refer to an identifier that can be used to characterize a trait or feature of the person that can also be associated with other people. For example, general identifiers for a person can include (but are not limited to), a demographic identifier (e.g., identifying the person by age, gender, ethnicity, nationality, geographic location, height, weight), an occupational identifier (e.g., job title, job role, etc.), a society role identifier, family role identifiers (e.g., mother, father, daughter, brother, niece, nephew, etc.), a group/affiliation identifier (e.g., member/member number of "xyz" group, organization, etc.), a team identifiers (e.g., sports teams, military teams), defined stereotypes, and the like.

In one or more embodiments, the identification module 112 can employ two or more independent identification technologies and/or platforms to identify a person based on input data 101 captured of/for the person. In various embodiments, the input data 101 can include image data 102 captured of the person, including facial image data (e.g., one or more images captured of the person's face). The image data 102 can include video (e.g., including two or more sequential frames) and/or one or more photographs (e.g., fixed images) captured of the person. The video can include live video (e.g., captured and/or received in real-time) as well as previously recorded video. In some embodiments, the image data 102 can include one or more images (e.g., photograph and/or video frames) of the person's face or a part of the face (e.g., a portion of the face not covered by a mask or the like, the eyes, etc.) for processing using facial recognition software to determine an identity of the person. In other embodiments, the image data 102 can include one or more photographs and/or video of the person's body. For example, the image data 102 can include images and/or video depicting the one or more body parts of the person, the body in its entirety from one or more perspectives, video and/or images depicting movement or activity of the person over time, and the like. In another example, the image data 102 can include video and/or images of a person's clothing, objects being carried, held or worn by the person, and the like. In other implementations, the image data 102 can include video and/or images of the person's environment, including objects and/or other people present in the environment.

In some embodiments, the input data 101 can additionally (or alternatively) include other data 103 captured of or for the person that can facilitate determining an identity (e.g., a specific or general identity) of the person. For example, the other data 103 can include but is not limited to: audio data, biometric data, motion data, infrared sensor data, device identifier data, and the like. In this regard, the audio data can include a voice sample captured of the person's voice and/or audio providing sounds of an environment in which the person is located. The biometric data can include various other non-facial recognition types of biometric data, including fingerprint data, iris scan data, DNA data, palmprint data, hand geometry data, retina data, and/or scent data. Motion data can include information regarding movement or motion of the person generated via one or more motion sensors physically coupled to the person (e.g., included in a device worn or held by the person or the like). Infrared sensor (IR) data can include IR based motion data regarding movement or motion of the person. Device identifier data can include information identifying a device associated with a person, such as a personal computing device located near the person (e.g., a mobile phone, a smartphone, a smart watch, a laptop computer, etc.), worn by the person (e.g., a smartwatch, headphones, eyewear, a heads-up display, an implanted device, an implanted medical device, etc.), held by the person or the like. For example, the device identifier data can include information extracted from the device that uniquely identifies the device, such as an identification number, a phone number or the like.

In the embodiment shown, the identification technologies are respectively identified as identification technologies $106_{1-N}$ and the identification platforms are respectively identified as identification platforms $108_{1-N}$, wherein N can be any integer. In this regard, the number of identification technologies 106 and/or identification platforms 108 can vary. In accordance with embodiments in which the input data 101 includes image data 102 as described above, the identification technologies 106 and/or platforms 108 can include identification technologies and/or platforms configured to analyze image-based features included in the image data to determine one or more identifiers for the person. In various embodiments, the identification technologies $106_{1-N}$ can include but are not limited to: one or more facial recognition identification technologies, one or more object recognition identification technologies, one or more text recognition technologies, and/or one or more gait recognition technologies.

For example, in implementations in which the image data 102 includes image data depicting the person's face (or a portion thereof), body, movement (over time), and environment, the identification module 112 can employ facial recognition technology to determine an identify of the person based on facial features of the person. Facial recognitions technologies generally work by comparing selected facial features from given image with faces within a database. There are different types of facial recognition techniques with different strengths and weaknesses. For example, some known facial recognition technologies include (but are not limited to), holistic matching based facial recognition, feature-based facial recognition, three-dimensional facial recognition techniques, skin texture analysis techniques, thermal camera based facial recognition technologies, and hybrids of these techniques.

In various embodiments, the identification module 112 can employ two or more different types of facial recognition technologies to facilitate determining an identity of a person based on image data captured of the person's face (or a portion thereof). With the embodiments, the identification technologies $106_{1-N}$ can include different types of facial recognition technologies or systems that differ with respect to the particular facial recognition models/algorithms used (e.g., those described above and additional types). For example, the different facial recognition technologies can include holistic matching based facial recognition, feature-based facial recognition, three-dimensional facial recognition techniques, skin texture analysis techniques, thermal camera based facial recognition technologies, and hybrids of these techniques. The different facial recognition technologies can employ various types of machine learning models/algorithm. In other embodiments, the different facial recognition technologies can include employ a same type of model yet trained and developed using different datasets, as model performance varies based on the training/test datasets used to train and develop the models.

In accordance with these embodiments, regardless of the reason of distinction between the different types of facial recognition identification technologies used, the identification module 112 can combine the results of each different/independent facial identification technique to increase the accuracy of the final output. For example, the identification module 112 can independently determine identifiers for a person using the different facial recognition technologies. The identification module 112 can further aggregate and combine the identifiers to determine an identity of the person with increased confidence. For instance, if all (or a majority) of the independently determined identifiers are in agreement and/or correspond to the same identity, (e.g., each or most of the results respectively identified the same person), the identification service device can 104 can provide an identification result 110 identifying the person that will have a higher degree of confidence relative to an identification result determined using a single facial recognition technology.

In some embodiments, the identification module 112 can also employ one or more image-based object recognition technologies to identify and/or characterize one or more objects/things being worn or held by the person and/or in the person's environment a depicted in the image data 102. With these embodiments, the identification technologies can include one or more image-based object recognition systems/technologies. For instance, an object recognition technology can include be used to identify what a person is wearing with respect to type of clothing/attire (e.g., including brand, size, fabric, type of uniform, etc.), whether the person is holding a weapon, whether the person is near a pool, a park, a school, etc., and the like. In this regard, the object recognition technology/system can identify features and/or characteristics of the person's environment as well as features and/or characteristics of the person's attire, context, and the like, based on the objects identified in the image data 102. These object-based features can facilitate not only identifying the person (e.g., "looking for a person wearing clothing with the following description . . . ", carrying the following items . . . ", etc.) and characteristics of the person, but characteristics of the person's environment and context.

The identification module 112 can also employ object recognition software or similar image analytical software to determine characteristics of the person's body (e.g., height, weight, physique, body dimensions, posture, etc.), as well as characteristics about the person's appearance and/or demographics (e.g., age, gender, ethnicity, religion, marital status, occupation, etc.). In some embodiments, the identification module 112 can also employ more than one type of object recognition technique (e.g., with respect to the type of algorithm/model used) to determine characteristics of objects associated with a person and/or included in the person's environment. The identification module 112 can further combine/aggregate the results of the different object recognition techniques to increase the degree of confidence in the accuracy of the identified objects, the number of identified objects and/or the specificity of the identified objects.

The identification module 112 can similarly employ text recognition software to identify text appearing in the image data 102. With these embodiments, the identification technologies $106_{1-N}$ can include one or more text recognition technologies. For example, with respect to image data depicting a person's clothing/attire, in implementations in which the clothing/attire includes text and/or symbols, using text recognition software, the identification module 112 can read and process the text to facilitate identifying characteristics of the person and the clothing based on the text. For instance, if the person is wearing a badge or name tag, the identification module 112 can read text on the badge or name tag to determine the person's name, job title, role, affiliation, employer, and the like (depending on what is provided on the badge or name tag). In another example, clothing can include text identifying a particular sports team, location, brand, slogan, or the like that the person supports or is otherwise affiliated with. The text recognition software can also be used to identify tattoos and/or other text symbols appearing on the person's body.

The text can also include text on objects or things the person is carrying, holding or wearing as depicted in the image data 102. The identification module 112 can similarly employ text recognition software to read/identify text on objects/things appearing in the person's environment (e.g., street signs, buildings, storefronts, vehicles, etc.) as captured in the image data 102 to facilitate identifying characteristics about the person's environment. In some embodiments, the identification module 112 can also employ more than one type of text recognition technique (e.g., with respect to the type of algorithm/model used) to recognize text appearing in the image data 102 and further combine/aggregate the results of the different text recognition techniques to increase the accuracy and specificity of the text recognition results.

The identification module 112 can also employ gait recognition technology to facilitate identifying a person and/or one or more characteristics of the person in the image data 102 (e.g., video and/or sequential photographs in time). With these embodiments, the one or more identification technologies $106_{1-N}$ can include gate recognition technology. Gait recognition technology uses image data features regarding a body shape and how they walk to identify them. In general, gate recognition software extracts a person's silhouette from video and analyzes the silhouette's movement to create a model of the way the person walks. This model can correspond to a unique movement signature that can be used to identify a person. In some embodiments, the identification module 112 can also employ more than one type of gait recognition technique (e.g., with respect to the type of algorithm/model used) to identify a person based on their gait. The identification module 112 can further combine/aggregate the results of the different gait recognition techniques to increase the accuracy and specificity of the gait recognition results.

In various embodiments, the identification module 112 can further aggregate and/or combine the results of the different recognition technologies used (e.g., the results of the one or more facial recognition, object recognition, text recognition, and/or gait recognition technologies) to facilitate determining the identity and/or characteristics of the person appearing in the image data 102 with increased accuracy, specificity and confidence.

For example, assume one facial recognition software identified a person appearing in image data 102 as John Doe. In addition, an object recognition result identified the person appearing in the image data 102 as being a 5'10 male, and the system knows from accessible profile information for John Doe that he is in fact a 5'10 male. In addition, based on text recognition analysis of the image data, the identification module 112 can learn that the person in the image data was wearing a shirt with for the local running club, and the system also knows from John Doe's profile information that he belongs to the local running club. Furthermore, based on gait recognition analysis of the image data 102, the identification module 112 can determine that the person appearing in the image data has a gate pattern that matches is either a person named John Doe or a 5'4 female named Jane Johnson. In accordance with this example, the identification module 112 can determine with relatively high confidence, based on the aggregated evidence, that the person in the image data is likely to be John Doe. It should be appreciated that this example merely provides one example implementation demonstrating the use of different types of identification technologies and that the disclosed subject matter is not limited to this example.

The information included in an identification result 110 can vary depending on the identification technologies used and the individual results of the independent identification technologies. For example, in some implementations, the identification result 110 can include a unique identifier for a person appearing in the image data 102 (e.g., the person's name, an identification number for the person, etc.) and/or associated with the other input data 103. In other implementations, in addition to and/or alternative to the unique identifier, the identification result 110 can include one or more general identifiers for the person, such as one or more characteristics or attributes of the person (e.g., appearance characteristics, clothing features, predicted affinities, predicted affiliations, demographic characteristics, medical health history/status information, profile information, and various other types of information that can be determined about a person represented in the input data 101 using the techniques described herein). In various embodiments, identifying information/characteristics determined and/or aggregated for a person can be used to develop a profile for the person (as discussed in greater detail infra with reference to FIG. 14 and profile development component 1406). The system 100 can further store and regularly update the profile information. In some implementation as discussed in greater detail infra with reference to confidence evaluation component 208, the identification result 110 can also include a confidence score determined by the identification result that represents a degree of confidence in the accuracy of the identification result 110. Additionally, or alternatively, the identification result 110 can include identify verification information determined based on the confidence score or the like that verifies whether the identification module 112 considers the identifier (e.g., the unique name, identification number, etc.) or identifiers determined for the person represented in the input data 101 correct or incorrect.

In addition to and/or alternative to using two or more different identification technologies $106_{1-N}$ to generate an identification result 110, the identification module 112 can employ two or more independent identification platforms $108_{1-N}$ to facilitate identifying identify a person, object and/or place based on the input data 101. In this regard, as user herein, an identification platform $108_{1-N}$ refers to an independent system that employs an independent database and/or identification model (e.g., developed and/or trained using different training datasets and/or optimization techniques) to determine an identity of a person, object or place. For example, with respect to facial recognition technologies alone, these technologies generally compare facial features in a received image with a database of facial images/features for many previously identified people. In general, the person depicted in a newly receive image can only be identified if they have been previously identified in image data and added to the database. In addition, the accuracy and specificity of different facial recognition systems can vary based on the training data used to develop and train the models/algorithms, as well as the specific types of algorithms/models used. For example, a facial recognition platform employed be a social media system to automatically match profile names to faces in photos may apply a lower degree of scrutiny as opposed to a government/security facial recognition system used to identify known criminals. Likewise, the facial recognition platform and the government system will likely have completely different comparison databases from which the facial recognitions draw to match image features in new image data to an identity. The same variances noted above with respect to independent facial recognition platforms can similarly apply to different systems/platforms that perform object recognition, text recognition, gait recognition, and the like.

Thus, in various embodiments, the identification module 112 can employ different independent identification platforms $108_{1-N}$ to identify a person, object and/or place appearing in image data 102 and/or associated with the other data 103. The independent identification platforms $108_{1-N}$ can include internal platforms as well as external (or third-party platforms), such as social network platforms, government platforms, and the like.

In some embodiments, the identification module 112 can also evaluate other data 103 to facilitate identifying a person, place or thing associated with the other data. For example, the identification module 112 can receive and evaluate audio data including a speech sample spoken by a person to facilitate identifying the person using one or more speech recognition technologies. In accordance with this example, the identification technologies platforms $106_{1-N}$ can further include one or more audio analysis technologies. The identification module 112 can also receive biometric data captured for a person (e.g., fingerprints, iris scan, etc.) and use this biometric data in conjunction with facial recognition and/or another identification technologies to facilitate identifying a person associated with the input data 101.

System 100 and other systems described herein can be executed using various computing environments and architectures. For example, in some embodiments, one or more features and functionalities of system 100 and other systems described herein can be "cloud based." In other embodiments, one or more features and functionalities of system 100 and other systems described herein can be executed entirely by a local computing device (e.g., in an offline mode). In some implementations, the identification service device 104 can be or correspond to a server device. In other implementations, the identification service device 104 can be or correspond to a client device. For example, in some embodiments, one or more features and functionalities of system 100 (and additional systems described herein) can be executed using a website or web-based platform (e.g., as software as a service (SaaS)) that can be accessed by one or more client devices using a browser. In other embodiments, one or more features and functionalities of system 100 (and additional systems described herein) can be executed using a mobile application, a thin client application, a thick client application, a hybrid application, a web-application and the like. For example, in some implementations, system 100 can employ a server/client architecture to execute the various features and functionalities of system 100. According to this example, system 100 (and other systems described herein) can include one or more client devices (not shown) with a dedicated application configured to communicate with the identification service device 104 to receive and/or execute at least some feature and functionalities of system 100 (and other systems described herein). For example, in one implementation, system 100 can employ an architecture including one or more client devices configured to capture and submit the image data 102 (and optionally the other data 103) to the identification service device 104 in association with a request to receive identification results 110 based on the submitted image data 102.

Figure 2:
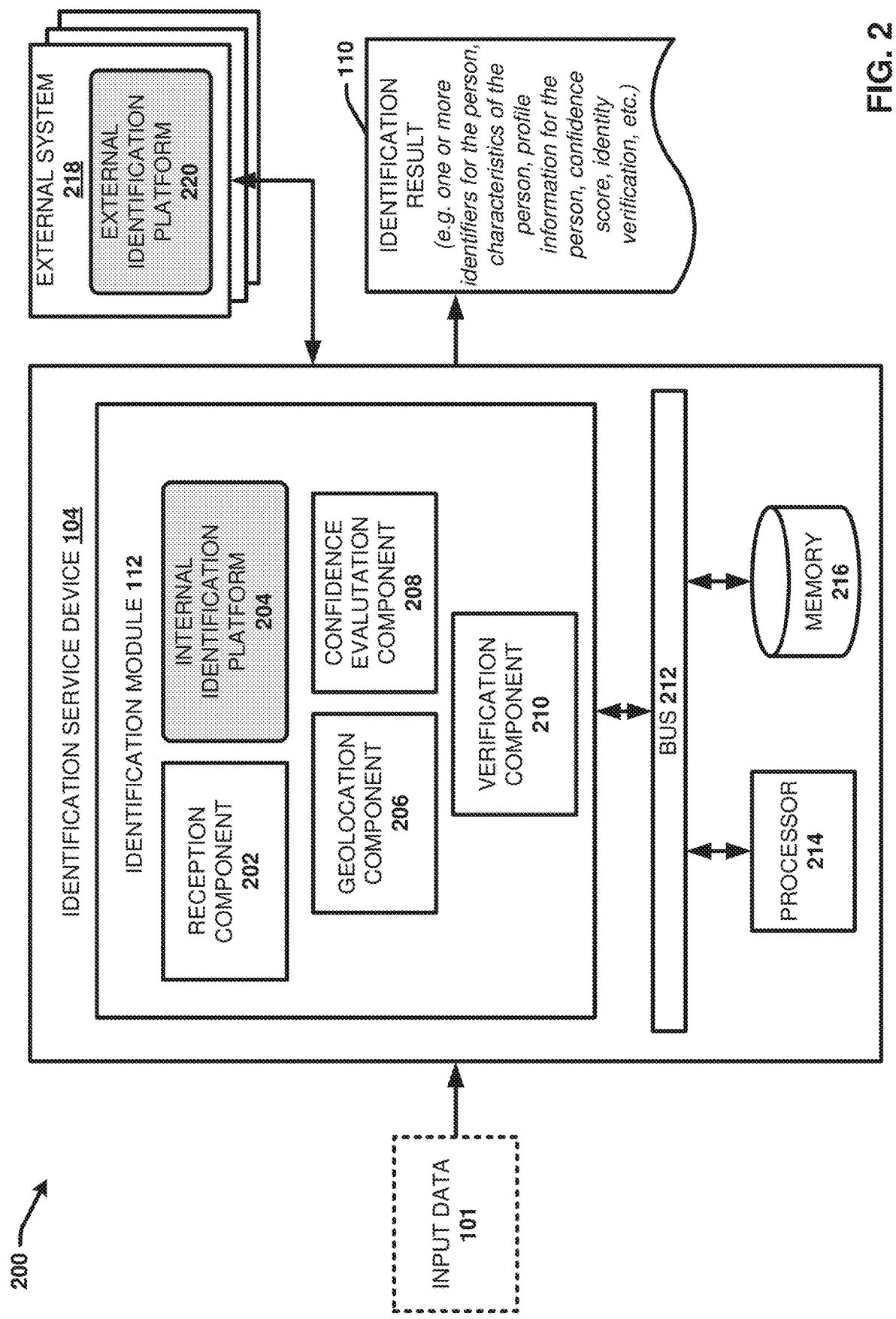
FIG. 2 illustrates a block diagram of an example, non-limiting system that facilitates identifying and/or authenticating a person using a combination of independent identification technologies and/or platforms in accordance with one or more embodiments of the disclosed subject matter.

FIG. 2 illustrates a high-level block diagram of another example system 200 that facilitates identifying and/or authenticating a person using a combination of independent identification technologies and/or platforms in accordance with one or more embodiments of the disclosed subject matter. Repetitive description of like elements employed in respective embodiments is omitted for sake of brevity.

System 200 includes identification service device 104 and one or more external systems 218. In the embodiment shown, the identification module 112 can include various computer/machine-executable components that facilitate identifying and/or authenticating a person using a combination of independent identification technologies and/or platforms. These computer executable components include reception component 202, internal identification platform 204, geolocation component 206, confidence evaluation component 208, and verification component 210.

The identification service device 104 can include or be operatively coupled to at least one memory 216 and at least one processor 214. The at least one memory 216 can further store executable instructions (e.g., the identification module 112, the reception component 202, the internal identification platform 204, the geolocation component 206, confidence evaluation component 208, and the verification component 210 and additional components described herein) that when executed by the at least one processor 214, facilitate performance of operations defined by the executable instruction. The identification service device 104 can further include a device bus 212 that communicatively couples the various components of the identification service device 104 (e.g., the reception component 202, internal identification platform 204, geolocation component 206, confidence evaluation component 208, and verification component 210, the processor 214 and the memory 216). Examples of said processor 214 and memory 216, as well as other suitable computer or computing-based elements, can be found with reference to FIG. 19, and can be used in connection with implementing one or more of the systems or components shown and described in connection with FIG. 1 or other figures disclosed herein.

In one or more embodiments, the reception component 202 can receive the input data 101 for evaluating to determine an identification result 110 based on the thereon. For example, in some implementations, the reception component 202 can receive the input data 101 in association with a request to process the input data 101 to generate an identification result 110 based thereon. For example, the request can be received from another system, device, application or the like via a communication network. In other implementations, the reception component 202 can be configured to interface with one or more external systems, device and/or applications to extract the input data therefrom 101.

In this regard, the reception component 202 can receive the input data 101 from a variety of sources which can vary based on the type of the input data 101 and the application of the identification module 112 or the identification result 110. In some implementations in which the input data 101 comprises image data captured of a person and/or an environment, the reception component 202 can receive the image data 102 from one or more cameras located in proximity to the person and/or the environment. For example, the reception component 202 can receive or extract the image data from one or more fixed or mobile cameras at a physical location, one or more cameras of a device associated with the person, such as smartphone, a wearable device, or the like). In another example, the reception component 202 can receive or extract the image data from one or more cameras associated with a point of sale device, an automatic teller (ATM) machine, a checkout counter at a merchant store, or the like. In another example, the reception component 202 can receive or extract the image data from a database comprising previously captured images and/or video, and/or another system or application in association with a request to identify a person in the image data. The reception component 202 can also receive the other types of input data (e.g., other data 103) in similar contexts either directly from the capture/acquisition device (e.g., an acoustic sensor or audio recording device, a biometric reader, a motion sensor, an infrared measurement device, a radio frequency identifier (RFID) reader, etc.), or from another computing device, system or application in association with a request to perform analysis on the other data 103 to facilitate identifying a person associated with the other data 103.

The identification module 112 further includes an internal identification platform 204 to facilitate determining an identification result 110 based on the input data 101. As discussed with reference to system 100, in various embodiments, the identification module 112 can employ two or more identification technologies and/or identification platforms to facilitate determining the identification result 110. The internal identification platform 204 can facilitate performing this analysis either entirely internally (e.g., without accessing any third-party systems or data sources) and/or using one or more external systems 218. For example, with reference to FIG. 1 in view of FIG. 2, in some embodiments, the internal identification platform 204 can be or correspond to one of the identification platforms $108_{1-N}$ that is associated with, operated by and/or otherwise controlled by the identification module 112. In some embodiments, the internal identification platform 204 can be configured to perform one or more identification technologies $106_{1-N}$ using software (e.g., recognition models/algorithms), hardware and/or data (e.g., databases providing information associating facial images with identities of people and/or attributes/characteristics of the people) associated with the internal identification platform 204 and/or the identification module 112.

Additionally, or alternatively, the internal identification platform 204 can be configured to access (e.g., using one or more communication technologies/networks such as the Internet of the like) and employ one or more external identification platforms 220 provided by one or more external systems 218 to facilitate determining the identification result 110 for the input data 101. In this regard, an external identification platform 220 associated with an external system 218 can be or correspond to another one of the identification platforms $108_{1-N}$ that is associated with, operated by and/or otherwise controlled by an external system 218. In some embodiments, an external identification platform 220 provided by an external system 218 can also be configured to perform one or more identification technologies $106_{1-N}$ using software (e.g., recognition models/algorithms), hardware and/or data (e.g., databases providing information associating facial images with identities of people and/or attributes/characteristics of the people) associated with the external identification platform 220. With these embodiments, the internal identification platform 204 can forward the input data 101 to the external system 218 for processing using its external identification platform 220 in association with a request to receive an identification result corresponding to identification result 110 (e.g., comprising information identifying and/or describing persons and/or objects reflected in the input data 101). The internal identification platform 204 can further aggregate identification results received from one or more external systems 218 and/or determined by the internal identification platform 204 to converge on a final identification result.

Additionally, or alternatively, an external identification platform 220 provided by an external system 218 can be or comprise one or more databases comprising information associating known identities of individuals (i.e., people) with facial images of the respective individuals and/or characteristics/attributes of the individuals. With these embodiments, the internal identification platform 204 can access and employ one or more of these databases to facilitate determining an identification result 110 based on the input data 101. For example, in some implementations, the internal identification platform 204 can employ internal recognition algorithms/models while using external databases provided by one or more external systems 218 for algorithm/model input (e.g., matching a facial image included in the input data 101 to one or more facial images associated with known identities as included in one or more external databases). In another example, the internal identification platform can access and/or retrieve information included one or more external databases describing known characteristics/attributes associated with a person identified in the input data 101. The internal identification platform 204 can further include the descriptive information in the identification result 110, generate a rich profile for the person using the information, and/or perform cross-correlation between the information included in the databases to facilitate confirming the person's identity.

Figure 3A:
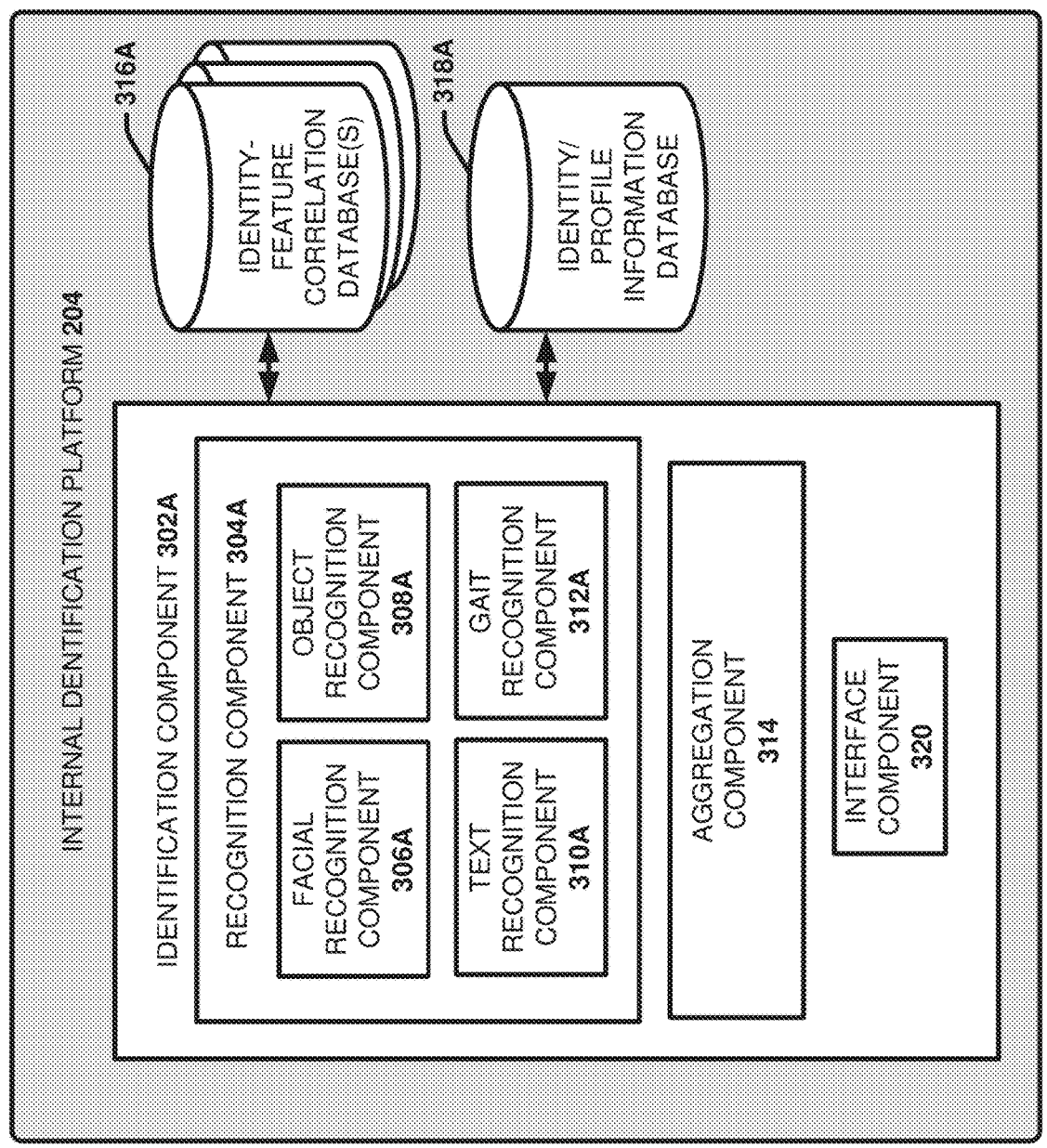
FIG. 3A illustrates a block diagram of an example internal identification platform in accordance with one or more embodiments of the disclosed subject matter.

FIG. 3A illustrates a block diagram of an example internal identification platform 204 in accordance with one or more embodiments. The internal identification platform 204 can include an identification component 302A that can generate and/or facilitate generating an identification result 110 identifying one or more persons represented in received input data 101. The identification component 302A can include a recognition component 304A, an aggregation component 314 and an interface component 320. The internal identification platform 204 can also include one or more identity-feature correlation databases 316A and an identity/profile information database 318A.

The recognition component 304A can be configured to perform/apply one or more different identification/recognition technologies (e.g., one or more identification technologies $106_{1-N}$) to the input data 101 to determine output information regarding identified people, places and/or things and/or characteristics of the people places or things represented in the input data 101. The aggregation component can further aggregate the output information to converge on a final identification result 110 based on the combined output information.

In one or more embodiments, the recognition component 304A can include a facial recognition component 306A configured to perform facial recognition analysis on received image data 102 comprising one or more facial images of a person to determine one or more identifiers for person (e.g., a unique identifier for the person such as their legal name, passport identification number, etc.). The recognition component 304A can include object recognition component 308A to perform object recognition analysis on the received image data 102 to identify and/or characterize (e.g., describe features thereof) one or more objects included in received image data 102. The recognition component 304A can include text recognition component 310A to perform text recognition analysis on the received image data 102 to determine text (e.g., words, phrases, sentences, etc.) included in the image data. The recognition component 304A can also include gait recognition component 312A to perform gait recognition on the received video of the person to determine a gate pattern of the person.

In some embodiments, the respective recognition components can employ internal recognition algorithms/models and associated (internal) identity-feature correlation databases 316A to determine the output information. In this regard, the identity feature-correlation databases 316A can include an (internal) facial recognition database that correlates previously identified facial images and/or facial features (e.g., a set of features or an extracted feature vector for the face) to known identities of people and/or entity profiles for the known identities. For example, the known identities can be identified by a unique name, number, profile name, or the like. In accordance with these embodiments, the facial recognition component 306A can employ the internal facial recognition database in association with one or more facial recognition algorithms/models to match new facial images to known identities/entity profiles. Thus, depending on the quality of the input facial image (or images), the accuracy of the facial recognition algorithm/model used, and the facial images (or corresponding feature vector) included in the (internal) facial recognition database, the facial recognition may (or may not) determine one or more possible identities of the person in the input image.

The identity-feature correlation databases 316 can also include one or more (internal) object databases that correlates knowns image patterns to objects or object features for use by the object recognition component 308 to classify objects appearing in the image data 102. With these embodiments, the object recognition component 306A can process input image data using one or more (internal) object recognition algorithms/models and/or the information provided in the one or more (internal) object databases to identify or characterize objects appearing in the image data. In some embodiments, the identity-feature correlation databases 316A can include similar types of databases for the text recognition component 310A and/or the gait recognition component 312A (e.g., correlating movement/posture/gait patterns with entity identities/profiles).

The identity/profile information database 318A can include additional information about known identities or entity profiles. For example, the additional information can include essentially any known or learned information about a person or entity. This can range from example, from demographic information, contact information (e.g., email address, phone number, physical address), family information, medical history information, etc., to more personal information regarding user preferences, habits, friends, affiliations, and the like. In some embodiments, the identity/profile information database 318A can include information provided directly by the user/person. In other implementations, the identity/profile information database 318A can include information about a person/user that is learned and built up over time based on accessing/receiving information about the person/user from various external network accessible data sources/systems, including one or more external systems 218.

In various embodiments, the aggregation component 314 can aggregate and evaluate the results of the different recognition technologies (e.g., the results of the facial recognition component 306A, the object recognition component 308A, the text recognition component 310 and the gait recognition component 312A) to facilitate determining an identify of a person, place or thing represented in the input data 101. In this regard, the aggregation component 314 can compare the results of the different recognition outputs to determine correlations and variances in the data regarding whether they reflect a same or different identity. The aggregation component can also cross-reference the results with the identity/profile information database 318A to cross-check facts/characteristics determined about a person/identity based on the outputs of the different recognition technologies to facilitate determining whether the person identified in the image data corresponds to the profile characteristics provided for the person in the identity/profile information database 318A.

In some embodiments, as new information is learned about a person or entity appearing in the image data 102, the aggregation component 314 can add this information to a profile for the person stored in the identity profile information database 318A to develop a rich profile for the person over time. The identification component 302 can further employ the rich profile information to determine more accurate identification results with higher confidence regarding the true identity and/or characteristics of a person appearing in the image data 102 and/or represented in the other data 103.

For example, in some embodiments, once the identification component 302A has determined and/or received (e.g., from one or more external identification platforms 220) one or more known identifiers for a person depicted in the input data 101, the identification component 302A can employ the identifiers to find additional information about the person available in various external databases and/or data sources associated with various types of systems, such as (but not limited to) social networking systems, online merchant systems, electronic health record systems (e.g., including lab/test results for tracked viruses, conditions, diseases, etc.), financial systems, government systems, criminal systems, trust evaluation systems, published documents, news articles, websites, etc. The aggregation component 314 can further extract the information and associated the information with a profile for the person stored in the identity/profile information database 318A.

As noted above, in addition to and/or alternative to using one or more internal recognition systems and databases (e.g., facial recognition component 306A, object recognition component 308A, text recognition component 310A and gait recognition component 312A, identity-feature correlation databases 316A, and/or identity/profile information database 318A), the identification module 112 can access and employ one or more external identification platforms 220 to facilitate determining the identify and/or characteristics about a person/place or thing represented in the input data 101. With these embodiments, the identification component 302A can include an interface component 320 to facilitate interfacing with and employing one or more features and functionalities of the external identification platforms 220.

Figure 3B:
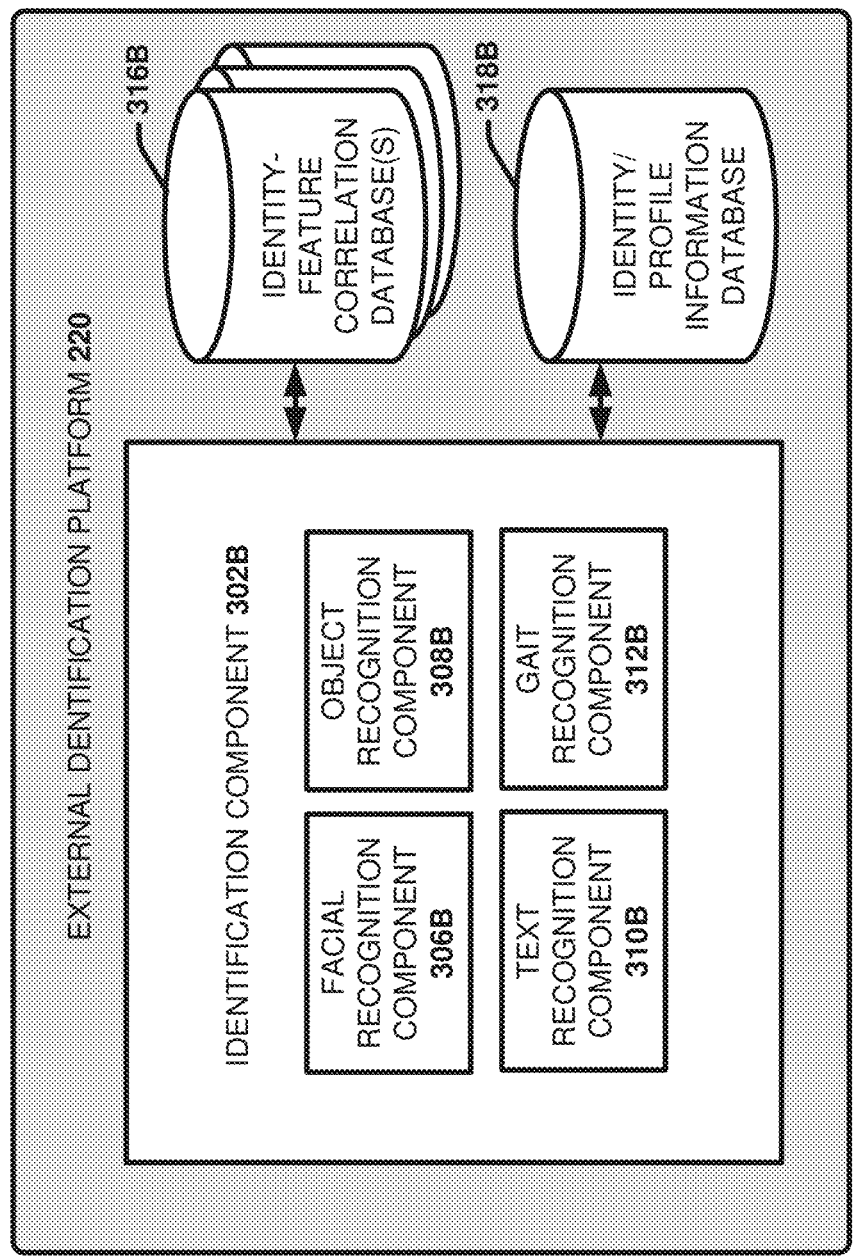
FIG. 3B illustrates a block diagram of an example external identification platform in accordance with one or more embodiments of the disclosed subject matter.

FIG. 3B illustrates a block diagram of an example external identification platform 220 in accordance with one or more embodiments. In some embodiments, the internal identification platform 204 and the external identification platform 218 can include same or similar components respectively labeled as component A or component B in the respective figures. It should be appreciated that corresponding components of the internal identification platform 204 and the external identification platform 220 can that can provide same or similar features and functionalities as the corresponding components described with reference to FIG. 3A For example, with reference to FIGS. 3A and 3B, the external identification platform 220 can include an identification component 302B configured to perform same or similar features and functionalities as identification component 302A. In the embodiment shown, the identification component 302B can include facial recognition component 306B configured to perform same or similar features and functionalities as facial recognition component 306A, object recognition component 308B configured to perform same or similar features and functionalities as object recognition component 308A, text recognition component 310B configured to perform same or similar features and functionalities as text recognition component 310A, and gait recognition component 312B configured to perform same or similar features and functionalities as facial recognition component 312B.

In this regard, the identification component 302B can employ one or more recognition technologies (using the respective recognition components B), one or more identify feature correlation databases 316B and/or an identity profile information databases 318B to determine identifying information (and/or relevant characteristics) for one or more people or objects represented in the input data 101. However, the specific recognition technologies and/or recognition models/algorithms used by the identification component 302B can vary relative to that used by the identification component 302A. For example, in one implementation, the identification component 302A and the identification component 302B can be configured to perform facial recognition on the input data 101 (e.g., using facial recognition component 302A and facial recognition component 302B respectively), yet the types of facial recognition technology used and/or the specific algorithms/models used can vary. In another example, the identification component 302A can be configured to process the input data using object recognition while the identification component 302B can be configured to process the input data using facial recognition.

Additionally, or alternatively, the specific information included in the one or more identity-feature correlation databases 316B and/or the identity profile information database 318B that is used by the identification component 302B can vary relative to that included in the one or more identify feature correlation databases 316A and/or the identity profile information database 318B.

In some embodiments, the internal identification platform 204 can use only the identity feature correlation databases 316B and/or the identity/profile information database 318B provided by an external system 218 (e.g., in combination with recognition component 304A). With these embodiments, the external system 218 can exclude an identification component (e.g., identification component 302B) and merely provide one or more identify-feature correlation databases 316A and/or an identity/profile information database 318A.

In other embodiments, the internal identification platform can send the input data to one or more external systems 218 for identification processing using their respective external identification platforms 220. The identification component 302A can further receive, aggregate and evaluate the results internally using the aggregation component 314 and/or the identity/profile information database 318A to determine a final characterization of a person's identity, as illustrated in FIG. 4.

Figure 4:
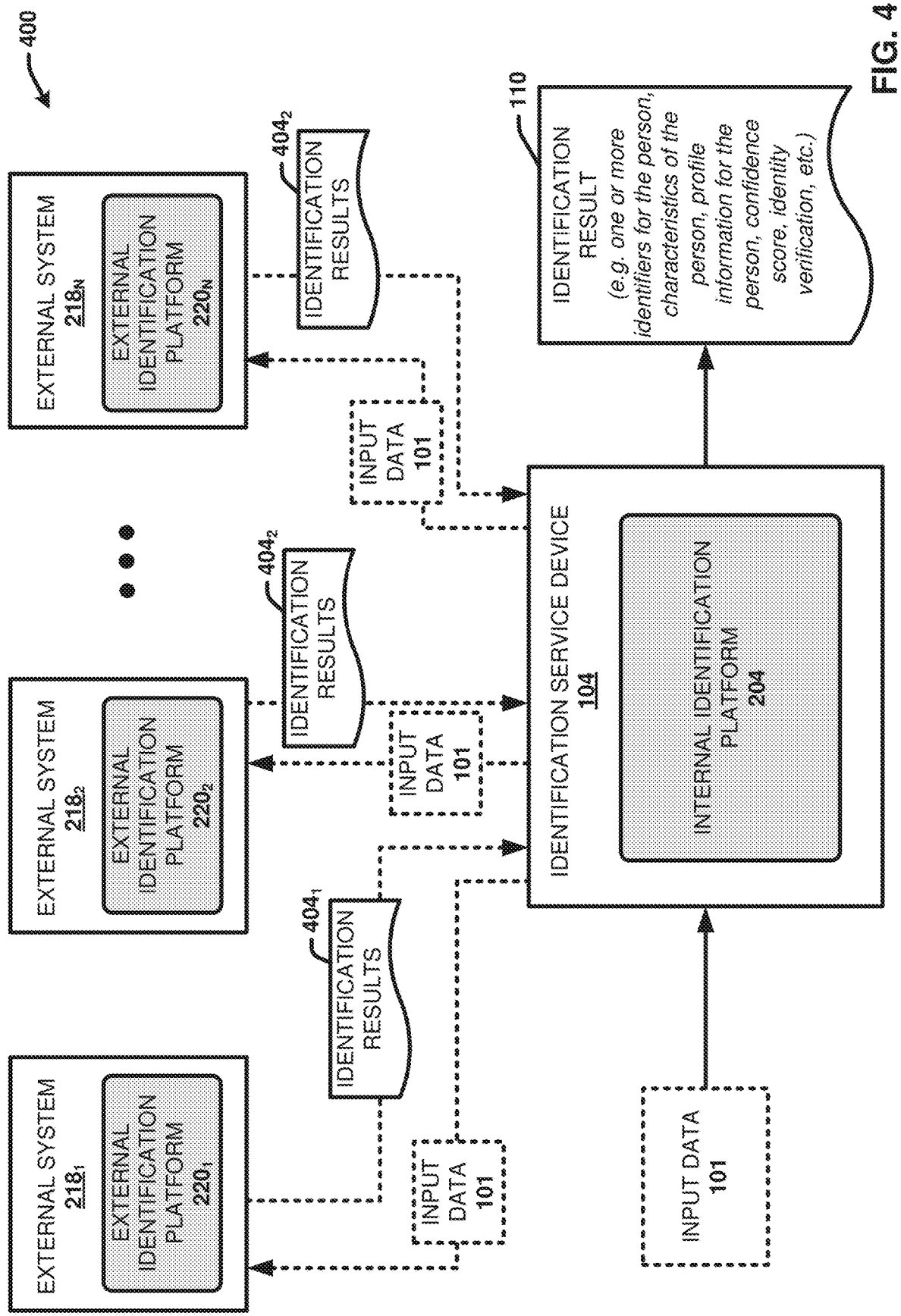
FIG. 4 presents another example, non-limiting system for identifying and/or authenticating an entity using a combination of independent identification technologies and/or platforms in accordance with one or more embodiments of the disclosed subject matter.

In this regard, FIG. 4 presents another example system 400 for identifying and/or authenticating an entity using a combination of independent identification technologies and/or platforms in accordance with one or more embodiments of the disclosed subject matter. Various components of the identification service device 104 and the internal and external identification platforms depicted in FIGS. 2, 3A and 3B respectively are not shown in FIG. 4 merely for simplification of the drawing. It should be appreciated that the identification service device 104 can include all or some of the components shown in FIG. 2 as well as additional components described herein. Repetitive description of like elements employed in respective embodiments is omitted for sake of brevity.

System 400 further includes an identification service device 104 and a plurality of external systems $218_{1-N}$, that respectively include their own external identification platforms $220_{1-N}$. The number (N) of external systems and associated identification platforms can vary. The identification platforms $220_{1-N}$ can respectively include different databases (e.g., different identity-feature correlation databases 316B and/or identity/profile information databases 318B with different independently developed data sets) and/or different (independently trained/developed) recognition algorithm/models (e.g., different types of recognition algorithms and/or models, different facial recognition algorithms/models, different object recognition algorithms/models, etc.).

In accordance with this embodiment, the internal identification platform 204 can include employ interface component 320 to interface with the external identification platforms $229_{1-N}$. of the external systems $218_{1-N}$ as authorized using known/suitable APIs for the respective identification platforms $220_{1-N}$. In this regard, the internal identification platform 204 can send (e.g., using the identification component 302 and the interface component 402) the input data 101 (or copies of the input data 101) to the respective external systems $218_{1-N}$ for identification processing in association with a request to receive the respective identification results $404_{1-N}$. The respective identification results $404_{1-N}$ can include same or similar information as the identification result 110, yet as determined by the respective external identification platforms $220_{1-N}$. For example, the identification results $404_{1-N}$ can include one or more identifiers for a person appearing or represented in the input data 101. In some embodiments, the results $404_{1-N}$ can also include relevant profile information for the identified person provided by the respective external systems as determined by the respective external systems using their own, internal identity/profile information databases.

The internal identification platform 204 can further aggregate and cross-reference the information included in the respective identification results $404_{1-N}$ to come up with a final characterization of the person depicted in the image data 102. In some embodiments, the aggregation component 314 can further build and/or develop a rich profile for the person based on the new identifiers and/or character features provided with the identification results $404_{1-N}$ results and information provided in one or more external databases/data sources (e.g., identity/profile information databases 318B and/or other network accessible data sources).

With reference again to FIG. 2, in some embodiments, in addition to aggregating and cross-checking different identification results and characteristics determined about as same person using different recognition technologies and/or platforms, the identification module 112 can further employ information regarding a known location about the person at or near a time when the submitted image data was capture and a known capture location of the image data (e.g., the camera location) to facilitate determining whether the person identified in the image data is correct. For example, if the identification results identify a person in an image known to be captured within a recent time frame (e.g., within the past hour, 30 minutes, 5 minutes, 1 minute, etc.) by a camera in San Francisco, but a recent credit card purchase by the person indicates that the person is/was located in Florida within this timeframe, than the system can assume either the identification of the person in the image is wrong or their credit card is being fraudulently used by a person in Florida.

In accordance with these embodiments, the identification module 112 can include a geolocation component 206 that determines location information regarding a capture location and time of the image data 102 and an actual location of an identified person at or near the capture time (e.g., within a reasonable timeframe that can vary in specificity based on the distance between the capture location and the actual location). The identification component 302 can further determine whether an identity determination is accurate or inaccurate based on whether the capture location and the actual location match. The geolocation component 206 can employ various techniques to determine the capture location of an image and the actual location of the person potentially depicted in the image. In some embodiments, the image data can be received with associated metadata indicating its' capture location and time. With respect to determining an actual location of a person, in some embodiments, the geolocation component 206 can access one or more external systems/databases that track user location based on an identifier associated with the user and/or a device associated with the user (e.g., a cellular phone, a smartwatch, vehicle, a credit card device, etc.). In this regard, using a potential identifier determined for a person in an image (e.g., the system determines the person is potentially Amy Anderson), the geolocation component 206 can access one or more external location tracking systems to find information that correlates Amy Anderson with a particular location (e.g., a system that indicates Amy Anderson's personal computing device is located in Florida, a system that indicates Amy Anderson's vehicle is located in Florida, a system that indicates Amy Anderson's credit card was just used at a merchant in Florida, a system that indicates Amy Anderson's home is located in Florida, etc.).

In some embodiments, the identification module 112 can further include a confidence evaluation component 208 that determines a confidence score representing a measure of confidence in the accuracy of an identification result 110 based on a degree of correspondence between identifying information (e.g., different identifiers) determined for a person using the two or more independent recognition technologies and/or platforms. For example, the confidence evaluation component 208 can employ one or more confidence scoring models/algorithms to calculate a confidence score for a determined entity identity that represents a degree of confidence that a person depicted in the input data 101 is actually the determined entity identity (i.e., that person was correctly identified).

In some implementations, the one or more confidence scoring models can calculate the confidence score based on a degree of correspondence between the identification results generated/determined using two or different recognition technologies and/or platforms. For example, the confidence evaluation component 208 cross-correlate specific identifiers (e.g., names, passport numbers, registration numbers, mobile device numbers, etc.,) and/or characteristics/attributes (e.g., demographic information, location information, appearance description information, etc.) determined for a person based on the input data 101 using two or more independent recognition technologies/platforms (or databases). The confidence evaluation component 208 can further determine a confidence score based on the degree of correspondences between the information. The confidence evaluation component 210 can also use the geolocation information described above in association with determining the confidence score. The confidence evaluation component 210 can also weigh different criteria accordingly based on its relative impact on the accuracy of the identification result. For example, specific entity identifiers and geolocation information can be weighted more heavily then more general attributes. In some implementations, the confidence evaluation component 210 can also weigh the identification results generated using the different recognition technologies/platforms using a defined weighting scheme that reflects the relative importance/influence of the respective recognition technologies/platforms (based on their learned strengths and weaknesses). The confidence score can further be included in the identification result 110.

In some embodiments, the system 200 can also include a verification component 202 that can determine whether the identification module 112 considers an identifier (e.g., the unique name, identification number, etc.) or identifiers determined for a person represented in the input data 101 correct or incorrect. In some implementations in which the confidence evaluation component 208 determines a confidence score for the identification result 110, the verification component 210 can further determine whether to verify the entity based on the confidence score. For example, the verification component 210 can apply a thresholding technique wherein the verification component 210 verifies the entity based on whether the confidence score is greater than a defined threshold. The verification component 210 can further include identity verification information in the identification result that indicates whether the system verifies the identity or not.

In some embodiments, the verification component 210 can perform the identify verification analysis and generate the verification information in response to a request. For example, the identification module 112 can receive a request to verify a person appearing in or otherwise represented by the input data 101. With these embodiments, the request can include a name, username, account number, or some other unique identifier for the person requesting to be verified based on the image data of the person. The verification component 210 can further verify whether the name matches the face based on the output of the internal identification platform 204 (e.g., the aggregated results of the multi-technology/platform identification analysis), and/or the confidence score. In accordance with these embodiments, the verification component 210 can include information in the identification result stating "yes" or "no" as to whether the person is verified or not based on whether the identity determined by the identification module 112 for a person based on the received input data 101 matches the submitted identity (e.g., matches the name, username, account number etc.).

In some implementations, the identification service device 104, one or more of the various components of the identification service device 104, and other components, platforms, modules, devices, data structures, etc. of other systems described herein, can be communicatively connected via one or more networks (not shown). In this regard, the identification service device 104, one or more of the various components of the identification service device 104, and other components, platforms, modules, devices, data structures, etc. of other systems described herein, can be collocated and/or distrusted amongst different systems and/or devices/machines in a distributed computing environment and communicatively coupled via one or more networks. Such networks can include wired and wireless networks, including but not limited to, a cellular network, a wide area network (WAD, e.g., the Internet) or a local area network (LAN). For example, the identification service device 104, and/or one or more components of the identification service device 104, and other components, platforms, modules, devices, data structures, etc. of other systems described herein, can communicate with one another using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

The identification service device 104 can thus include hardware (e.g., a central processing unit (CPU), a transceiver, a decoder), software (e.g., a set of threads, a set of processes, software in execution) or a combination of hardware and software that facilitates communicating information between the identification service device 104 and external systems, sources, devices, etc. The identification service device 104 can include any suitable computing device (or group of computing devices) configured to receive and process input data 101 and/or execute one or more features and functionalities of the components associated therewith (e.g., the reception component 202, the internal identification platform 204, the geolocation component 206, the confidence evaluation component 206, the verification component 210, and other components described herein). For example, the identification service device 104 can be or include a desktop computer, a laptop computer, a television, an Internet enabled television, a mobile phone, a smartphone, a tablet personal computer (PC), or a personal digital assistant (PDA), a heads-up display (HUD), an augmented reality (AR) device, a virtual reality (VR) device, a wearable device, an implanted medical device (IMD), and the like.

Figure 5:
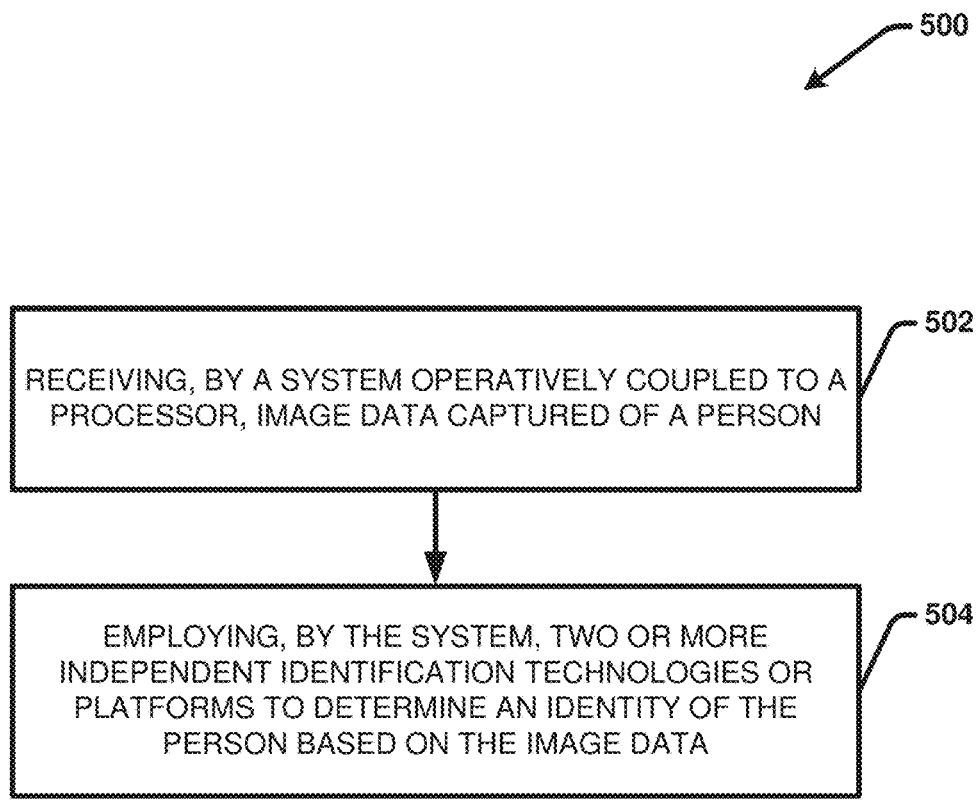
FIG. 5 presents an example, high-level flow diagram of a computer-implemented method for identifying and/or authenticating an entity using a combination of independent identification technologies and/or platforms in accordance with one or more embodiments of the disclosed subject matter.

FIG. 5 presents an example, high-level flow diagram of a computer-implemented method 500 for system for identifying and/or authenticating an entity using a combination of independent identification technologies and/or platforms in accordance with one or more embodiments of the disclosed subject matter. Repetitive description of like elements employed in respective embodiments is omitted for sake of brevity.

At 502, a system operatively coupled to a processor (e.g., system 100, system 200, system 400 or the like) can receive (e.g., using reception component 202) image data captured of a person (e.g., facial image data). At 504, the system can employ two or more independent identification technologies or platforms to determine an identity of the person based on the image data (e.g., using internal identification platform 204 and/or one or more external identification platforms 220 and/or associated databases such as one or more identity/feature correlation databases 316A and/or 316B and one or more identity/profile information databases 318A and/or 318B.

II. Image Feed Authentication

One or more of the disclosed techniques for determining an identity and/or characteristic of an entity using multiple identification technologies and/or platforms discussed in section I above can be applied to facilitate authenticating an image feed. In this regard, in various implementations in which a system uses image data of person to determine whether the person is authorized to receive access to something, whether it be a physical structure, a tangible device or electronic information, a computing system, a computing application, or the like, the system can employ an authorization procedure that requires the person to provide image data of themselves (e.g., facial image data, body image data, etc.). The system can further determine whether the person appearing in the image data is authorized to receive access (or otherwise authorized to do a requested action/activity). If the person appearing in the image data is authorized, then the system can grant authorization.

One issue with such authorization procedures based on image data of a person involves determining whether the person appearing in the image data is actually the entity requesting authorization (e.g., for access or something else). For example, a fraudulent entity could find a picture of John Doe online, copy or download the picture, and then submit the picture of John Doe in attempts to gain access or otherwise receive authorization for something, pretending to be John Doe. In accordance with this example, with the disclosed image analysis identification techniques, the system could verify that the person in the image is in fact John Doe, however, the system has no way of knowing that the entity submitting the picture is in fact not John Doe but a fraudulent entity.

Figure 6:
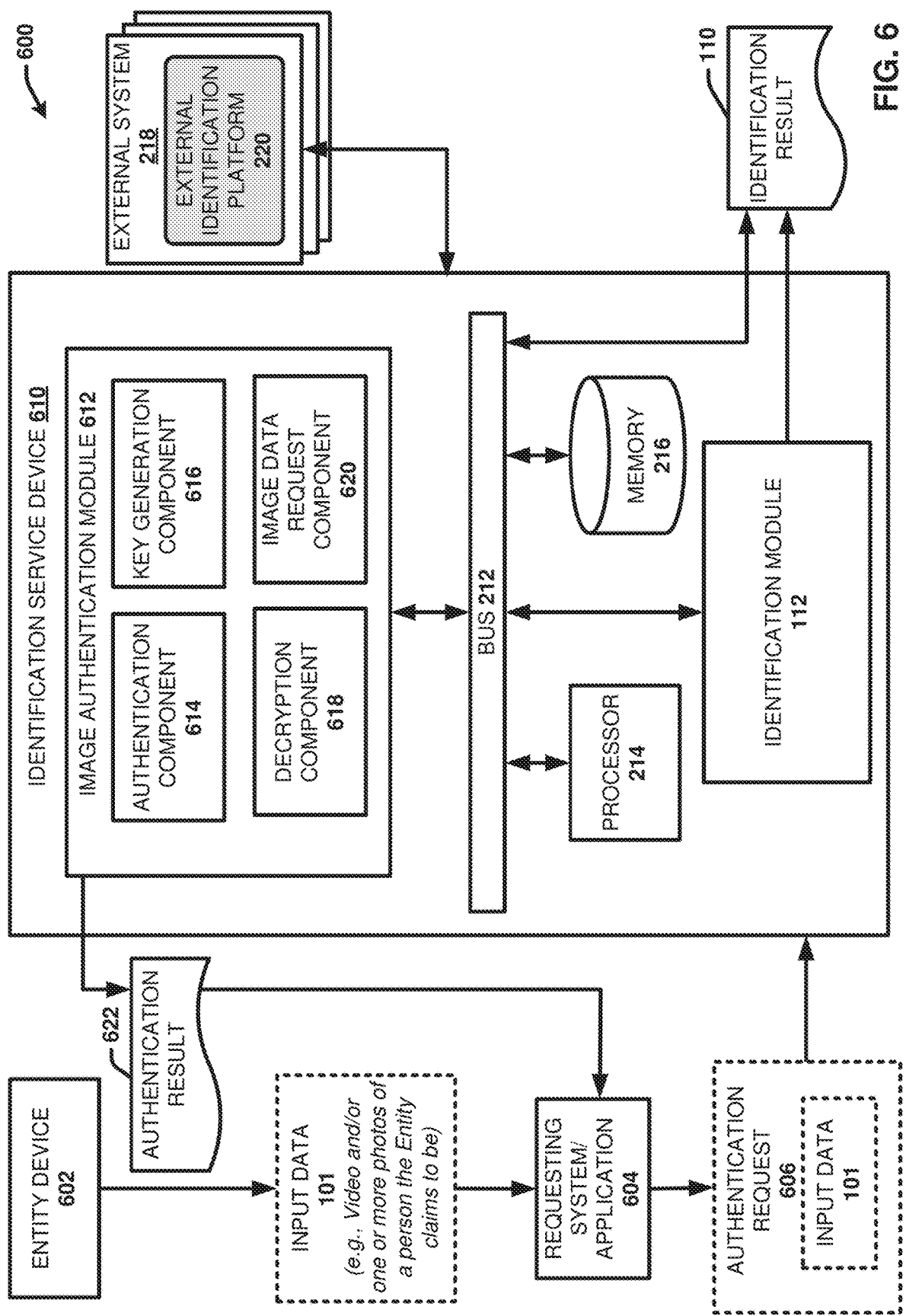
FIG. 6 presents an example, non-limiting system that facilitates authenticating an image in accordance with one or more embodiments of the disclosed subject matter.
Figure 7:
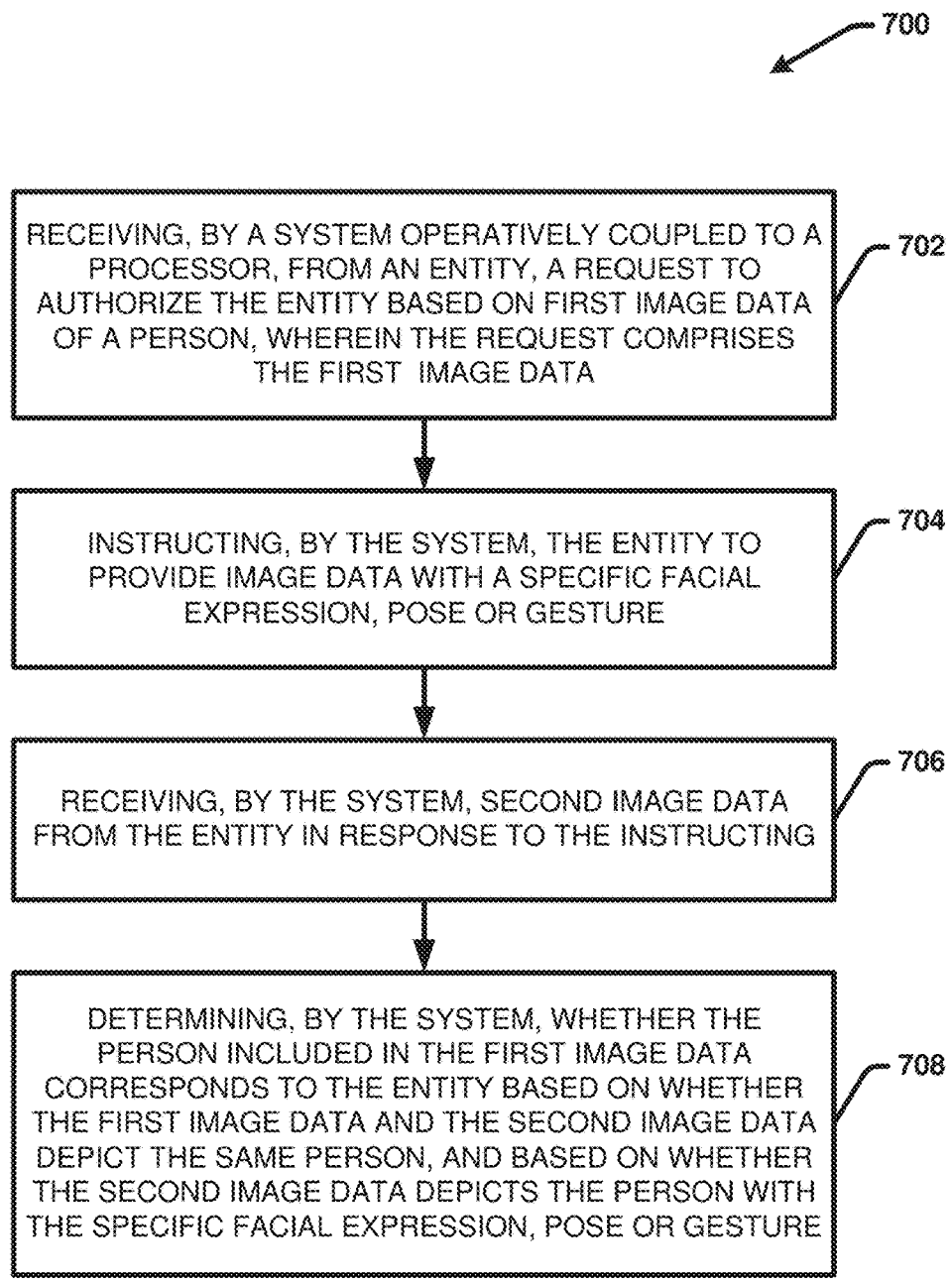
FIG. 7 illustrates an example, high-level flow diagram of a computer-implemented method for authenticating an image in accordance with one or more embodiments of the disclosed subject matter.

One or more embodiments described with reference to FIGS. 6 and 7 provide techniques for overcoming this problem and determining whether an entity submitting image data of a person for authorization/authentication purposes is in fact the person appearing in the image data.

FIG. 6 presents an example, non-limiting system 600 that facilitates authenticating an image in accordance with one or more embodiments of the disclosed subject matter. Similar to systems 100, 200 and 400, system 600 can include an identification service device 610. The identification service device 610 can include identification module 112 and provide same or similar features and functionalities as identification service device 104. The identification service device 610 can further include an image authentication module 612 to facilitate authenticating received image data in accordance with one or more techniques described herein. System 600 can further include an entity device 602, a requesting system/application 604, an authentication request 606, and an authentication result 622. Repetitive description of like elements employed in other embodiments described herein is omitted for sake of brevity.

In various embodiments, the entity device 602 can include a device associated with an entity submitting input data 101 to requesting system/application 604 for the purpose of authentication/authorization. In one or more embodiments, the input data 101 can include video and/or one or more photos of a person (e.g., the person the requesting entity claims to be). For example, in one implementation, the requesting system/application 604 can be a network accessible system/application that is remote from the entity device 602. In accordance with this example, the entity device 602 can obtain the input data 101 and submit the input data 101 to the requesting system/application 604 via a network. For instance, the entity device 602 can include a personal computing device associated with the entity, a public device associated with the requesting system/application, a computing device associated with another computing system or the like. In another example, the requesting system/application 604 can include a client application provided on/with the entity device 602 (e.g., a mobile application, a thin client application, etc.). According to this example, the entity device 602 may include a camera that is used to capture the input data 101 for submission. In yet another example, the entity device can include a device associated with the requesting system/application 604 at a physical location and including the camera used for capturing submitting the input data 101. For example, the entity device 602 can include a computing device associated with a surveillance system, a security system, an ATM machine, etc. and also including or otherwise coupled to the camera and the requesting system/application 604.

Regardless of the manner in which the requesting system/application 604 receives the input data 101 from the entity device 602 or the entity requesting authorization/authentication, the requesting system/application 604 can submit the input data 101 with an authentication request to the identification service device 610. The authentication request 606 can include information requesting the identification service device 610 determine whether the person appearing in the image data corresponds to the entity submitting the entity submitting requesting authorization (e.g., to access something or otherwise perform an action using the requesting system/application 604).

The reception component 202 of the identification module 112 can further receive the authentication request 606 and provide the authentication request 606 to the image authentication module 612 for processing to determine an authentication result 622. The authentication result 622 can include information stating or otherwise confirming whether the submitted image data is "authentic," meaning that the person appearing in the image data corresponds to the entity submitting the authentication request 606. In various embodiments, the identification module 112 can also process the input data 101 using the techniques described with reference to FIGS. 1-4 to generate an identification result 110 for the input data. As described above, the identification result 110 can include (but is not limited to): one or more unique and/or general identifiers for a person represented in the input data 101 (e.g., appearing in received image data 102 and/or otherwise represented by other data 103), one or more characteristics or attributes of the person (e.g., appearance characteristics, clothing features, predicted affinities, predicted affiliations, demographic characteristics, medical health history/status information, profile information and various other types of information that can be determined about a person represented in the input data 101 using the techniques described herein), a confidence score, and/or verification information. The image authentication module 612 can further use information included in the identification result 110 to facilitate authenticating an image included in the input data 101.

In this regard, the image authentication module 612 can include authentication component 614, key generation component 616, decryption component 618 and image data request component 620. The authentication component 614 can be configured to evaluate the image data 606 to determine whether the person included in the image data 606 corresponds to the entity submitting the image data 606 using one or more authentication techniques. In one embodiment, the authentication component 612 can determine whether the person included in the image data 606 corresponds to the entity based on recognition of a unique digital signature or artifact in the image data 606. For example, in one implementation of this embodiment, the requesting system/application 604 and/or the identification service device 610 can control or otherwise have an established trusted relationship with one or more capture devices including a camera that the entity is required to use to capture the input data 101.

For example, the camera can include a camera associated with a fixed physical location where the input data 101 is to be captured. In another example, the camera can include a camera on an entity device 602 that the requesting system/application 604 knows (e.g., via a unique identification number, serial number, etc. associated with the entity device 602 and/or the camera) and which the requesting system/application 604 has authorized as a trusted device for providing the input data 101. In accordance with either of these examples, the requesting systems/application 604 and/or the identification service device 610 can require the camera to imbed or otherwise attach a unique digital signature to the captured image data submitted for authentication. The authentication component 614 can thus determine whether the received image data was provided by trusted/authorized camera/device based on whether the image data includes the unique digital signature or artifact. This can ensure for example, that the submitted image data 606 was not captured or otherwise taken from an untrusted systems/device. In some embodiments, the image authentication module 612 and/or the requesting system/application 604 can further delete the received image data 606 after it has been authenticated or otherwise render the digitally signed image data unusable thereafter (e.g., apply another unique marking or artifact to the digitally signed image to indicate that it has been previously processed and submitted).

In some implementations, in addition to and/or alternative to using the digital signature/artifact included in the submitted input data 101 to ensure the image data is captured by a trusted device, the system 600 can further require the input data 101 be submitted with a time stamp indicating a capture time of the input data 101. This can ensure that the input data 101 is recently captured and thus representing the entity at the time of request for authorization (e.g., as opposed to taken from an image archive of pictures captured well into the past). The authentication component 614 can further authenticate the input data 101 based on the input data 101 being captured at a time coinciding with reception of the authentication request 606, or otherwise within a defined time frame or window relative to the time of reception of the authentication request 606.

In another embodiment, the authentication component 614 can determine the authenticity of a received image using digital signature technology. For example, the system 600 can have each client (or camera) digitally sign each image that it sends to the identification service device 610 with a key. Any camera that doesn't have the key will not be able to send image data to the identification service device 610 which can be decrypted. According to these embodiments, the authentication component 614 can determine whether the person included in the input data 101 corresponds to the entity based on an ability to decrypt the input data 101 using a first decryption key known only to the image authentication module (e.g., a master key). In this regard, the system 600 can require the trusted entity devices 602 (and/or cameras of the entity device 602) capturing and/or submitting the input data 101 to employ a secret encryption key/scheme to encrypt the input data 101, wherein the image authentication module 612 only authenticates the image data 606 based on an ability to decrypt the input data 101 using the first (e.g., the master) encryption key. With these embodiments, the image authentication module 612 can employ the key generation component 616 to generate a second encryption key and provide the second encryption key to the one or more trusted cameras/devices (e.g., those entity devices 602 registered with the system 600). The one or more trusted cameras/device can further be configured to encrypt the input data 101 captured from the one or more cameras using the second encryption key in association with submission of the input data 101. The image authentication module 612 can further include a decryption component 618 that decrypts the input data 101 using the first decryption key (e.g., the master key). With these embodiments, the authentication component 614 can also require the input data 101 be submitted with a timestamp and further authenticate the input data 101 based on the input data 101 being capable of being decrypted and captured at a time coinciding with reception of the authentication request 606, (or otherwise within a defined time frame or window relative to the time of reception of the authentication request 606).

In another embodiment, the image authentication module 612 can employ a methodology wherein the image authentication module requires the person submitting the input data 101 to perform a certain requested facial expression, pose, gesture, motion, etc. in the image data. The image authentication module 612 can include image data request component 620 to facilitate this methodology. For example, the image data request component 620 can randomly determine a specific facial expression, pose, gesture, motion, etc. for the person to perform in the input data 101 submitted for authorization/authentication. The image data request component 620 can further instruct the person to capture the image data with the requested facial expression, pose, gesture, motion, etc. For example, the image data request component 620 can instruct the person to submit an image captured of themselves with their right eye closed, with their right eye blinking three times (e.g., if video is submitted/required), with their left index finger on their nose, standing on one foot, performing the Macerana dance (e.g., if video is submitted/required), etc. Because the requested facial expression, pose, gesture, etc., is determined randomly at the time of submission, it would be difficult for a fraudulent entity to find stock image data (e.g., within a required time frame for submission) of the alleged person performing that requested facial expression, pose, gesture, etc. The authentication component 614 can further authenticate the image data if the received input data 101 depicts the person performing the requested facial expression, pose, gesture, motion, etc.

In some embodiments, to further ensure the submitted input data 101 depicts a person that is the actual person submitting the input data 101, the image data request component 620 can employ a two-step or three-step (or more) process that requires the person to submit two or more sets of input data 101. For example, in one implementation, the image authentication module 612 can receive a first image of a person in association with the authentication request. Based on receiving the first image, the image data request component 620 can further prompt the user to provide a second image of the same person in the first image performing the randomly determined facial expression, pose, gesture, motion, etc. The authentication component 614 can further authenticate the image data based on the person in the first image being determined to be the same person appearing in the second image, and the second image including the person performing the requested facial expression, pose, gesture, motion, etc.

In another embodiment, the image authentication module 612 can employ a proof of life process to determine the authenticity of a received image data by comparing multiple frames to each other and analyzing the similarities and differences (noise) between the photos. For example, the image authentication module 612 can compare multiple photos to each other to check for other differences like size, and angle of face, searching for slight differences, to ensure that the image is not fake.

FIG. 7 illustrates an example, high-level flow diagram of a computer-implemented method 700 for authenticating an image in accordance with one or more embodiments of the disclosed subject matter. Repetitive description of like elements employed in other embodiments described herein is omitted for sake of brevity.

At 702, a system operatively coupled to a processor (e.g., system 600) can receive from an entity, a request to authorize the entity based on first image data of a person, wherein the request comprises the first image data. At 704, the system can instruct the entity to provide image data with a specific facial expression, pose or gesture. At 706, the system can receive second image data from the entity in response to the instructing. At 708, the system can determine whether the person included in the first image data corresponds to the entity based on whether the first image data and the second image data depict the same person and based on whether the second image data depicts the person with the specific facial expression, pose, or gesture.

III. Security Access Control

Figure 8:
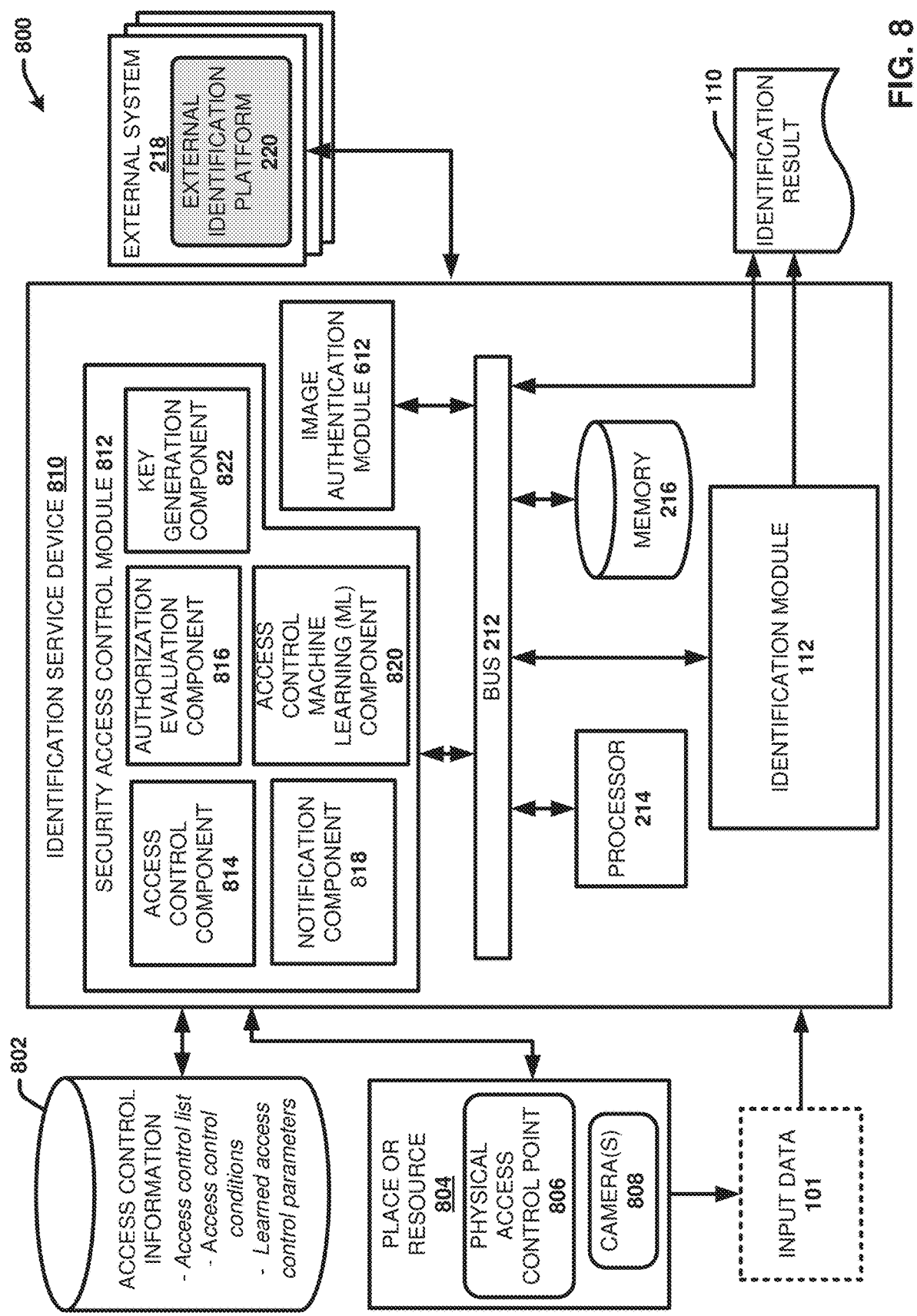
FIG. 8 presents an example, non-limiting system that provides security access control using a combination of independent identification technologies and/or platforms in accordance with one or more embodiments of the disclosed subject matter.
Figure 9:
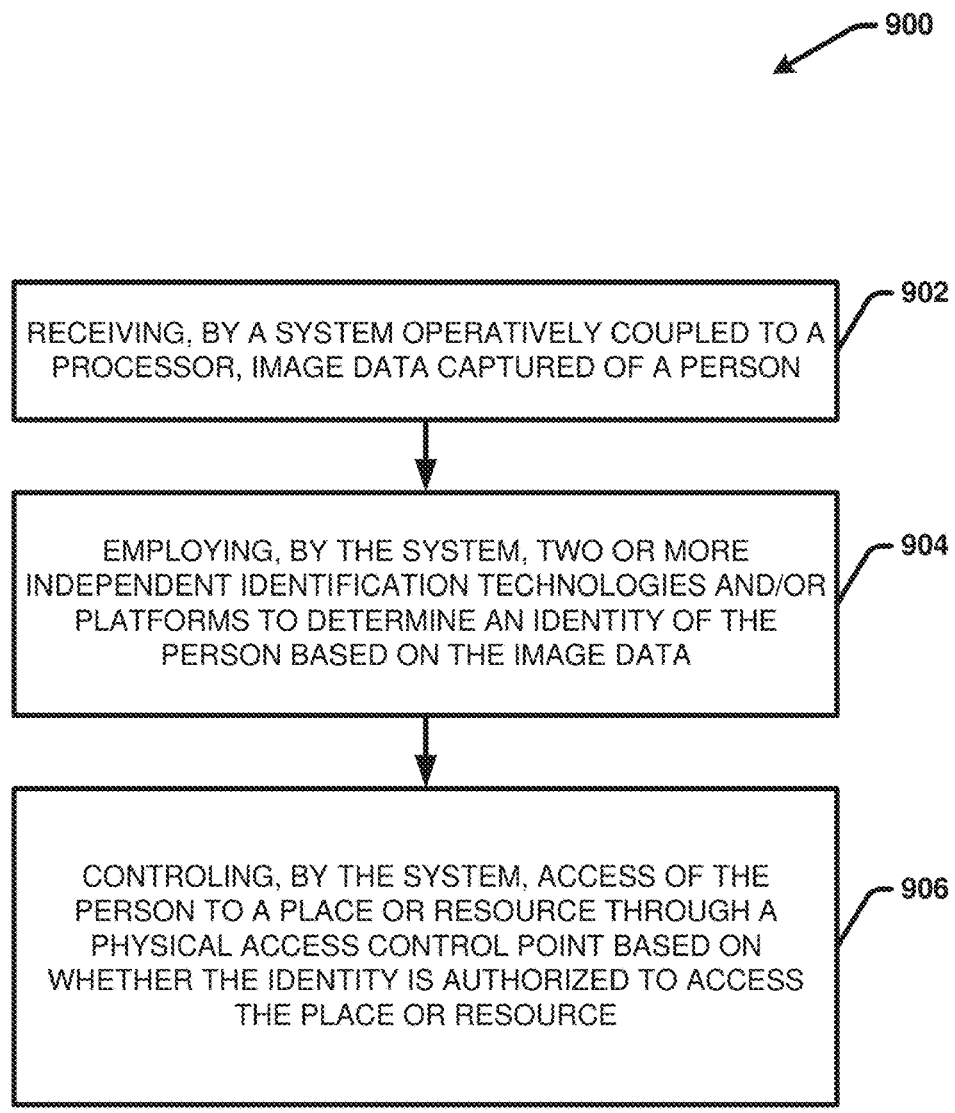
FIG. 9 illustrates an example, high-level flow diagram of a computer-implemented method for performing security access control using a combination of independent identification technologies and/or platforms in accordance with one or more embodiments of the disclosed subject matter.

One or more embodiments described with reference to FIGS. 8 and 9 provide techniques for controlling access to physical places or resources (e.g., houses, buildings, properties, safes, weapons, devices, etc.) using a combination of independent identification technologies and/or platforms (as discussed with reference to FIGS. 1-4) to authenticate/authorize the entity for access.

For example, the in various embodiments, multi-recognition technology can be used to identify people authorized for access/entry (or not) at any point of ingress or egress controlled by a physical locking barrier (e.g., a door, a gate, an invisible electric fence, etc.). The disclosed systems can further control access (e.g., allow access or deny access) based on whether the person is determined to be authentic and authorized using the multi-recognition techniques described herein. For example, the disclosed systems can automatically lock or unlock a door, gate, etc., based on whether the person is determined be authorized or not. The discloses systems can also control non-physical barriers such as infrared sensor barriers (e.g., such as those used on garage doors), electric fences and the like by deactivating or activating these barriers according to access authorizations. The disclosed systems can also generate an alarm, notification or the like in implementations in which an unauthorized person passes through such non-physical barriers. The system can further generate and send alarms and/or notifications to the appropriate entities (e.g., home-owner, security guard, police, etc.), based on granting or denying entry to an entity, including alarms regarding attempted unauthorized entries. The alarm/notification can also include information identifying the reason for authorizing or denying entry.

Similar techniques can also be applied to accessing physical resources and/or devices for use by a person. For example, depending on the type or resource or device, the system can prevent the resource or device from working or operating (e.g., prevent a weapon from activation) based on whether the person is determined to be authorized to use the device or resource.

The disclosed techniques can also be used to evaluate authorization based on specific identities and/or based on one or more characteristics identified for a person and/or context of access. For example, in some implementations, a system can employ defined access control information that includes one or more access control lists that identify specific entities (e.g., by name, identification number, etc.) that are authorized for accesses (or not authorized for access). The system can further authorize or deny access based on whether the person requesting access is accurately identified based on received image data and optionally other data (e.g., biometric, sound, etc.) and listed as authorized for access (or not).

In other implementations, the system can identify characteristics about a person/entity requesting access and determine whether to grant or deny access based on their profile/characteristics determined using the techniques described with reference to FIGS. 1-4. For example, the system can determine whether to grant or deny access based on a determination as to whether they work for an authorized company allowed for access (e.g., based on their uniform or attire), whether they appear suspicious or not (e.g., based on their attire, gait, facial expression, behavior, etc.), whether they are carrying or otherwise associated with an appropriate object (e.g., a package for delivery by the man in the mailman uniform), or inappropriate object (e.g., a weapon, a carjack, etc.), and the like. In this regard, the system can automatically lock a door if a person enters the property carrying weapon (e.g., a gun), if the person is a registered sex offender and the facility has children there, and the like. In another example, the system can automatically prevent access of a student to a particular building or room at a school if the student has graduated and thus no longer has authorization to access that particular building or room.

In another example, the system can determine whether to grant or deny access based on a health status of the patient (e.g., as provided in identity/profile information database 318A and/or one or more identity/profile information databases 318B, such as an electronic health record database or the like). For example, the health status of the person can include whether the person is currently sick, whether the person has a fever (e.g., as determined based on thermal imaging data included in the input data 101 or another manner), whether the person has tested positive or negative for a particular virus, whether the person has a particular health condition or disease, and the like.

The disclosed systems can also combine multi-recognition technology (e.g., facial recognition, text recognition, object recognition, gait recognition, etc.), to verify an employees' employment status and company logo (e.g., on uniform) to unlock the doors or to let drivers drop packages for delivery. The system can also employ access control information defining conditions for access, such as contextual conditions regarding time of access, duration of access, other individuals accompanying the person (e.g., cannot access the door if with an authorized person, etc.) to further regulate access. For example, in one implementation, the system can allow a delivery person to enter physical location or building and have a limited time span to drop off a package and then lock the door behind them. If these conditions are not met, the system can generate an alert to the appropriate entities. For example, the system can alert a home-owner with a picture of the delivery person that failed to abide by the access control regulations and be prompted with an option to send to the information to local authorities for investigation/apprehension. Notice can be given to the home-owner via text and/or phone, or another suitable mechanism.

With these example implementations in mind, FIG. 8 presents an example, non-limiting system 800 that provides security access control using a combination of independent identification technologies and/or platforms in accordance with one or more embodiments of the disclosed subject matter. Similar to systems 100, 200, 400, and 600, system 800 can include an identification service device 810 that includes an identification module 112. The identification service device 810 can also include an image authentication module 612. In this regard, the identification service device 810 can provide same or similar features and functionalities as identification service device 104 and/or identification service device 610. The identification service device 810 can further include security access control module 812 to facilitate security access control in accordance with one or more techniques described herein. System 800 can further include access control information 802, one or more physical places or resources 804 to which access is controlled. Repetitive description of like elements employed in other embodiments described herein is omitted for sake of brevity.

The security access control module 812 can include an access control component 814, an authorization evaluation component 816, a notification component 818, an access control machine learning (ML) component 820 and a key generation component 822. In some embodiments, the access control component 814 can be configured to control permitting or denying access to a physical place or resource 804 including at least one physical access control point 806 (e.g., a door, a gate, a lock, an activation/deactivation component, etc.). In this regard, the physical place or resource can include essentially any place or thing that has a physical access control point 806 that can be automatically locked/unlocked or otherwise activated/deactivated (via an electronic signaling mechanism) by the access control component 814. In some embodiments, the physical access control point 806 can also include an invisible fence or the like. For example, the access control module 812 can also control non-physical barriers such as infrared sensor barriers (e.g., such as those used on garage doors), electric fences and the like by deactivating or activating these barriers according to access authorizations. The access control module 812 can also generate an alarm, notification or the like in implementations in which an unauthorized person passes through such non-physical barriers.

The physical place or resource 804 can further include or be operatively coupled to one or more cameras 808 that capture input data 101 at the place or resource 804. The input data 101 can include for example, live or recorded video and/or still images (e.g., captured at defined points in time, captured in response to activation of the camera in response to motion sensor detection or another detection means, etc.) at the physical place or resource.

In various implementations, the images can include image data of a person or persons for the purpose of granting or denying access of the person or persons or the physical place or resource 804. For example, with respect to home security, the cameras 808 can include one or more cameras positions outside and/or inside the home with a view of the entry/exit door (or doors). In another example, with respect to a school or university campus, the cameras 808 can include cameras around the perimeter of the campus property, cameras with view of the entry/exit points, cameras inside the campus, etc. In association with a device or resource, the cameras 808 can include a camera physically coupled to the device or external to the device or resource with a viewpoint of the device or resource.

The access control information 802 can include information such as defined access control lists, access control conditions and/or learned access control parameters for automatically granting or denying access of an entity (e.g., a person, a group of people, a robot, a drone, etc.) to a physical place or resource 804. In this regard, the access control information 802 can identify (e.g., by name or another unique identifier), specific entities authorized or unauthorized for access, and optionally conditions regarding access. The access control information 802 can also include information regarding characteristics of entities that are authorized for access or not. In this regard, even though an entity may not be specifically identified by name or another unique identifiers, the access control information can anonymously identify profiles or characteristics of entities authorized or unauthorized for access (e.g., anyone wearing a certain badge, anyone under the age of x, anyone over the age of y, anyone not carrying a certain object, anyone carrying a certain object, anyone fitting profile XYZ, etc.).

In various embodiments, the reception component 202 of the identification module 112 can receive input data 101 captured of a person at or near the place or resource 804. The identification module 112 can further process the input data 101 using the techniques described with reference to FIGS. 1-4 to generate an identification result 110 for the input data 101. As described above, the identification result 110 can include (but is not limited to): one or more unique and/or general identifiers for a person represented in the input data 101 (e.g., appearing in received image data 102 and/or otherwise represented by other data 103), one or more characteristics or attributes of the person (e.g., appearance characteristics, clothing features, predicted affinities, predicted affiliations, demographic characteristics, medical health history/status information, profile information, and various other types of information that can be determined about a person represented in the input data 101 using the techniques described herein), a confidence score, and/or verification information. The security access control module 812 can further use information included in the identification result 110 to facilitate security access control measures.

In this regard, in one or more embodiments, the access control component 814 can control access of the person to the place or resource 804 through a physical access control point 806 (e.g., a door, a gate, or another physical barrier) based on whether the identity (e.g., as determined in the identification result 110) is authorized to access the place or resource (e.g., as determined based on the access control information 802). The access control component 814 can further control the access based on a confidence score included in the identification result 110. For example, in some implementations, the access control information 802 can define a threshold or criterion for the identity confidence score for allowing access to the place or resource 804. In this regard, the access control component can grant or deny access based on the confidence score meeting the threshold or otherwise satisfying the criterion. Different confidence score criterion can be applied for different identities, identity types/roles, different identity characteristics, different places or resources, and the like.

In various embodiments, the authorization evaluation component 816 can determine whether an entity identified in the input data 101 is authorized to access the physical place or resource (or not) based on the access control information 802. For example, the authorization evaluation comment 816 can determine whether the identified identity is authorized to access the place or resource based on whether the identity is listed as an authorized or unauthorized entity in a predefined access control list. In another implementation, the identification module 112 can employs object recognition technology to identify one or more objects associated with the person based on the input data 101. The authorization evaluation component 816 can further determine whether the person is authorized to access the place or resource based on the one or more objects. For example, the authorization evaluation component 816 can determine the person is unauthorized to access the place or resource based on a determination that the one or more objects comprises a weapon (e.g., as defined by access control conditions in the access control information 802). The access control component 814 can further prevent access of the person to a place or resource through the physical access control point 806 based the person being determined to be unauthorized (e.g., by automatically locking the door, or the like).

In another implementation, the authorization evaluation component 816 can determine one or more contextual conditions associated with providing the person access to the place or resource based on the identity (e.g., as defined by access control conditions in the access control information 802), and the access control component can restrict the access of the person to a place or resource through the physical access control point based on the one or more conditions and defined access denial and authorization criteria for the one or more conditions. For example, the one or more contextual conditions can comprise a time restriction regarding a time or duration authorized for the access by the person. In another example, the one or more contextual conditions can include a current health status of the person (e.g., whether the person is sick, has a fever, etc.).

The notification component 818 can further provide suitable notification and/or alarms based on whether access is granted and/or denied to an entity. For example, the notification component 818 can generate a notification when an unauthorized entity attempts to gain access and is denied. The notification component 818 can similarly generate a notification or alarm when an unauthorized person gains access (e.g., via crossing an electric fence or the like). In another example, the notification component 818 can generate a notification informing a property owner or device owner that the property has been accessed by a particular entity and/or the device has been activated for use by a particular entity. In either of these examples, the notification can identify the entity and/or include the image data captured of the entity.

In various embodiments, the security access control module 812 can include access control machine learning (ML) component 820 to provide various artificial intelligence (AI) based analytics associated with security access control management by the security access control module 812. In some embodiments the access control ML component 820 can learn/generate one or more components of the access control information 802 using one or more machine learning techniques. For example, based on evaluating the historical input data 101 received over time regarding the activity at a place or resource 804 (or similar places/resources), the access control ML component 820 can learn information regarding specific entities authorized/unauthorized for access, specific profiles/characteristics of entities authorized/unauthorized for access, specific conditions/contexts associated with authorizing and/or denying access and the like. For instance, the access control ML component 820 can extract information that is indicative of correlations, inferences and/or expressions from historical input data 101 captured at the physical place or location over time that tracks entities that come and go, entities that are authorized or unauthorized to access the physical place or resource 804 (or similar physical places or resources), contextual parameters associated with when certain entities are authorized or unauthorized to access the physical place or resource 804, and the like, based on principles of artificial intelligence. The access control machine learning component 820 can further automatically generate and/or update the access control information 802 based on the learned correlations, inferences and/or expressions. In this regard, the access control ML component 820 can automatically learn access control parameters regarding what entities or characteristics of entities that can access a particular place or resource, when (e.g., specific times, specific contexts, etc.) the entities can access the particular place or resource, and the like. The access control component 814 can further control access to the physical place or resource 804 (e.g., by locking/unlocking the physical access control point 806) based on the learned access control parameters.

In an aspect, the access control ML component 820 can perform learning with respect to the historical image data captured at the physical place or resources 804 (or a similar physical place or resource) explicitly or implicitly. The access control ML component 820 can also employ an automatic classification system and/or an automatic classification process to facilitate learning the access control parameters. For example, the access control ML component 820 can employ a probabilistic and/or statistical-based analysis (e.g., factoring into the analysis utilities and costs) to learn and/or generate inferences regarding the access control lists, the access control conditions, and the like. The access control ML component 820 can employ, for example, a support vector machine (SVM) classifier to learn and/or generate inferences regarding the access control information 802. Additionally, or alternatively, the access control ML component 820 can employ other classification techniques associated with Bayesian networks, decision trees, regression models, neural network models, and/or probabilistic classification models. Classifiers employed by the access control ML component 820 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence (class).

In an aspect, the access control ML component 820 can include an inference component (not shown) that can further enhance automated aspects of the access control ML component 820 utilizing in part inference-based schemes to facilitate learning and/or generating inferences regarding the access control information. The access control ML component 820 can employ any suitable machine-learning based techniques, statistical-based techniques and/or probabilistic-based techniques. For example, the access control ML component 820 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the access control ML component 820 can perform a set of machine learning computations associated with analysis of historical input data 101 captured at the physical place or resource 804 and/or previously defined access control information 802 for the physical place or resource 804 to determine new and/or updated data for the access control information 802. For example, the access control ML component 820 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, Gaussian mixture model machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

The key generation component 822 can provide for generating access keys or access key codes based on captured image data of a person. The access keys and/or access key codes can further be employed to gain access to a place or resource 804 via the physical access control point 806 (for a defined duration of time until the expire). The access control component 814 can further control locking/unlocking and/or activation/deactivation of the physical access control point 806 based on usage of the access key or access code. For example, in one implementation, a person's face can be used to create an access key or token that is unique as the person's face. In this regard, a person can create a token that can be used to identify their face. They could then send the token plus facial image data to a person having control/ownership of a physical resource they would like to access, such as house they are renting. The owner of the house can then use enable the person to use the token/face as a key to enter the house for the rental period based on authenticating the image data with the person's name, identifier, etc.

FIG. 9 illustrates an example, high-level flow diagram of a computer-implemented method 900 for performing security access control using a combination of independent identification technologies and/or platforms in accordance with one or more embodiments of the disclosed subject matter. Repetitive description of like elements employed in other embodiments described herein is omitted for sake of brevity.

At 902, a system operatively coupled to a processor (e.g., system 800) can receive image data captured of a person. At 904, the system can employ two or more independent recognition technologies and/or platforms to determine an identity of the person based on the image data. At 906, the system can control access of the person to a place or resource through a physical access control point based on whether the identity is authorized to access the place or resource.

IV. Security Monitoring

Many security/surveillance systems employ cameras to monitor a physical location or area, such as a home, a store, an office building, etc., based on a live or recorded image feed captured of the physical location/area over time. However, these systems either require a manual security monitor to watch the video feed in real-time and/or only allow the owner of the video footage to go back and look at the recording to identify targeted activity after it has occurred.

The disclosed subject matter provides techniques for employing multiple different identification technologies and/or identification platforms to facilitate monitoring a physical place, location or property for the purpose of security, safety or the like. In this regard, in one or more embodiments, using the identification techniques discussed with reference to FIGS. 1-4, specific entities (e.g., people, robots, drones, etc.) can be identified as being either not authorized or to be located at or near the physical location and/or "potentially" not authorized. For example, entities not authorized to be located at or near a particular place and/or location can include individuals identified in defined access control lists (e.g., registered sex offenders at or near areas with children, people under protection orders not authorized to be in certain locations near another person, etc.). In another example, those entities that may be considered "potentially" not authorized can include entities that that have suspicious characteristics and/or are not recognized as visiting the place or location before. In some implementations, entities identified as being "potentially" not authorized can be flagged as "person of interest."

Based on detecting an unauthorized entity and/or a "person of interest," the disclosed systems can perform various appropriate responses as determined based on the place and/or context. For example, in some implementations, a notification/alarm can be generated and/or provided to a suitable entity regarding the unauthorized entity or person of interest. The notification/alarm can further include information about the entity/person. In another implementation, the system can employ the access control techniques discussed above with reference to FIGS. 7-8 and automatically prevent (e.g., via locking and/or deactivating) the entity/person from accessing certain rooms, areas, devices, resources etc.

For example, in one implementation, the disclosed techniques can be employed to monitor a home to identify suspicious people that may not be authorized and/or are not authorized to be located at or near the home. This can include specifically identified entities (e.g., by name, identifier, etc.), as well as entities identified with certain profiles and/or characteristics. The home-owner and/or authorities can further be notified regarding the person of interest, and in some implementations, be provided with information identifying the person (e.g., the captured image data). In another implementation, motion/acoustic sensors and/or some other type of sensor can recognize activity at or near a property and then activate a camera to capture image data of the person. If a face or entity is not recognized/detected within a defined timeframe, the system can then initiate another response, such as sounding an alarm, notifying authorities, etc.

The disclosed techniques can also be employed to identify and/or track certain people and/or people of interest as recognized in image data captured at various locations, properties, areas, etc. For example, known criminals and/or missing persons can be identified based on using a combination of recognition technologies (e.g., facial recognition, object recognition, text, gait, etc. of the entity) and/or using different identification platforms/systems, as described with reference to FIGS. 1-4. Persons of interest can also include individuals with a defined characteristic or attribute or combination of traits/characteristic. For example, a person of interest could be defined as person carrying a virus, a person carrying antibodies for the virus, a person under the age of 18 carrying antibodies for the virus, etc. In this regard, the system can be provided with relevant information, such as but not limited to: a description of the characteristics of the person of interest, one or more images of the person of interest, a description of one or more objects associated with the person of interest (e.g., a weapon, clothing/accessories worn, a vehicle driven/license plate number, etc.). Using this information, the system can employ multiple identification technologies and/or platforms to identify persons of interest.

The disclosed techniques can also be employed to monitor and identify safety threats/violations at physical locations/places based on captured image data and identification of persons and objects in the image data. For example, the disclosed techniques can be used to recognize a young child using facial recognition and a pool using object recognition. The disclosed techniques can further determine if a safety threat exists based on detection of the child being located within a defined distance from the pool.

In another example, the system can employ machine learning techniques to learn activity at a location or place to facilitate identifying unusual situations, entities/persons of interest, and the like. For example, the system can learn who regularly comes in and out of a building during different times of the day/week, recognizes the people who work/live there, recognize the mail man and delivery driver, recognize the pool guy and the friendly neighbor, etc. The system can further identify entities that are unusual, have suspicious characteristics, and/or have not been recognized before and flag these people as persons of interest. The system can also consider context parameters/cues when evaluating whether an entities presence is suspicious at a particular based on the current context (e.g., the time of day/day of week, other people associated with and/or accompanying the person of interest, behavior of the person, the gait of the person, etc.). For example, the system can recognize information such as: 1. new person came in a 2 am, alone, 2. a person we recognize is with one or more other people we don't recognize and seems frightened, 3. a suspicious person wearing a mask, carrying a weapon, discussing a theft operation (assuming the system receives and processes a sample), etc.

The system can also facilitate rendering information to security guards/monitors to facilitate their manual monitoring tasks (e.g., watching live security monitors). For example, many office buildings and similar facilities have a central monitoring system that captures and provides live video feeds from one or more cameras located at the facility and presents the live video feeds. These live video feeds are generally presented to a guard or watchman for manual monitoring in real-time. With the disclosed techniques, the system can automatically identify unauthorized individuals and/or people of interest using multiple recognition technologies/platforms in the captured video/image data without requiring manual input. The system can further flag or highlight those individuals with visual tags in the display monitors, and/or notify security guards or another suitable entity, or the like. For example, in one implementation, the system can display the captured image data (e.g., video) in a fully immersed environment via a virtual reality administration monitor/panel. The system can further employ eye tracking software to monitor the eyes of the guards viewing the display to make sure the guards are on task, tracking the person of interest, still awake, etc. This will help security guards who are expected to monitor many monitors/camera viewpoints at the same time to focus on those image feeds that are most important (e.g., depicting a person of interest) and/or help the security guards to pick up on suspicious activity they might otherwise miss.

Figure 10:
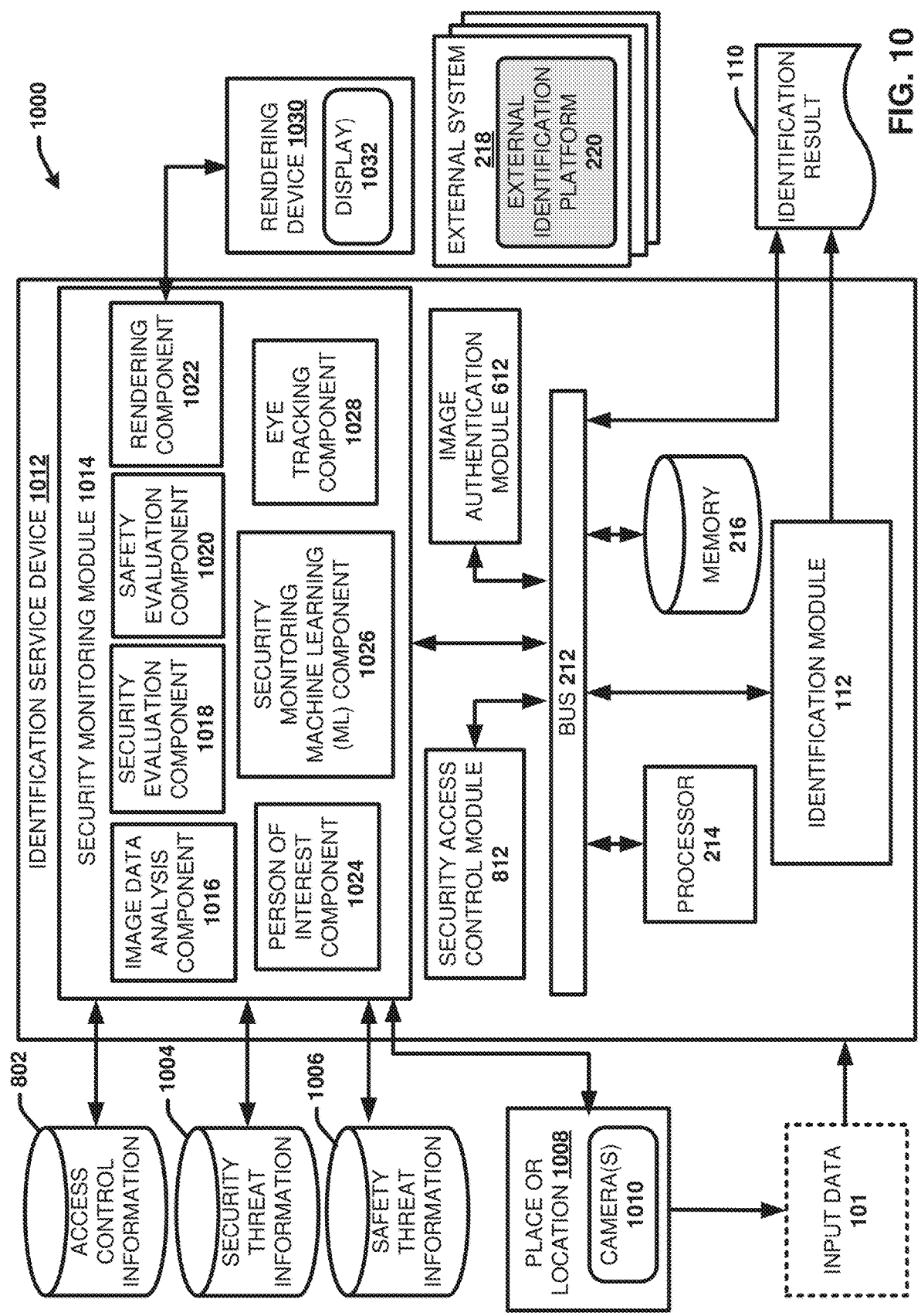
FIG. 10 presents an example, non-limiting system that provides security monitoring using a combination of independent identification technologies and/or platforms in accordance with one or more embodiments of the disclosed subject matter.

With these example implementations in mind, FIG. 10 presents an example, non-limiting system 1000 that provides security monitoring using a combination of independent identification technologies and/or platforms in accordance with one or more embodiments of the disclosed subject matter. Similar to systems 100, 200, 400, 600 and 800 system 1000 can include an identification service device 1012 that includes identification module 112. The identification service device 1012 can also include the image authentication module 612, and the security access control module 812. In this regard, the identification service device 1012 can provide same or similar features and functionalities as identification service device 104, identification service device 610 and/or identification service device 810. Repetitive description of like elements employed in other embodiments described herein is omitted for sake of brevity.

The identification service device 1012 can further include security monitoring module 1014 to facilitate monitoring security and/or safety threats/violations at a physical place or location based on received input data 101 in accordance with one or more techniques described herein. System 1000 can further include access control information 802, security threat information 1004, safety threat information 1006, one or more physical places or location 1008 that are monitored via one or more cameras 1010, and a rendering device 1030 including at least one display 1032.

In one or more embodiments, the reception component 202 can receive input data 101 (e.g., image data 102 and/or other data 103) captured at a physical location or place 1008 via one or more cameras 1010 (or other capture devices) located at the physical location or place 1008. The security monitoring module 1014 can further monitor activity at the physical location based on the input data 101. In this regard, the security monitoring module 1014 can comprise an image data analysis component 1016 that evaluates the image data using two or more independent identification technologies and/or platforms to identify people included in the image data and characteristics of the people. For example, in various implementations, the image data analysis component 1016 can employ the internal identification platform 204 of the identification module 112 and/or one or more external identification platforms 120 to evaluate the input data 101 using the techniques described with reference to FIGS. 1-4 to determine an identity, profile and/or characteristics of person, place or thing represented in the input data 101. Additionally, or alternatively, the image data analysis component 1016 can direct the identification module 112 to generate an identification result for received input data 101 and the image data analysis component 1016 can analyze the information included in the identification result. For example, in implementations in which the input data 101 comprises video, the image data analysis component 1016 can direct the identification module 112 to generate identification result 110 information identifying/describing people and/or objects depicted in respective segments or frames (or x number of frames) of the video.

The security monitoring module 1014 can further comprise a security evaluation component 1020 that determines whether the physical location is associated with a security threat based on the characteristics of the people/objects represented in the input data 101 and the access control information 802 and/or defined security threat information 1004 that identifies unauthorized entities, persons of interest, characteristics of persons of interest, normal activity, abnormal activity, conditions for declaring a security threat, and the like. The security monitoring module 1014 can further employ a notification component (e.g., notification component 818 of the security access control module 812) to generate a notification or alarm based on a determination that the physical location is associated with the security threat. For example, in some implementations, the image data analysis component 1016 can employ the two or more independent identification technologies and/or platforms to determine identities of the people, and the security evaluation component 1018 can determine whether the location is associated with the security threat based on whether an identity of the identities is unauthorized to access the physical location (e.g., as determined based on the access control information 802). With these implementations, the security monitoring module 1014 can employ the authorization evaluation component 816 of the security access control module 812 to facilitate determining whether the identity is authorized to access the physical location based on whether the identity is listed as an authorized or unauthorized entity in a predefined access control list.

In another implementation, the two or more independent identification technologies can comprise an object recognition technology and the image data analysis component 1016 can employ the object recognition technology to identify one or more objects respectively associated with the people based on the image data (e.g., using the internal identification platform 204 and/or one or more external identification platforms 220). The security evaluation component 1018 can further determine whether the physical location is associated with the security threat based on the one or more objects. For example, the security evaluation component 1018 can determine whether the physical location is associated with the security threat based on whether the one or more objects comprises a weapon and whether the weapon is associated with a person that is unauthorized to carry the weapon (e.g., as defined in the security threat information 1004).

In one or more additional embodiments, the security monitoring component 1014 can include safety evaluation component 1020 to determine whether the physical location is associated with a safety violation based on the characteristics of an identified entity/person and the one or more objects (e.g., based on defined safety threat conditions/ contexts included in the safety threat information 1006). For example, the safety evaluation component 1020 can determine whether the physical location is associated with the safety violation based on whether the one or more objects comprise an object classified a harmful to a person identified in the image data. In another example, the safety evaluation component 1020 can determine, based on one or more characteristics of a person included in the image data, that the person is in danger and thus the physical location is associated with the safety violation based on a location of the person relative to one or more objects determined to be harmful to the person. For instance, the safety evaluation component 1020 can determine based on analysis of the input data 101 (e.g., using facial recognition, object recognition, text recognition, gate recognition, etc.) that a young child in the image data is located within five feet of a pool and a guardian is not present or paying attention (e.g., based on gaze detection/analysis) to the child. The safety evaluation component 1020 can thus characterize the scenario as a safety violation/threat and initiate an appropriate response (e.g., sound an alarm, notify the guardian, notify authorities, etc.). In this regard, the security evaluation component 1018 and/or the safety evaluation component 1020 can respectively determine whether a security/safety threat exists at the location based on the characteristics of the people and a current context at the location (e.g., regarding time of day, day of week, who is at the location, their current activity at the location, etc.).

In some implementations, the security monitoring module 1014 can also include a person of interest component 1024 that identifies a person of interest included in the image data 102 based on one or more characteristics associated with the person (e.g., whether the person is identified as a person of interest in an existing database, whether the person is carrying a weapon, whether the person is located in or attempting to gain access to an authorized area, whether the person is wearing a disguise, whether the person is exhibiting suspicious behavior, etc.). In accordance with these implementations, based on identification of the person of interest, the security evaluation component 1018 can track the person in the input data 101 as the image data is received over a period of time during which the person remains at the physical location (e.g., and moves about the physical location). The security monitoring module 1014 can further include a rendering component 1022 that renders the image data to an entity (e.g., a security guard/monitor) via a display 1032 at a rending device 1030 (e.g., a monitor, an augmented reality (AR) device, a virtual reality (VR) device, etc.). In association with rendering the image data the rendering component 1022 and/or the rendering device 1030 can highlight the person in the image data (e.g., with a highlight color, ghosting or graying out other elements/ people in the displayed imaged, overlaying a tag or marker on the person, etc.). In some implementations, security monitoring module 1014 can further comprise an eye tracking component 1028 that tracks whether the user (e.g., the security guard/monitor) is visually tracking the person in the image data (e.g., to determine whether the security guard/ monitor is paying attention and has noticed the person of interest in the image data).

In various embodiments, the security monitoring module 1014 can include security monitoring machine learning (ML) component 1026 to facilitate various AI based analytics associated with security monitoring by the security monitoring control module 1014. In some embodiments, the security monitoring ML component 1026 can learn/generate one or more components of the security threat information 1004 and/or the safety threat information 1006 based on analysis of historical input data 101 captured at the place or location 1008 and/or similar places or locations and previously defined access control information 802, previously defined security threat information 1004 and/or previously defined safety threat information. For example, the security monitoring ML component 1026 can learn activity patterns of known people with known identities and/or known characteristics that visit the place or location 1008 using one or more machine learning techniques. The security evaluation component 1018 and/or the safety evaluation component 1020 can further determine whether the physical location is associated with a security/safety threat based on identification of unusual activity that deviates from the consistent activity patterns using machine learning and/or artificial intelligence (AI). In this regard, the security monitoring ML component 1026 can facilitate employing AI to determine or infer whether a security/safety threat exists at the place or location 1008 based on based on the characteristics of the people and a current context at the location (e.g., regarding time of day, day of week, who is at the location, their current activity at the location, etc.) as determined based on the input data 101.

In an aspect, the security monitoring ML component 1026 can perform learning with respect to the historical input data 101 (e.g., past video and/or image data) captured at the place or location 1008 (or a similar place or location) explicitly or implicitly. The security monitoring ML component 1026 can also employ an automatic classification system and/or an automatic classification process to facilitate learning the access control parameters. For example, the security monitoring ML component 1026 can employ a probabilistic and/or statistical-based analysis (e.g., factoring into the analysis utilities and costs) to learn and/or generate inferences regarding the security threat information 1004, the safety threat information 1006, and the like. The security monitoring ML component 1026 can employ, for example, a support vector machine (SVM) classifier to learn and/or generate inferences regarding the security threat information 1004 and the safety threat information 1026. Additionally, or alternatively, the security monitoring ML component 1026 can employ other classification techniques associated with Bayesian networks, decision trees, regression models, neural network models, and/or probabilistic classification models. Classifiers employed by the access security monitoring ML component 1026 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence(class).

In an aspect, the security monitoring ML component 1026 can include an inference component (not shown) that can further enhance automated aspects of the security monitoring ML component 1026 utilizing in part inference-based schemes to facilitate learning and/or generating inferences regarding the access control information. The security monitoring ML component 1026 can employ any suitable machine-learning based techniques, statistical-based techniques and/or probabilistic-based techniques. For example, the security monitoring ML component 1026 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the security monitoring ML component 1026 can perform a set of machine learning computations associated with analysis of historical input data 101 captured at the place or location 1008 and/or previously defined security threat information 1004 and/or safety threat information 1006 for the place or location to determine new and/or updated security threat information and/or access control information. For example, the security monitoring ML component 1026 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, Gaussian mixture model machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

Figure 11:
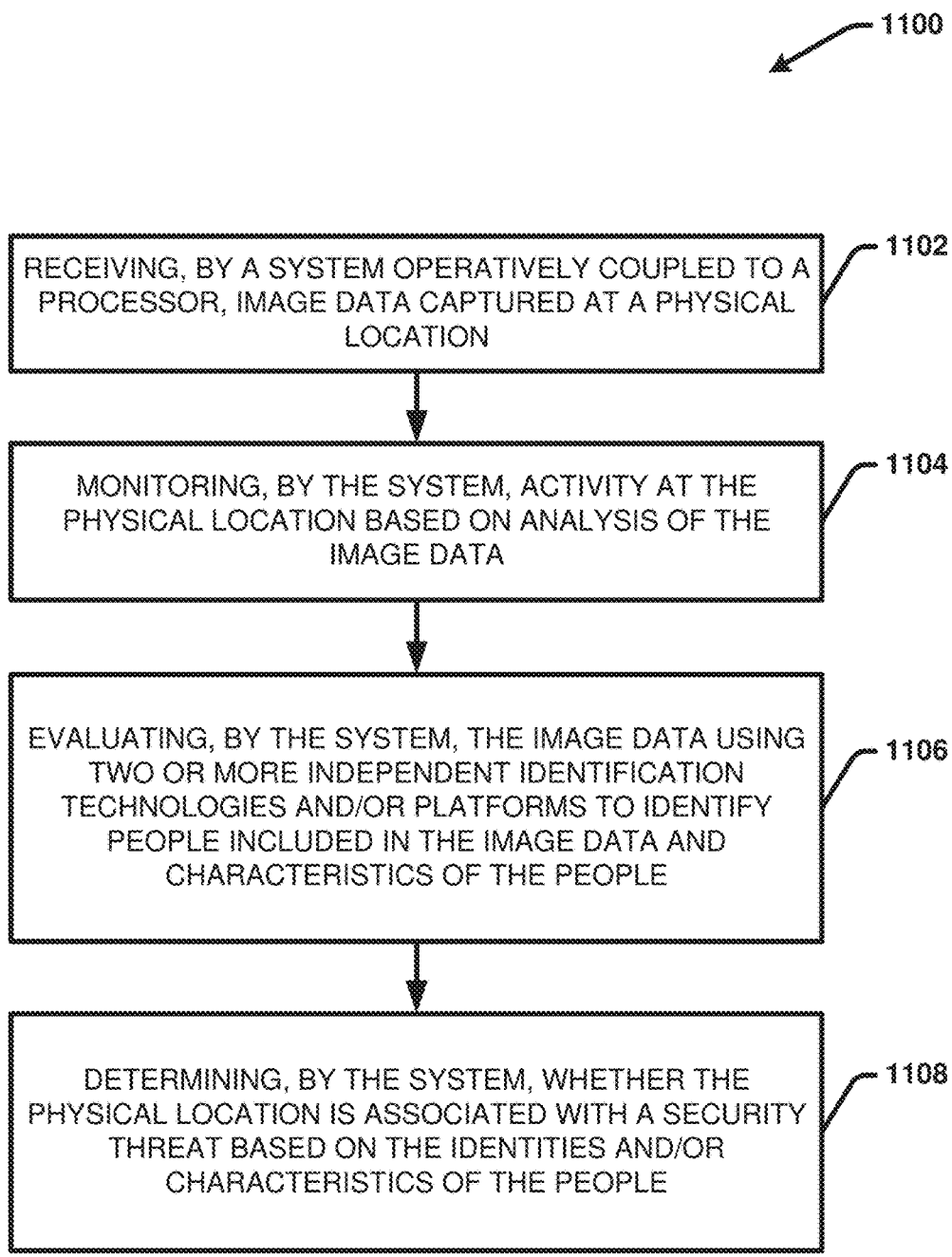
FIG. 11 illustrates an example, high-level flow diagram of a computer-implemented method for performing security monitoring using a combination of independent identification technologies and/or platforms in accordance with one or more embodiments of the disclosed subject matter.

FIG. 11 illustrates an example, high-level flow diagram of a computer-implemented method 1100 for performing security monitoring using a combination of independent identification technologies and/or platforms in accordance with one or more embodiments of the disclosed subject matter. Repetitive description of like elements employed in respective embodiments is omitted for sake of brevity.

At 1102, a system operatively coupled to a processor (e.g., system 1000) can receive image data captured at a physical location. At 1104, the system can monitor activity at the physical location based on analysis of the image data. At 1106, the system can evaluate the image data suing two or more independent recognition technologies and/or platforms to identify people included in the image data and/or characteristics of the people. At 1108 the system can determine whether the physical location is associated with a security threat based on the identities and/or characteristics of the people.

V. Fraud Prevention

In various additional embodiments, the disclosed techniques for identifying a person using multiple recognition technologies and/or platforms discussed with reference to FIGS. 1-4 can further be employed to prevent, minimized and/or catch fraud. The fraud can include financial fraud, identity theft, employing a fake persona or characteristics, and the like. In particular, image data can be captured in association with retail or financial transaction environments to confirm the person performing the transaction is authorized to use and/or access the financial account. For example, image data can be captured of a person at an ATM machine in association with accessing an account to perform a financial transaction. The disclosed systems can further authorize or deny the transaction based on whether the person in the imaged data is determined to be authorized to access and/or use the account.

In this regard, the disclosed techniques can use facial recognition technology, object recognition technology, text recognition technology, gait recognition technology, and/or multiple identification platforms to identify the person in the image data and/or verify the person in the image data is an authorized user of the financial account. Same or similar techniques can also be applied in various retail environments that involve a point of sale device (e.g., self-checkout, cashier checkout, gas station pumps, etc.) that accept credit card payments and/or other electronic forms of payment linked to financial accounts. Same or similar techniques can also be employed to determine whether a person matches image data presented in another form of identification (e.g., driver's license, passport, etc.) at a point of contact using image data captured of the person.

Same or similar techniques can also be used to facilitate preventing or minimizing fraud associated with electronic commerce (e-commerce) transactions and various online transactions that involve transferring money/currency between financial accounts using an Internet based platform (e.g., a website, a mobile application, a browser and the like). With these embodiments, the system used to perform the e-commerce transaction can employ the disclosed identification services (e.g., provided by identification service device 1210 or the like) to facilitate determining/verifying the identify of an entity performing an e-commerce transaction based on image data captured of the person at the time of the transaction. For example, the image data can be captured using a camera on the device used to perform the e-commerce transaction (e.g., a camera on the user's smartphone, computer or the like). The device and/or the e-commerce system used to perform the transaction (e.g., an e-commerce application, e-commerce website or the like) can further provide the image data to the identification service device 1210 for processing to verify the identity of the person in the image data and to determine whether the person is authorized to perform the transaction using the selected financial account. The identification service device 1210 can further provided the e-commerce system with the results and/or otherwise notify the e-commerce system accordingly. The e-commerce system can further authorize or deny the online transaction accordingly.

In this regard, the e-commerce system can require the person performing the transaction to provide image data captured of their face at the time of the transaction. The e-commerce system can further submit the image data to the identification service device (e.g., identification service device 1210) to determine the identity of the person, determine whether the identified person is authorized to use the financial account to perform the transaction, and in some implementations, to verify the authenticity of the image data (e.g., using the techniques described with reference to image authentication module 612 and system 600). For example, in some implementations, the image data can include one or more fixed images taken at the time of the transaction (e.g., prior to authorizing the transaction) with timestamp information confirming the picture was taken at the time of the transaction. In other implementations, the identification service device can employ the image authentication techniques described with respect to the image authentication module 612 to verify the authenticity of the image data. In other embodiments, the identification service device can require provision of video data (e.g., in real-time or substantially real-time) of the person performing the transaction at the time of the transaction. The identification service device can further provide the e-commerce system with the identification/verification results determined based on the received image data (e.g., one or more fixed images and/or video of the person performing the transaction online), which can either confirm or deny that the person in the image data is authenticated/verified and authorized to perform the transaction using the financial account. The e-commerce system can then permit/accept the transaction or reject/deny the transaction accordingly.

Figure 12:
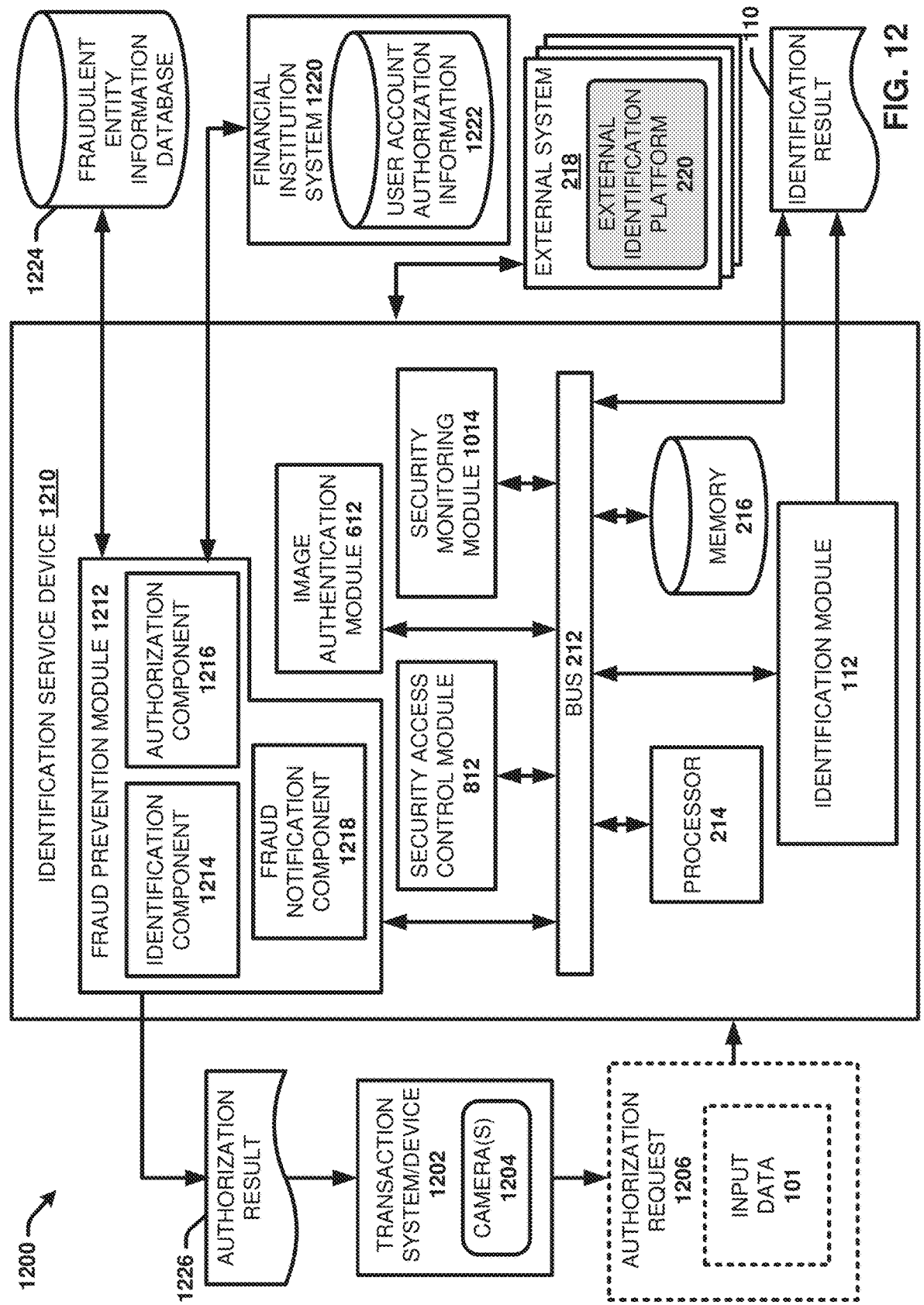
FIG. 12 presents an example, non-limiting system that facilitates fraud prevention using a combination of independent identification technologies and/or platforms in accordance with one or more embodiments of the disclosed subject matter.

In this regard, FIG. 12 presents and example, non-limiting system 1200 that facilitates fraud prevention using a combination of independent identification technologies and/or platforms in accordance with one or more embodiments of the disclosed subject matter. Similar to systems 100, 200, 400, 600, 800 and 1000, system 1200 can include an identification service device 1210 that includes an identification module 112 for generating identification result 110 information based on received input data 101 in accordance with the techniques described with reference to FIGS. 1-4. The identification service device 1212 can also include image authentication module 612, security access control module 812 and security monitoring module 1014. In this regard, the identification service device 1210 can provide same or similar features and functionalities as identification service device 104, identification service device 610, identification service device 810 and/or identification service device 1012 (as well as the additional features and functionalities described below). Repetitive description of like elements employed in other embodiments described herein is omitted for sake of brevity.

The identification service device 1210 can further include a fraud prevention module 1212 to facilitate preventing fraud in accordance with one or more techniques described herein. System 1200 can further include a transaction system/device 1202 that is coupled to one or more cameras 1204 (e.g., communicatively coupled and/or physically coupled) and an authorization request 1206 including input data 101 depicting and/or representing a person. In accordance with various embodiments, the input data 101 can include image data (e.g., video and/or one or more photos) of a person using a financial account of an entity to perform a transaction using the transaction system/device 1202.

In various embodiments, the image data can be captured via one or more cameras 1204 physically and/or operatively coupled to the transaction system and/or device 1202 used to perform/initiate the transaction. For example, in some embodiments, the transaction system/device 1202 can comprise an automated teller machine (ATM), a point of sale device (e.g., at a brick and mortar store, at a gas station pump, a personal device such as smartphone or tablet employing an auxiliary credit card reader, etc.).

In another embodiment, the financial transaction can involve an e-commerce transaction (e.g., an online transaction, a peer-to-peer mobile application transaction, and the like). With these embodiments, the transaction system/device 1202 can include an e-commerce system that is accessed using a computing device over the Internet (e.g., using a web browser, a web-application, a mobile application, or the like. With these embodiments, the image data can be captured using a camera of the computing device used to access the e-commerce system and perform the e-commerce transaction (e.g., a smartphone, a tablet, a laptop computer, etc.). In some implementations, the input data 101 can also include other input data 103.

Regardless as to whether the transaction system/device 1202 comprises a tangible/physical system and/or an e-commerce system, the transaction system/device 1202 can provide the identification service device 1210 with an authorization request 1206 based on initiation of the transaction by an entity using the transaction system/device. The authorization request 1206 can include a request, from the transaction system/device 1202 to authorize a financial transaction using a financial account of an entity. The authorization request 1206 can include image data captured of a person at or near the time of the transaction prior to completion of the transaction. The authorization request can further include the financial account information (e.g., name on the account, account number, routing number, credit card number and expiration date/security code, billing address, etc.).

For example, in embodiments in which the transaction system/device 1202 comprises a physical point of sale device such as an ATM, a credit card machine, or the like, a camera physically located at or near the point of sale device can capture the image data of the person at the time of the transaction prior to authorizing the transaction. The point of sale device can further send the authorization request 1206 with the image data to the identification service device 1210 and/or fraud prevention module 1212 using a wired or wireless communication network. The fraud prevention module 1212 can further process the request to generate an authorization result 1226 (as described in greater detail below) and return the authorization result to the point of sale device. The point of sale device can then authorize or deny the transaction based on the authorization result 1226.

In other embodiments involving e-commerce transactions, in association with initiation and/or performance of an e-commerce transaction (e.g., using a computing device) and prior to completion/authorization of the transaction, the e-commerce transaction system can interface with the identification service device 1210/fraud prevention module 1212 to facilitate authorizing the transaction. For example, in one implementation, the features and functionalities of the fraud prevention module 1212 can be executed as a plug-in application/program of the e-commerce transaction system (e.g., within the access web browser). In another, example implementation, the e-commerce system can communicate with the fraud prevention module 1212 and vice versa using a preconfigured API for the fraud prevention module 1212 and vice versa. Regardless as to the manner in which the fraud prevention module 1212 and the e-commerce system communicate and collaborate in association with authorizing the transaction, the fraud prevention module 1212 can receive an authorization request 1206 from the e-commerce system including image data captured of a person. For example, in association with initiation and/or performance of the e-commerce transaction (e.g., using a computing device) and prior to completion/authorization of the transaction, the e-commerce transaction system and/or the fraud prevention module 1212 can present the person with a prompt to provide image data and/or video of themselves for transaction authorization purposes. In some implementations, the e-commerce system and/or the fraud prevention module 1212 can access and activate a camera of the person's computing device and/or direct the person to active the camera and capture the image or video. The e-commerce system and/or the fraud prevention module 1212 can then submit the image and/or video to the fraud prevention module 1212 for authorization processing as described below.

In this regard, based on reception of the authorization request 1206 including the image data and the financial account information, the identification component 1214 can then determine whether the person in the image data corresponds to the entity or an authorized user of the of the financial account. For example, in one or more embodiments, the identification component 1214 can employ the identification module 112 determine and/or verify an identity of the person in the image data using the techniques described with reference to FIGS. 1-4. In this regard, the identification component 1214 can receive an identification result 110 generated by the identification module 112 based on the image data that provides an identity of the person, a confidence score for the identity, and/or verification information for the identity, and the like. The identification component 1214 can also employ one or more techniques described with reference to the image authentication module 612 to authenticate the image data.

The identification component 1214 can further access the financial institution system 1220 associated with the financial account identified in the authorization request 1206 and user account authorization information 1222 associated with the account to determine whether the identified entity is an authorized user (e.g., based on usage privileges defined in the user account authorization information 1222). In this regard, the identification service device 1210 and/or the fraud prevention module 1212 can function as "middleman" between the transaction system and an entities financial institution system to facilitate preventing fraud. In another embodiment, the user account authorization information 1222 can include image data (e.g., facial image data) of the authorized account user or users. With this embodiment, the identification component 1214 can determine whether the person appearing in the image data 1208 is an authorized account user based on matching the received image data with the authorized user image data in the user account authorization information 1222. In either of these embodiments, the fraud prevention module 1212 can employ the image authentication module 612 (and/or the techniques described with reference to the image authentication module 612) to verify whether the entity initiating or requesting to perform the transaction using the financial account is in fact the person appearing in the image data 1208 and is authorized to use the financial account.

The fraud prevention module 1212 can further return an authorization result 1226 to the transaction system/device 1202 indicating whether the identity was determined and/or verified and whether the identity is authorized to use the financial transaction (or not). The transaction system/device 1202 can further proceed with the transaction or deny the transaction accordingly based on the authorization result 1226.

The fraud prevention module 1212 can further include a fraud notification component 1218 that notifies the entity and/or the e-commerce/transaction system regarding an attempted unauthorized usage of the financial account based on a determination that the person fails to correspond to the entity or the authorized user. The fraud notification component 1218 can also notify one or more regulatory authorities regarding an attempted unauthorized usage of the financial account based on a determination that the identity fails to correspond to the entity or the authorized user.

In some implementations, the fraud notification component 1218 can further label/annotate the image data depicting a fraudulent entity and add the image data and information regarding the attempted fraudulent transaction history to a fraudulent entity database 1224. The fraudulent entity information database 1224 can further be employed to look up image data captured of people in various contexts to determine whether they are trustworthy and/or fraudulent. For example, the image authentication module 612 can look up images of people claiming to be an entity for the purpose of receiving authorization to perform a financial transaction, to receive access to something or the like and determine off the bat whether they are known fraudulent entities. The fraud notification component 1218 can also include the image data in a notification sent to the one or more regulatory authorities.

Figure 13:
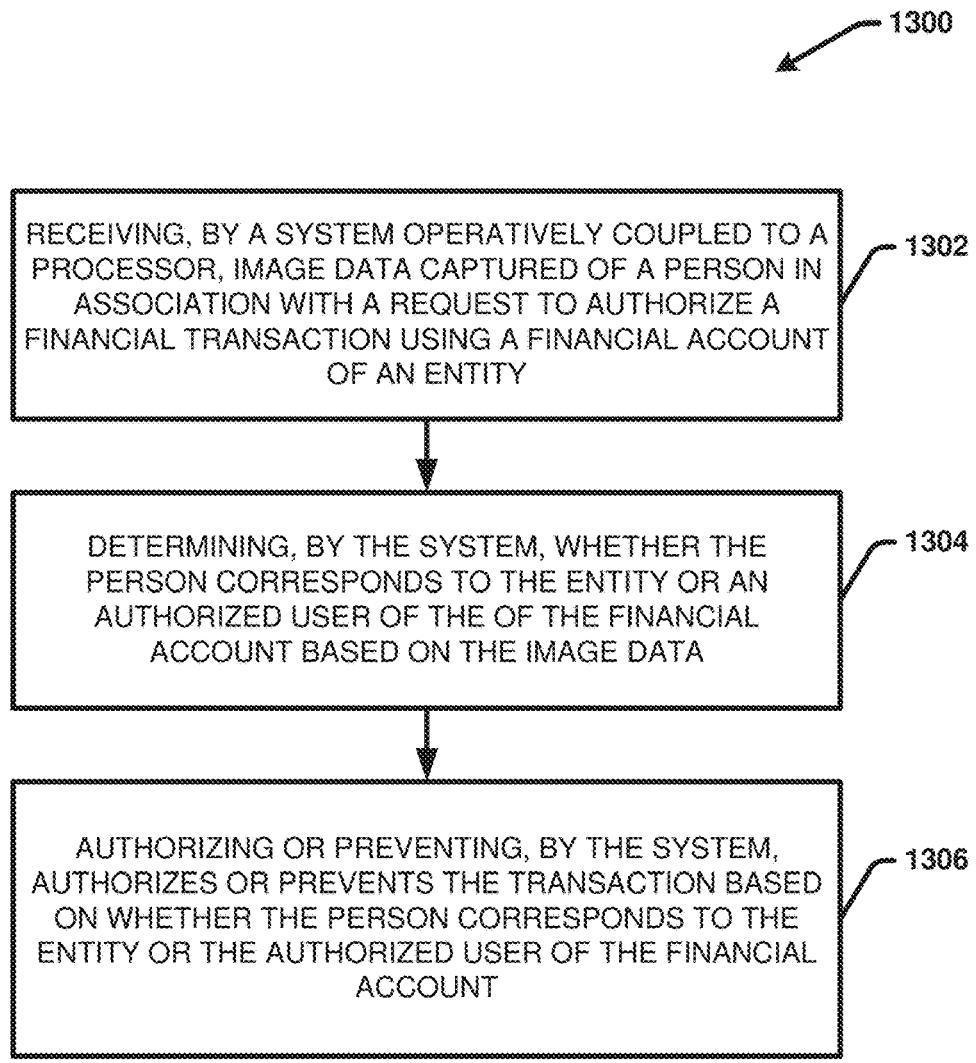
FIG. 13 illustrates an example, high-level flow diagram of a computer-implemented method for preventing fraud using a combination of independent identification technologies and/or platforms in accordance with one or more embodiments of the disclosed subject matter.

FIG. 13 illustrates an example, high-level flow diagram of a computer-implemented method 1300 preventing fraud using a combination of independent identification technologies and/or platforms in accordance with one or more embodiments of the disclosed subject matter. Repetitive description of like elements employed in respective embodiments is omitted for sake of brevity.

At 1302, a system operatively coupled to a processor, (e.g., system 1200 or the like), can receive image data captured of a person in association with a request to authorize a financial transaction using a financial account of an entity. At 1304, the system can determine whether the person corresponds to the entity or an authorized user of the financial account based on the image data. At 1306, the system can authorize or prevent the transaction based on whether the person corresponds to the entity or the authorized user of the financial account.

Figure 14:
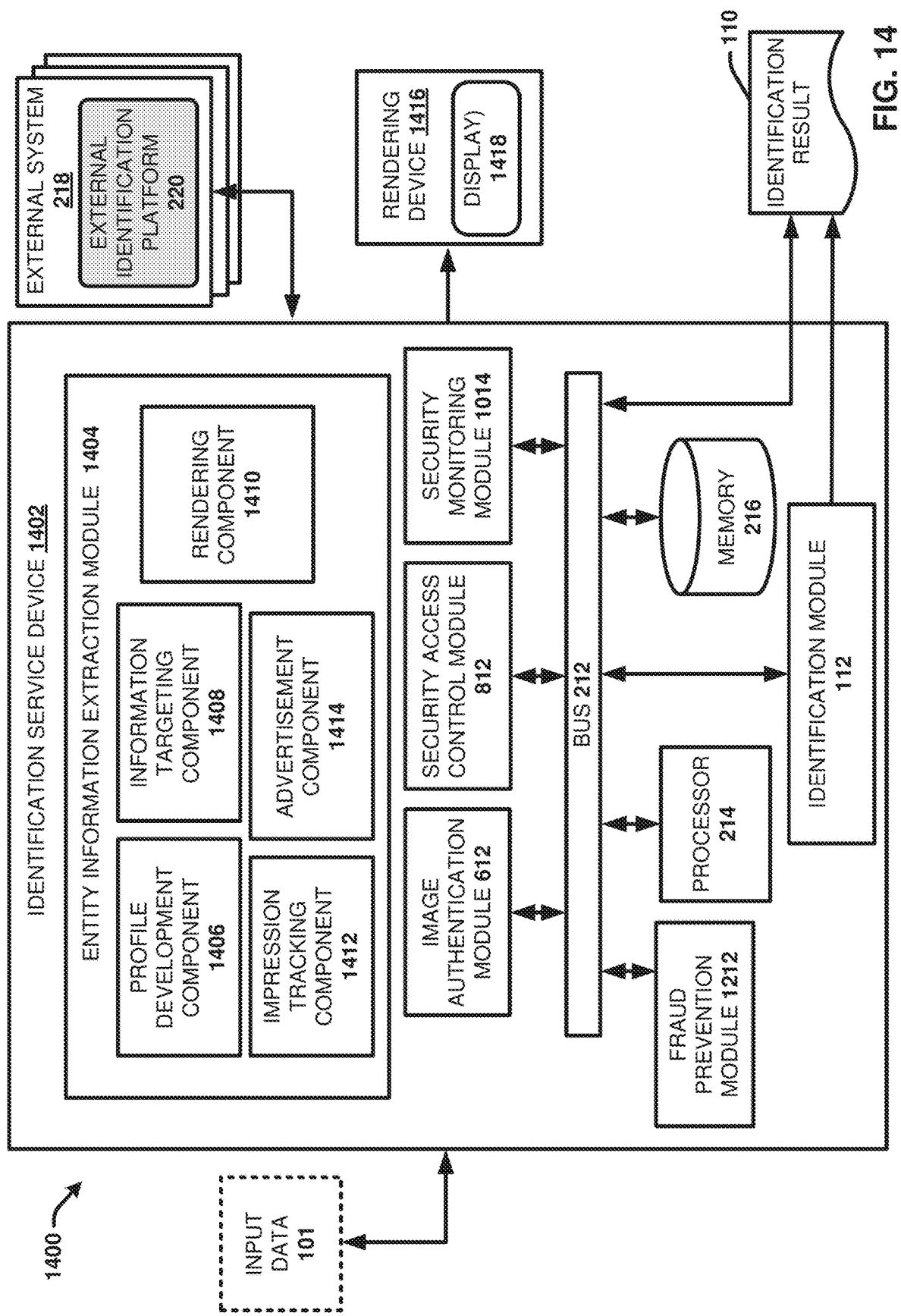
FIG. 14 presents an example non-limiting system for extracting information about an entity for usage in tailoring information delivery using a combination of independent identification technologies and/or platforms in accordance with one or more embodiments of the disclosed subject matter.

VI. Anonymous Information Extraction about an Entity for Usage in Tailoring Information Delivery FIG. 14 presents an example non-limiting system for anonymously extracting information about an entity for usage in tailoring information delivery using a combination of independent identification technologies and/or platforms in accordance with one or more embodiments of the disclosed subject matter. Similar to systems 100, 200, 400, 600, 800, 1000 and 1200, system 1400 can include an identification service device 1402 that includes identification module 112. The identification service device 1402 also include image authentication module 612, security access control module 812, security monitoring module 1014 and fraud prevention module 1212. In this regard, the identification service device 1402 can provide same or similar features and functionalities as identification service device 104, identification service device 610, identification service device 810, identification service device 1012 and/or identification service device 1210, as well as the additional features and functionalities described below. Repetitive description of like elements employed in other embodiments described herein is omitted for sake of brevity.

The identification service device 1402 can further include entity information extraction module 1404 to facilitate anonymously extracting information about an entity for usage in tailoring information delivery using a combination of independent identification technologies and/or platforms in accordance with one or more embodiments of the disclosed subject matter. The entity information extraction module 1404 can include profile development component 1406, information targeting component 1406, rendering component 1410, impression tracking component 1412, advertisement component 1414 and rendering device 1416 (including at least one display 1418).

In one or more embodiments, using the multiple identification technologies/platforms as discussed with reference to FIGS. 1-4, the profile development component 1406 can develop anonymous profiles for recognized people that are not explicitly known by a unique identifier (e.g., their given name, username, identification number, or the like). For example, in some embodiments the identification module 112 may not be able to identify a person by a name or recognize the person in an existing image database using one or more internal or external identification technologies and/or platforms. With these embodiments, the profile development component 1406 can generate a placeholder name/identifier for the entity and/or new profile name for the entity using a defined naming system (e.g., anonymous user number xxx) and store the information in the identity/profile information database 318A.

For example, the identification service device 1402 can initially receive captured input data 101 including image data of person that cannot be explicitly identified. However, the profile development component 1406 can collect rich profile information determined and/or received for the person depicted in the image data describing various characteristics of the user based on analysis of the image data using the identification module 112 and the techniques described herein with referenced to FIGS. 1-4. The profile development component 1406 can further associate the captured image data of the "unidentified" person with an anonymous profile for the user and any characteristics/identifiers determined for the person based on analysis of the image data (e.g., using facial recognition, using object recognition, using text recognition, using gate recognition, using machine learning, etc.).

For example, the characteristics/identifiers can include a description of the person's appearance, information regarding a time/location the person was identified (e.g., the location where image data was captured and/or where the person appearing in the image was determined to be located in the image), information regarding a context of the person in the captured image data, and the like. The characteristics can also include information regarding objects worn or carried by the user, other individuals associated with the user, and the like. In this regard, the profile development component 1406 can learn brands of type of clothing and/or articles worn by a user, information about costs of those items, the materials of the items, where the items are able to be purchased, and the like. Using object recognition and text recognition, the profile development component 1406 can also evaluate captured image data associated with a person's environment to learn behaviors of the person, preferences of the person and the like. For example, the internal identification platform 204 can employ one or more internal and/or external identification technologies/platforms to evaluate image data captured of a person's environment regarding a store the person is currently shopping in, objects purchased and the like.

The profile development component 1406 can further employ various AI and machine learning techniques to infer additional characteristics about the anonymous user based on learned correlations/patterns associated with certain profile characteristics based on analysis of profile information developed for many entities (e.g., thousands, millions, billions, etc.). For example, using one or more machine learning techniques, the profile development component 1406 can learn correlations between facial features, physical appearances, attire (e.g., including type, color, brand, material, etc.), gait, and the like, and user preferences, behavior traits, personality characteristics, mood, demographics, occupation, society roles, marital status, and the like.

The profile development component 1406 can further generate a rich "profile" for the anonymous user in the identity/profile information database 318A (or another suitable data storage unit) with a plethora of information about the anonymous user and associate a unique (e.g., system generated) identifier number/name with the profile. The rich profile information can be employed for various applications, such as targeted advertising, security monitoring, data mining and the like. For instance, the entity information extraction module 1404 can determine or infer whether a person would be interested in purchasing a high cost name brand item or a low cost off brand item based on their clothing preferences and tastes, etc.

In some embodiments, the profile development component 1406 can continue to track the anonymous users and update their user profiles with new information each time new input data 101 is captured and received for the anonymous users (e.g., image data at the same location and/or from cameras at disparate locations, image data captured at different times, other data 103 captured at different times, etc.). In some embodiments, at one point in time, the system may learn the user's actual name/identity/etc. as new information about the user is learned by over time and entered into one or more internal and/or external identification system databases (e.g., one or more identity feature correlation databases 316A and/or 316B). The system can further cross-reference various external databases to determine additional information about the anonymous user included in those databases based on matching identifiers, images of the person, and the like.

The entity information extraction module 1404 can further identify and anonymously track user profiles to develop heat maps regarding travel patterns of individuals with certain profiles.

The information targeting component 1408 and the rendering component 1410 can further facilitate rendering information tailored to an entity based on analysis of image data captured of the entity. For example, in various embodiments, using rich profile information learned about a person based on analysis of image data captured of the person, the information targeting component 1408 can determine things (e.g., items for sale/purchase, advertisements, business recommendations, job recommendations, friend recommendations, romantic partner recommendations, etc.) to recommend to the person. The information targeting component 1408 can learn the person's preferences without knowing the specific name or identity (e.g. anonymously) of the person. The information targeting component 1408 and/or the rendering component 140 can further provide (e.g., via one or more rendering devices 1416 including at least one display 1418 or another output device) other people interacting with the person with recommendations regarding how to interact with and/or advise the person based on their identity and/or associated profile information and preferences. For example, the information targeting component 1408 can recognize a person that regularly visits a chain coffee shop and orders the same latte every time. In accordance with this example, the information targeting component 1408 can recognize the person when the person walks into a store of the chain coffee shop and the rendering component 1410 can instruct the barista to ask the person if he or she would like their "XYX latte" today. In this regard, the barista could be someone that has never met the person before but would be able to recommend the person her favorite drink. In some embodiments, the rendering component 1410 can provide the barista with the information about the customer via an AR device worn by or operated by the barista.

In one or more additional embodiments, the rendering component 1410 can provide information to an identified person using AR or VR rendering device 1416 based on identifying the person either specifically (e.g., by via a profile and/or information associated with the person by a unique name that is ubiquitous in disparate system databases) or anonymously (e.g., via an anonymous profile developed for the person. For example, in one implementation, based on a user walking into a healthcare facility and being recognized based on image data captured of the user, the information targeting component 1408 can determine that the user has a medical appointment with a specific doctor and unit in the healthcare facility. Using AR, the rendering component 1410 can further render targeted information to the user about their visit that is tailored to the user. For example, the rendering component 1410 can provide the user with directions to their appointment (e.g., to the unit) providing visual indicators or arrows to the unit using AR.

Still in other embodiments, the disclosed techniques can be used for automated data entry in data forms associated with e-commerce transactions, profile generation forms, kiosks or similar systems based on identification of a person based on image data capture of the person using the techniques described herein. This automated information entered can include whatever information the entity information extraction module 1404 can retrieve about the person in one or more databases (e.g., internal and/or external) based on the image data (e.g., the recognized entity or profile of the person based on the image data).

For example, in one implementation, based on identification of a patient interfacing with a kiosk in a medical environment used to check the patient in and/or obtain standard information about the patient and their needs, the entity information extraction module 1404 can automatically populate the data entry fields at the kiosk with information known about the patient. For example, the entity information extraction module 1404 can identify the patient, look up relevant profile information and/or medical information that is requested for the patient in a data entry form at the kiosk in one or more databases (e.g., user profile databases, electronic health records, etc.), and automatically fill in the information. In another example, in association with performing an e-commerce transaction, the entity information extraction module 1404 can determine the information for entry into the requisite data fields (e.g., name, billing information, shipping information, etc.) based on recognition of the person's identity using one or more information identification technologies/platforms and extraction of the information as associated with the person's identity in one or more identity profile information databases (e.g., including (internal) identity/profile information database 318A and/or one or more (external) identity profile information databases 318B).

In some embodiments, the system can determine or infer information for entry into one or more data fields based on analysis of the image data directly. For example, the system can evaluate the patient's appearance to determine information regarding the patients age, gender, height, weight, ethnicity, and the like. In another example, based on identification or a person using imaged data captured of the person at a fast food drive through (or in a similar context), the information targeting component 1408 can look up information about the person regarding their learned food preferences at that vendor (e.g., as learned by the profile development module and associated with the user's profile information included in one or more internal and/or external databases). The information targeting component 1408 and/or the rendering component 1410 can further automatically provide the information to the vendor and/or the customer to facilitate the vender/customer interaction.

In one or more additional embodiments, the impression tracking component 1412 can provide for tracking information regarding persons impressions of advertisements, objects and/or other people in real-world environments. In particular, in online advertising, the unit cost per million (CPM) is used to referent to the amount an advertiser pays a website (or the like) per one thousand visitors who see its advertisements. Online advertisement impressions are generally counted based on the advertisement being rendered on the user's display. However, tracking information regarding impressions of advertisements displayed in the real-world environments, such as billboards, walls, vehicles, physical signs/posters, dynamic displays and the like is much more difficult to track.

One or more embodiments of the disclosed subject matter can capture image data of persons that pass by and/or look at (e.g., determined based on line-of sight) real-world advertisements and other objects (e.g., capturing information about who is looking at and/or passing by advertisements in any real-world environment) displayed and/or included in real world environments (e.g., such as billboards, walls, vehicles, physical signs/posters, dynamic displays, etc.). For example, using one or more cameras located at or near an environment where the advertisement or object is located, the image data can be captured in the environment and analyzed by the impression tracking component 1412 and/or the identification module 112 to identify people included in the image data and/or people looking at the advertisement/object. The identification module 112 can further used the techniques described with reference to FIGS. 1-4 to identify the people and/or determine characteristics about the people. For example, the impression tracking component 1412 can track information regarding number of people who looked at the advertisement, identities of the people, and/or characteristics of the people (e.g., (counting how many people are in an area of the advertisement or who is looking at an advertisement along with demographics/characteristics of those people). The impression tracking component 1412 can further provide this real-world CPM data to the advertisement entity responsible for an advertisement. In this regard, the information can be used to sell and/or bill for advertisement space in real-world environments.

In some embodiments, the advertisement component 1414 can further use this tracked impression information to adapt advertisement rendered on digital displays (e.g., a display 1418) in real-time to tailor the advertisement to the crowds' tastes, to select a new advertisement in scenarios when the advertisement has low CPMs and the like. In this regard, the advertisement component 1414 can use the impression tracking information to dynamically change/tailor real-world advertisements to the crowd demographics (e.g., in scenarios in which the advertisement is an electronic multimedia image/video/text displayed on a screen and controlled via a network).

VII. Combining Different Identification Technologies and/or Platforms for Military Applications Various additional embodiments of the disclosed subject matter are directed to systems, computer-implemented methods, apparatus and/or computer program products that facilitate various military applications using a combination of different identification technologies and/or platforms.

Figure 15:
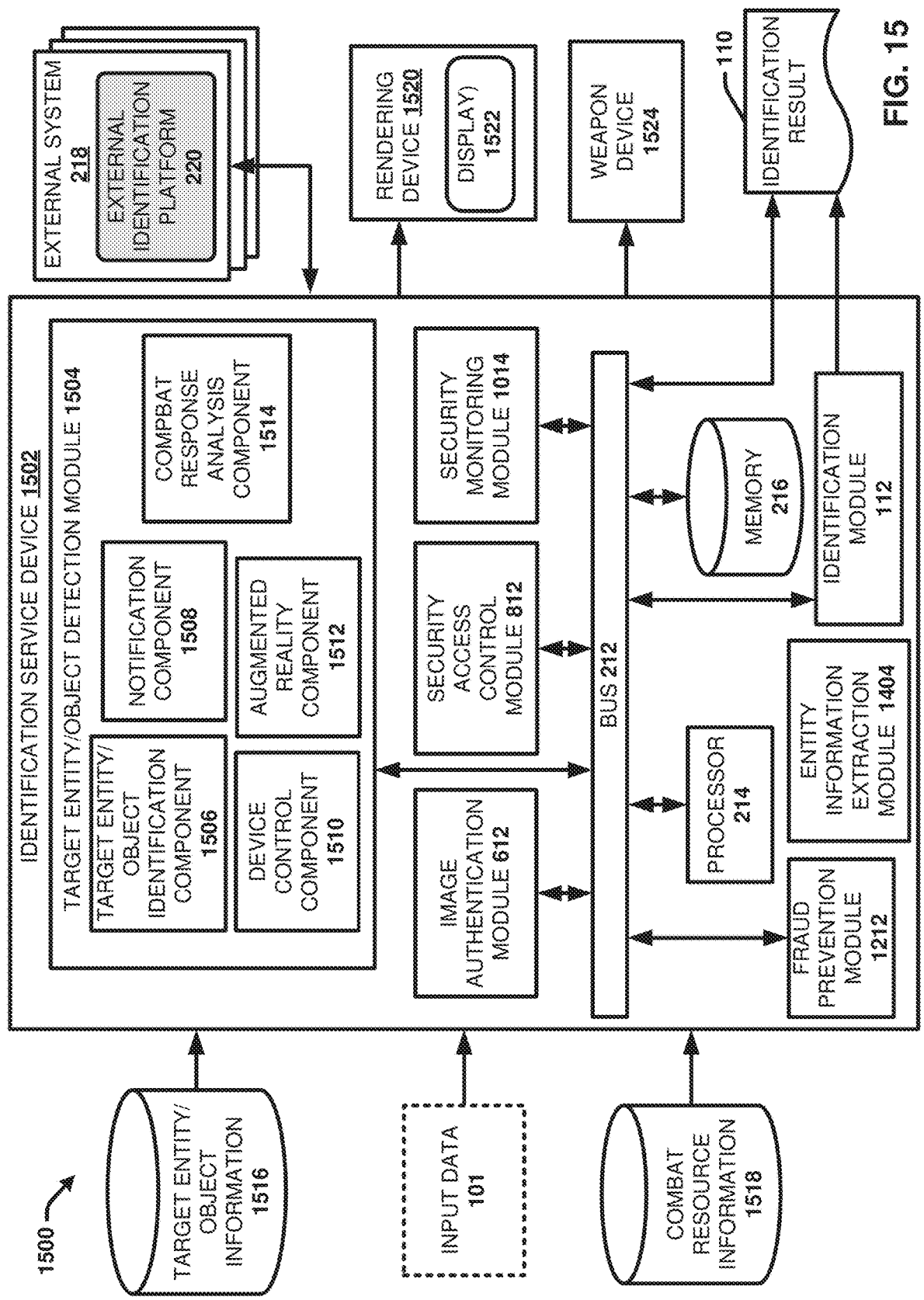
FIG. 15 presents an example non-limiting system for using a combination of independent identification technologies and/or platforms in military applications in accordance with one or more embodiments of the disclosed subject matter.

FIG. 15 presents an example non-limiting system 1500 for using a combination of independent identification technologies and/or platforms in military applications in accordance with one or more embodiments of the disclosed subject matter. Similar to systems 100, 200, 400, 600, 800, 1000, 1200 and 1400, system 150 can include an identification service device 1502 that includes an identification module 112 and various other modules described infra. The identification service device 1502 can further include a target entity/object detection module 1504 that facilitates various military applications using a combination of different identification technologies and/or platforms. System 1500 can further include a target entity/object information database including information identifying and/or describing target entities (e.g. people and/or objects). System 1500 can also include a combat resource information database 1518 that includes information describing specifications, features, functionalities and uses of various combat resources (e.g., including armor, weapons, and the like). System 1500 can also include one or more rendering devices 1520 including at least one display 1522. System 1500 can further include one or more weapon devices 1524 that can be controlled via device control component 1510. Repetitive description of like elements employed in other embodiments described herein is omitted for sake of brevity.

The target entity/object detection module 1504, can include target entity/object identification component 1506, notification component 1508, combat response analysis component 1514, device control component 1510 and augmented reality component 1512.

The target entity/object identification component 1506 facilitates identifying target entities depicted in input data 101 using information provided in the target entity/object information database 1516. In this regard, in various additional embodiments, the disclosed techniques for identifying and/or characterizing entities (e.g., people) and objects can be employed to identify a target entity based on analysis of image data (e.g., image data 102) captured of the target entity and/or an environment of the target entity (e.g., using target entity/object identification component 1506). The target entity can include one or more people as well as objects.

In particular, in one embodiment, the target entity/object identification component 1506 can multiple identification technologies/platforms as discussed with reference to FIGS. 1-4 to identify specific people that are known targets (e.g., as predefined in a target identity database), people with certain characteristics that are known targets, (e.g., as predefined in a target identity database), and/or objects that are known targets based on evaluation of image data captured of the people and/or objects (e.g., using facial recognition, using object recognition, using text recognition, using gait recognition, etc.). For example, in some implementations, the target entity/object identification component 1506 can receive image data captured of a person (e.g., image data 102) and employ two or more identification technologies and/or platforms to identify the person in one or more databases correlating identities/profiles with defined facial features, appearance features, appearance characteristics, gait patterns, etc., (e.g., identify/profile information database 318A and/or one or more similar databases provided by one or more external systems such as identify/profile information database 318B and the like). The target entity/object identification component 1506 can further access a target information database comprising information identifying known identities of target individuals (e.g., by name or another unique identifier) and determine whether the identified entity is listed as a target entity.

In another implementation, the target entity/object identification component 1506 can be configured to recognize target individuals in an anonymous manner. For example, the target entities can be defined based on appearance characteristics regarding their clothing. For instance, the target individuals can be defined as individuals who wear a certain uniform, badge (e.g., with text and/or symbols), color, material type, etc. According to this example, the target entity/object identification component 1506 can determine the appearance characteristics of an individual using object recognition and/or text recognition. In another example, the target entities can be defined based on additional appearance characteristics regarding their facial features, complexion, hair color, height, etc. and the target object recognition system can employ facial recognition and/or object recognition techniques to determine these additional types of appearance characteristics of an individual. The target entity/object identification component 1506 further determine whether an individual that is a target entity based on whether the individual has the defined appearance characteristics. The target entities can also be defined based on association with certain objects being work or carried, by specific gait patterns, by language, by tone of voice, etc. With these implementations, the target entity/object identification component 1506 can evaluate received image data (and optionally audio data and other sensory data) captured of an individual or group of individuals to determine a characteristic profile to the individual or group of individuals. The target entity/object identification component 1506 can further determine whether and to what degree of confidence the characteristic profile of the individual or group of individuals corresponds to a defined target entity using defined (e.g., in the target entity/object information database 1516) or learned information describing the characteristics of the target entity.

In another implementation, the target entity can be an object. For example, the target object can be a weapon, a device, a vehicle (e.g., a military tank), an aircraft (e.g., a drone, an airplane, a jet, etc.) a building, a barrier structure, or another type of defined object. With these implementations, the target recognition system can also employ one or more identification technologies and/or platforms to facilitate identifying a target object based on image data captured of the object and/or other sensory data associated with the object (e.g., object recognition, text recognition, motion recognition, sound analysis, etc.).

In some implementations, the target recognition system can be associated with a weapon (e.g., a gun, a rifle, a missile, etc.) and/or a device that controls operation of a weapon (e.g., a drone, a robot, a tank, a remote device, etc.), (e.g., using device control component 1510). For example, in some implementations, the target recognition system and/or one or more components of the target recognition system can be physically and/or communicatively coupled to a weapon or a device (e.g., weapon device 1524) that controls operation of the weapon. With these implementations the device control component 1510 can control usage of the weapon based on whether a target entity/object is identified and/or a degree of confidence that an identified object is a target entity/object (e.g., using confidence evaluation component 208). For example, in some implementations, the device control component 1510 can be configured to automatically detonate a weapon based on a determination that the weapon is aimed at a target object/entity. The device control component 1510 can also prevent detonation of the weapon if the system determines that the weapon is not aimed at a target object/entity. The device control component 1510 can deactivate the weapon and/or prevent manual detonation of the weapon based on a determination that the weapon is not aimed at or otherwise directed toward a target entity.

In one embodiment in which the target recognition system is coupled to a manually operated device or weapon, the target recognition system can further include an AR component that provides AR visualization aids in association with identifying target objects/entities (e.g., using augmented reality component 1512). For example, the AR component can generate visual data overlays for rendering via a display, such as display 1522 (e.g., a heads-up display, worn eye wear, or a display of another type of AR device) depicting a live view of an environment. The visual data overlays can distinguish between target objects/entities and/or non-target objects/entities that appear in the live view of the environment. For example, in one implementation, the visual data overlays can highlight target objects/entities and/or non-target objects/entities in different colors (e.g., light up enemies in red and friends in green).

In some embodiments, in addition to identifying a target object/entity, the target recognition system can further determine relevant information about the target object/entity. For example, the target object recognition system can generate information describing the target object/entity, weapons carried or operated by the target object/entity, information describing a quantity of target objects/entities and the like. In implementations in which the target entity is a military weapon or object, the target object recognition system can further determine information regarding how to attack or respond to the weapon or object (e.g., using combat response analysis component 1514 and combat resource information 1518).

For example, certain military weapons have different layers of armor, different safety defenses, and the like. In order to effectively defend against or combat these weapons, one must know the appropriate mechanism taking into account the different safety defenses involved. For example, if a tank is recognized as a model with 24 inches of armor, a missile only capable of penetrating 18 inches of armor or less would be ineffective against the tank. According to this example, the target object recognition system can identify the specific model of the tank and determine that the tank has 24 inches of armor. The object recognition system can further provide this information to the entity responsible for detonating or controlling defense against the tank so that the entity can deploy the appropriate defense/attach mechanism (e.g., the missile capable of penetrating 24 inches of armor as opposed to only 18 inches of armor). In some implementations, the object recognition system can prevent detonation of a weapon toward the tank if the weapon is known to be ineffective against the model of the tank. For example, if a weapon aimed at or directed toward a military object is determined to be ineffective based on the type of the weapon and the type of the military object, then the system can deactivate or otherwise prevent usage of the weapon against the military object, thereby minimizing waste.

In one or more additional embodiments, the disclosed identification techniques can also be employed to control operation of weapons by entities based on a determination that they are authorized to operate the weapon. For example, the system can employ one or more technique described herein with respect to the security access control module 812 to determine whether a person is authorized to access a physical resource, wherein the resource is a weapon. The system can for enable or prevent usage of a weapon based on whether the person attempting to use the weapon is authorized.

Figure 16:
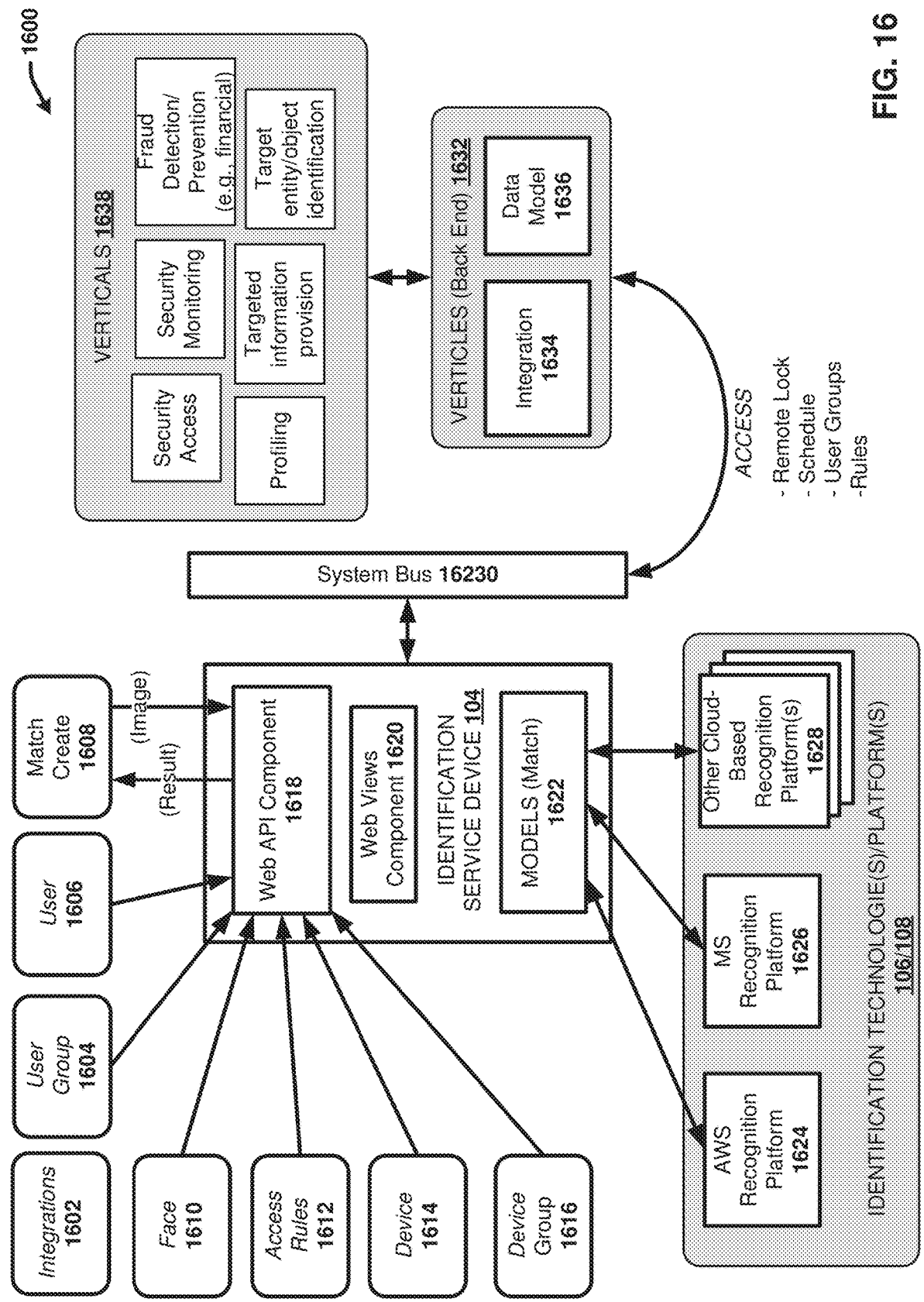
FIG. 16 presents a high-level overview of another example, non-limiting system for identifying and/or authenticating an entity using a combination of independent identification technologies and/or platforms in accordance with one or more embodiments of the disclosed subject matter.

VIII. System for Combining Different Identification Technologies and/or Platforms for Entity Identification FIG. 16 presents a high-level overview of another example, non-limiting system for identifying and/or authenticating an entity using a combination of independent identification technologies and/or platforms in accordance with one or more embodiments of the disclosed subject matter.

System 1600 can include identification service device 104 and one or more identification technologies/platforms 106/108 as described with reference to FIG. 1. In the embodiment shown, the identification technologies/platforms 106/108 can include for example, an Amazon Web Service™ (AWS) recognition platform, 1624, a Microsoft Azure™ (MS) recognition platform 1626, and/or various other cloud-based recognition platforms 1628. The identification service device 104 can further include a web API component 1618 that facilitates accessing various network (e.g., Internet) accessible data sources, systems and/or devices respectively identified in system 1600 as components 1602-1616. The identification service device 104 further includes a web views component 1620 and one or more data models 1622 that facilitate matching an entity to an identity based on the outputs of the identification technologies/platforms 106/108. System 1600 further includes a system bus that connects the identification service device 104 to one or more verticals 1638 via their corresponding back end processing systems 1632. Repetitive description of like elements employed in other embodiments described herein is omitted for sake of brevity.

In one or more embodiments, a client can access the identification service device 104 and choose a la carte prebuilt tools based on the vertical/industry they are in, such as access for an access control company they can choose access rules, access scheduling, user groups, device groups, device etc. System 1600 can provide an infinite amount of these types of resources for industry specific clients. The client then, via our platform, can choose the matching model they want to use via our computer vision partners; AWS, Azure, Google Cloud, etc. The client can choose one or multiple to aggregate a better consensus. (The analytics can be displayed to the client via a screen device; phone table; ARVR glasses; drone etc.). The client can also seamlessly switch between computer vision technologies as well.

One or more embodiments of the discloses recognition techniques can be integrated into any type of stuffed animal or toy that has eyes or maybe doesn't have eyes. For example, the disclosed recognition technology can be integrated into a stuffed toy that can recognize a particular child based upon uploading a child's photo (or children's photo if there's more than one child) and the stuffed toy can speak to the child based upon recognizing the child. For example, the based on recognizing the child John, the toy can generate audio and speak to the child (e.g., stating "Hi John, are you ready to play?"). In another example, the toy can tell by looking at the child if the child is laughing or happy and say something like "Hey John, great to see you having a good time," or "Way to be happy John" and other phrases. In another example, if the stuffed animal/toy recognizes, by facial features, the child is sad or unhappy (crying) it can say soothing phrases such as: "Hey John turn that frown upside down," or "Hey John, don't be sad, I'm your little buddy so play with me." The parents could also have the opportunity to load a favorite song or two to play, or perhaps known lullabies or sayings from recognized characters or cartoons that child would recognize by hearing (e.g., personalized to the child based on known or learned preferences of the child). These songs could be automatically played based on one or more behaviors and/or reactions of the child as determined based on analysis of image data, audio data, and/or other sensory data captured of the child. For example, an uplifting tune could be initiated when a child is unhappy based on predictive measures such as the phrases not working after x amount of time. The same holds true for robotic dogs that are already made or little robots and big robots, AI bots (for example AIBO . . . . Noticing facial features and expressions and reacting to those.

These same underlying premises for interactive toys describe can further be applied to various types of devices that can react based upon your mood as determined through facial recognition technology. For example, a personal computing device can employ the disclosed techniques to determine based upon your facial expression, a user's mood (e.g., such as happy or sad) based on image data and provide tailored content according to your mood. In another example, a home camera system can be provided that learns the habits and preferences of individuals that visit or live in the home (e.g., learning you and your habits), based on analysis of their facial features, expressions, and the like. As a user is recognized/identified, the home system can further automatically adjust IoT device in the home according to their preferences (e.g., adjusts music, HVAC settings, etc.).

In another example, the disclosed techniques can receive and analyze this image data to identify specific children and/or their mood (e.g., based on their facial expressions). The system can further provide automated responses that are tailored to the recognized child and/or the current behavior/mood. For example, the system can determine based on a child's facial expression/behavior that the child is not falling asleep at naptime and play music, a sound machine, speak certain phrases, etc. to help the child fall asleep. The system can further keep playing the song or music based upon facial expression and as it notices the baby falling asleep and turns the music or sound machine down slowly until the baby is asleep and keep it there. Also, if it notices a baby awake at night or fidgety, it can start to play music again and ping the parent phone or let them know their child is awake.

One or more embodiments of the disclosed subject matter are further directed to sunglasses that automatically adjust the darkness or shade of the lens based upon how much the wearer is squinting (e.g., because of the sun). For example, in one implementation, if the lens is clear/partially dark when you put it on and based upon you squinting because of the sun or light it continues to darken until you no longer squint or it recognizes your pupil dilating properly as opposed to current technology that darkens because the sun is out. With the current technology, sunglasses are usually just one shade of dark. The disclosed techniques can use image data captured of the eyes via one or more cameras integrated into the sunglasses. The sunglasses can further include reactive lenses that adapt the degree of reflectance/tint based on the detected size of the pupils, squinting, brightness of the environment, and the like.

A system can employ one or more cameras to capture image data of a plurality of people in a crowded environment. Using multiple facial analysis, the system can analyze the sentiment of each person's face and record it at a certain time. In a performance or lecture, the speaker would be able to see, in real-time, or as a later report, how the crowd was visibly reacting to the event. The system can also detect stress, anxiety levels and label that as a security/safety threat or concern in schools, crowds etc. to facilitate determining whether a security/safety threat is occurring (e.g., in conjunction with system 1000).

IX. Example Operating Environment

Figure 17:
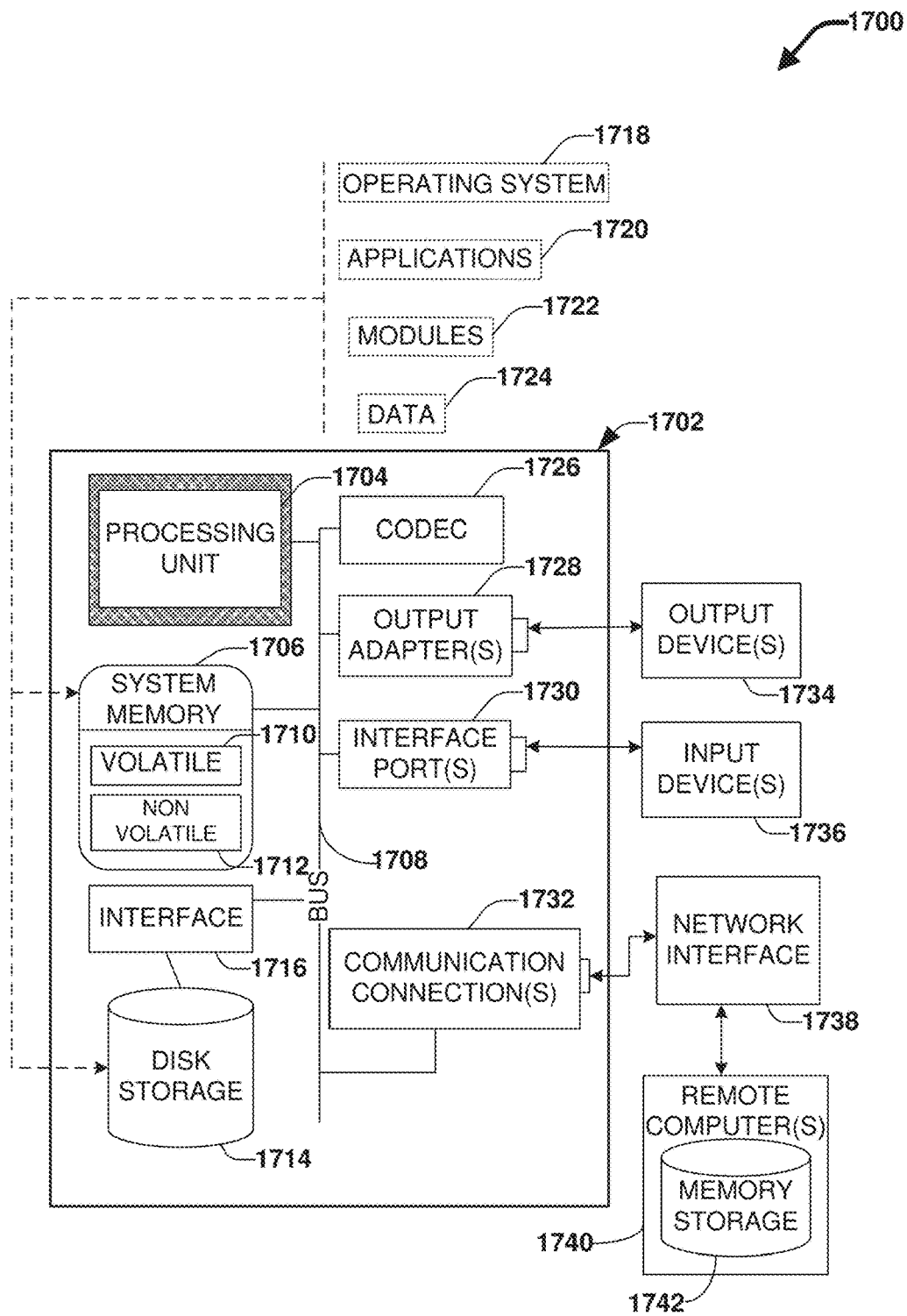
FIG. 17 illustrates a block diagram of an example, non-limiting operating environment in which one or more embodiments described herein can be facilitated.

FIG. 17 can provide a non-limiting context for the various aspects of the disclosed subject matter, intended to provide a general description of a suitable environment in which the various aspects of the disclosed subject matter can be implemented. FIG. 17 illustrates a block diagram of an example, non-limiting operating environment in which one or more embodiments described herein can be facilitated. Repetitive description of like elements employed in other embodiments described herein is omitted for sake of brevity.

With reference to FIG. 17, a suitable operating environment 1700 for implementing various aspects of this disclosure can also include a computer 1702. The computer 1702 can also include a processing unit 1704, a system memory 1706, and a system bus 1708. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704. The system bus 1708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1724), and Small Computer Systems Interface (SCSI).

The system memory 1706 can also include volatile memory 1710 and nonvolatile memory 1712. The basic input/output system (BIOS), containing the basic routines to transfer information between elements within the computer 1702, such as during start-up, is stored in nonvolatile memory 1712. Computer 1702 can also include removable/non-removable, volatile/non-volatile computer storage media. FIG. 17 illustrates, for example, a disk storage 1714. Disk storage 1714 can also include, but is not limited to, devices like a magnetic disk drive, floppy disk drive, tape drive, Jaz drive, Zip drive, LS-100 drive, flash memory card, or memory stick. The disk storage 1714 also can include storage media separately or in combination with other storage media. To facilitate connection of the disk storage 1714 to the system bus 1708, a removable or non-removable interface is typically used, such as interface 1716. FIG. 17 also depicts software that acts as an intermediary between users and the basic computer resources described in the suitable operating environment 1700. Such software can also include, for example, an operating system 1718. Operating system 1718, which can be stored on disk storage 1714, acts to control and allocate resources of the computer 1702.

System applications 1720 take advantage of the management of resources by operating system 1718 through program modules 1722 and program data 1724, e.g., stored either in system memory 1706 or on disk storage 1714. It is to be appreciated that this disclosure can be implemented with various operating systems or combinations of operating systems. A user enters commands or information into the computer 1702 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1734 use some of the same type of ports as input device(s) 1736. Thus, for example, a USB port can be used to provide input to computer 1702, and to output information from computer 1702 to an output device 1734. Output adapter 1728 is provided to illustrate that there are some output devices 1734 like monitors, speakers, and printers, among other output devices 1734, which require special adapters. The output adapters 1728 include, by way of illustration and not limitation, video and sound cards that provide a means of connection between the output device 1734 and the system bus 1708. It should be noted that other devices and/or systems of devices provide both input and output capabilities such as remote computer(s) 1740.

Computer 1702 can operate in a networked environment using logical connections to one or more remote computers, such as remote computer(s) 174. The remote computer(s) 1740 can be a computer, a server, a router, a network PC, a workstation, a microprocessor based appliance, a peer device or other common network node and the like, and typically can also include many or all of the elements described relative to computer 1702. For purposes of brevity, only a memory storage device 1742 is illustrated with remote computer(s) 1740. Remote computer(s) 1740 is logically connected to computer 1702 through a network interface 1738 and then physically connected via communication connection 1732. Network interface 1738 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1732 refers to the hardware/software employed to connect the network interface 1738 to the system bus 1708. While communication connection 1732 is shown for illustrative clarity inside computer 1702, it can also be external to computer 1702. The hardware/software for connection to the network interface 1738 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing ML and/or AI techniques to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a reception component that receives image data captured of a person; and
an identification component that employs two or more independent identification platforms to determine an identity of the person based on the image data, wherein the two or more independent identification recognition platforms comprise independent systems that determine identities of individuals using a same type of recognition technology and independent databases of information associating known identities with distinct sets of image features.

2. The system of claim 1, wherein the identification component further employs two or more independent identification technologies to determine the identity of the person based on the image data, and wherein the two or more independent identification technologies are selected from a group consisting of: facial recognition, object recognition, text recognition, and gait recognition.

3. The system of claim 2, wherein the computer executable components further comprise:
a confidence evaluation component that determines a level of confidence in the accuracy of the identity based on a degree of correspondence between identifying information determined for the person using the two or more independent identification technologies.

4. The system of claim 1, wherein the reception component further receives biometric data for the person, and wherein the identification component further determines the identity of the person based on the biometric data.

5. The system of claim 1, wherein the same type of recognition technology comprises a facial recognition technology.

6. The system of claim 1 wherein the two or more independent systems employ different facial recognition models or algorithms.

7. The system of claim 1, wherein the identification component sends the image data to the independent systems for independent processing in association with a request to determine the identity of the person based on the image data.

8. The system of claim 7, wherein the identification component receives responses from the independent systems comprising identifying information determined for the person based on the image data, and wherein the identification component determines the identity of the person based on comparison of the responses.

9. The system of claim 8, wherein the computer executable components further comprise:
a confidence evaluation component that determines a level of confidence in the accuracy of the identity based on a degree of correspondence between the identifying information included in the responses.

10. The system of claim 1, wherein the computer executable components further comprise:
a geolocation component that determines a capture location and capture time of the image data and a known location associated with the identity at or near the capture time, and wherein the identification component further determines the identity based on a measure of correspondence between the capture location and the known location.

11. The system of claim 10, wherein the geolocation component obtains an identifier for the user identity determined by the identification component and determines the known location based on a location of a mobile device associated with the identifier at or near the capture time using an external device location tracking system.

12. The system of claim 10, wherein the computer executable components further comprise:
a confidence evaluation component that determines a level of confidence in the accuracy of the identity based on the measure of correspondence.

13. The system of claim 1, wherein the reception component further receives audio data captured from an environment of the person, and wherein the identification component further employs an audio analysis technology to determine the identity of the person based on the audio data.

14. The system of claim 13, wherein the audio data comprises speech spoken by the person.

15. A method, comprising:
receiving, by a system comprising a processor, image data captured of a person; and
employing, by the system, two or more independent identification platforms to determine an identity of the person based on the image data, wherein the two or more independent identification recognition platforms comprise independent systems that determine identities of individuals using a same type of recognition technology and independent databases of information associating known identities with distinct sets of image features.

16. The method of claim 15, wherein the employing comprises:
sending, by the system, the image data to the independent systems for independent processing in association with a request to determine the identity of the person based on the image data;
receiving, by the system, responses from the independent systems comprising identifying information determined for the person based on the image data; and
determining, by the system, the identity of the person based on comparison of the responses.

17. The method of claim 15, further comprising:
employing, by the system, two or more independent identification recognition technologies to determine the identify of the person based on the image data, wherein the two or more independent identification technologies are selected from a group consisting of: facial recognition, object recognition, text recognition, and gait recognition.

18. The method of claim 15, wherein the employing comprises evaluating correspondences between identifying information determined for the person using the two or more independent identification recognition platforms, and wherein the method further comprises:
determining, by the system, a level of confidence in the accuracy of the identity based on the correspondences.

19. A computer readable storage medium, comprising executable instructions that, when executed by a processor, facilitate performance of operations, comprising:
receiving image data captured of a person; and
employing two or more independent identification platforms to determine an identity of the person based on the image data, wherein the two or more independent identification recognition platforms comprise independent systems that determine identities of individuals using a same type of recognition technology and independent databases of information associating known identities with distinct sets of image features.

20. The computer readable storage medium of claim 19, wherein the employing comprises:
- sending, by the system, the image data to the independent systems for independent processing in association with a request to determine the identity of the person based on the image data;
- receiving, by the system, responses from the independent systems comprising identifying information determined for the person based on the image data; and
- determining, by the system, the identity of the person based on comparison of the responses.

* * * * *